US012807630B2

United States Patent

(12) United States Patent
Veige et al.
(10) Patent No.: US 12,807,630 B2
(45) Date of Patent: Nov. 24, 2026

(54) TETHERED ALKYLIDENE AND METHODS OF MAKING THE SAME

(71) Applicant: UNIVERSITY OF FLORIDA RESEARCH FOUNDATION, INCORPORATED, Gainesville, FL (US)

(72) Inventors: Adam S. Veige, Gainesville, FL (US); Ushnish Mandal, Gainesville, FL (US); Courtney M. Sever, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 625 days.

(21) Appl. No.: 18/196,977

(22) Filed: May 12, 2023

(65) Prior Publication Data

US 2023/0303600 A1 Sep. 28, 2023

Related U.S. Application Data

(63) Continuation-in-part of application No. PCT/US2021/059100, filed on Nov. 12, 2021.

(Continued)

(51) Int. Cl.

| | |
|---|---|
| ***C07F 11/00*** | (2006.01) |
| ***C08F 132/08*** | (2006.01) |
| ***C08F 138/02*** | (2006.01) |

(52) U.S. Cl.

CPC ............ *C07F 11/00* (2013.01); *C08F 132/08* (2013.01); *C08F 138/02* (2013.01)

(58) Field of Classification Search

None

See application file for complete search history.

(56) References Cited

U.S. PATENT DOCUMENTS 7,420,025 B2 9/2008 Wagener et al.
9,206,266 B2 12/2015 Veige et al.

FOREIGN PATENT DOCUMENTS

WO WO-2020/223426 A1 11/2020

OTHER PUBLICATIONS

International Search Report and Written Opiniion issued in PCT Patent Application No. PCT/US2021/059100, mailed Feb. 22, 2022, 9 pages.

(Continued)

*Primary Examiner* — Catherine S Branch

(74) *Attorney, Agent, or Firm* — MARSHALL, GERSTEIN & BORUN LLP

(57) ABSTRACT

Provided herein are compounds that can be used as a catalyst to form cyclic polymers, methods of making and using the same. For example, provided herein are compounds of formula (I) or (II):

(I)

or (Continued)

-continued (II)

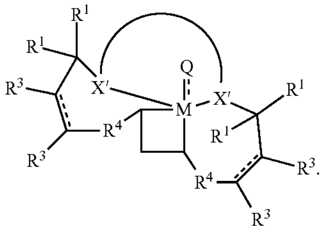

20 Claims, 27 Drawing Sheets

Related U.S. Application Data

(60) Provisional application No. 63/222,096, filed on Jul. 15, 2021, provisional application No. 63/112,841, filed on Nov. 12, 2020.

(56) References Cited

OTHER PUBLICATIONS

PubChem—SID405478325 Deposit Date: Jun. 10, 2020, 8 pages.
Benmouna, M.; Maschke, U., Semlyen, J. A., *Cyclic Polymers, Second Edition*; Kluwer Academic Publishers: New York, 2000, 741-790.
Bloomfield, V.; Zimm, B. H., "Viscosity, Sedimentation, et Cetera, of Ring- and Straight—Chain Polymers in Dilute Solution," *J. Chem. Phys*. 1966, 44, 315-323.
Geiser, D.; Höcker, H., "Synthesis and Investigation of Macrocyclic Polystyrene," *Macromolecules* 1980, 13, 653-656.
Fukatsu, M.; Kurata, M., "Hydrodynamic Properties of Flexible-Ring Macromolecules," *J. Chem. Phys*. 1966, 44, 4539-4545.
Jeong, Y.; Jin, Y.; Chang, T.; Uhlik, F.; Roovers, J., "Intrinsic Viscosity of Cyclic Polystyrene," *Macromolecules* 2017, 50, 7770-7776.
Lee, L. B. W.; Register, R. A., "Hydrogenated Ring-Opened Polynorbornene: A Highly Crystalline Atactic Polymer," *Macromolecules* 2005, 38, 1216-1222.
Lutz, P.; McKenna, G.; Rempp, P.; Strazielle, C., "Solution Properties of Ring-Shaped Polystyrenes," *Makromol. Chem, Rapid Commun*. 1986, 7, 599-605.
McKenna, G. B.; Hadziioannou, G.; Lutz, P.; Hild, G.; Strazielle, C.; Straupe, C.; Rempp, P.; Kovacs, A. J., "Dilute Solution Characterization of Cyclic Polystyrene Molecules and Their Zero-Shear Viscosity in the Melt," *Macromolecules* 1987, 20, 498-512.
Miessler, Gary L.; Fischer, Paul J.; Tarr, Donald A., *Inorganic Chemistry, Fifth Edition*, 2014, 1-702.
Nadif, S. S.; Kubo, T.; Gonsales, S. A.; VenkatRamani, S.; Ghiviriga, I.; Sumerlin, B. S.; Veige, A. S., "Introducing "Ynene" Metathesis: Ring-Expansion Metathesis Polymerization Leads to Highly Cis and Syndiotactic Cyclic Polymers of Norbornene," *J. Am. Chem. Soc*. 2016, 138, 6408-6411.
Oskam, J.H.; Fox, H.H.; Yap, K.B.; McConville, D.H.; ODell, R.; Lichtenstein, B.J.; Schrock, R.R., Ligand Variation in Alkylidene Complexes of the Type Mo)CHR)(NR')(OR")$_2$ *J. Organomet. Chem*. 1993, 459 (1-2), 185-198.
Roland, C. D.; Li, H.; Abboud, K. A.; Wagener, K. B.; Veige, A. S., "Cyclic Polymers from Alkynes," *Nature Chem*. 2016, 8, 791-796.
Roovers, J., "Dilute-Solution Properties of Ring Polystyrenes," *J. Polym. Sci. Polym. Phys*. 1985, 23, 1117-1126.
Rubio, A. M.; Freire,J. J.; Bishop, M.; Clarke, J. H. R., "Θ State, Transition Curves, and Conformational Properties of Cyclic Chains," *Macromolecules* 1995, 28, 2240-2246.
Schrock, R. R.; Murdzek, J. S.; Bazan, G. C.; Robbins, J.; DiMare, M.; O'Regan, *J. Am. Chem. Soc*. 1990, 112, 3875-3886.
Zimm, B. H.; Stockmayer, W. H., "The Dimensions of Chain Molecules Containing Branches and Rings," *J. Chem. Phys*. 1949, 17, 1301-1314.

TETHERED ALKYLIDENE AND METHODS OF MAKING THE SAME

CROSS-REFERENCE TO RELATED APPLICATIONS

This application is a continuation-in-part of PCT/US21/59100, filed Nov. 12, 2021, which claims the benefit of priority to U.S. Provisional Application Nos. 63/112,841, filed Nov. 12, 2022, and 63/222,096 filed Jul. 15, 2021, the disclosures of which, are incorporated herein by reference in their entireties.

STATEMENT OF US GOVERNMENT SUPPORT

This invention was made with government support under Grant Number 1856674, awarded by the National Science Foundation. The government has certain rights in the invention.

BACKGROUND

Alkene and Alkyne metathesis catalyst are created by installing pendant alkene and alkyne groups on the ligand; however, traditional catalyst designs leave the metal-carbon multiple bond exposed which can cause formation of side-products or degradation of the catalyst. There is a need for catalysts that do not have an exposed metal carbon multiple bond. In addition, there is a need for catalysts that polymerize alkynes and/or alkenes by ring expansion metathesis polymerization (REMP) to yield cyclic polyalkyne(s) and/or polyalkene(s).

SUMMARY

Provided herein are compounds having a structure represented by formula (I) or formula (II):

(I)

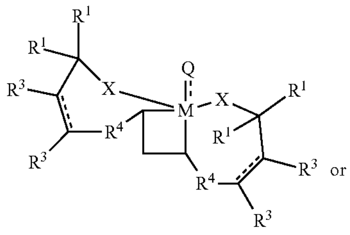

or (II)

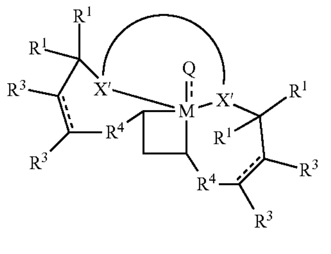

wherein the dashed lines are optional double bonds;

M is a transition metal;

Q is a neutral or anionic ligand;

each X is independently selected from S, O, $NR^5$, $N(R^5)_2$, $P(R^6)_2$, $C(R^7)_2$, $BR^{11}$, $Si(R^{12})_2$, Se, and Te;

each X' is independently selected from S, O, N, $NR^5$, P, $PR^6$, $CR^7$, B, $SiR^{12}$, Se, and Te;

wherein the curved line, together with each X' and M, form a metallacycle and the curved line represents a chain of 1 to 6 atoms independently selected from C, O, N, and S;

each $R^1$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^2$ is independently selected from H, $C_1$-$C_{22}$alkyl, $C_4$-$C_8$cycloalkyl, and $Ar^1$;

each $R^3$ is independently selected from H, $C_1$-$C_{20}$haloalkyl, $C_1$-$C_{20}$alkyl, $C_2$-$C_{20}$alkenyl, $C_1$-$C_{20}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^3$ together with the carbon atoms to which they are attached, form a five- to eight-member cycloalkyl, aryl, heteroaryl, or heterocycloalkyl comprising 1 to 5 heteroatoms selected from O, N, and S;

each $R^4$ is independently selected from a bond, $—C(R^2)_2—$, or $—C(R^2)_2C(R^2)_2—$ each $R^5$ is independently selected from $C_1$-$C_{22}$alkyl, $C_1$-$C_{10}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^5$ together with the atoms to which they are attached, form a five- to eight-member cycloalkyl, aryl, heteroaryl, or heterocycloalkyl comprising 1 to 5 heteroatoms selected from O, N, and S;

each $R^6$ is independently selected from $C_1$-$C_{22}$ alkyl, $C_1$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^6$ together with the atoms to which they are attached, form a five- to eight-member cycloalkyl, aryl, heteroaryl, or heterocycloalkyl comprising 1 to 5 heteroatoms selected from O, N, and S;

each $R^7$ is independently selected from H, $C_1$-$C_{22}$alkyl, $C_4$-$C_8$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^7$ together with the atoms to which they are attached, form a five- to eight-member cycloalkyl, aryl, heteroaryl, or heterocycloalkyl comprising 1 to 5 heteroatoms selected from O, N, and S; and, each $R^{11}$ and $R^{12}$ are independently selected from $C_1$-$C_{22}$ alkyl, $C_1$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{11}$, or two vicinal $R^{12}$ together with the atoms to which they are attached, form a five- to eight-member cycloalkyl, aryl, heteroaryl, or heterocycloalkyl comprising 1 to 5 heteroatoms selected from O, N, and S;

each $Ar^1$ is independently selected from $C_6$-$C_{22}$ aryl and a 5-12 membered heteroaryl comprising from 1 to 3 ring heteroatoms selected from O, N, and S.

Also provided herein are compounds selected from the group of:
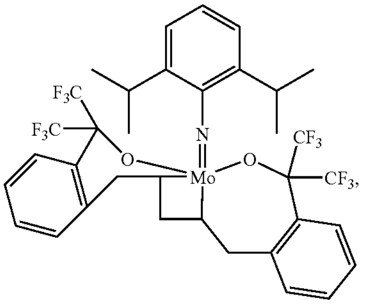
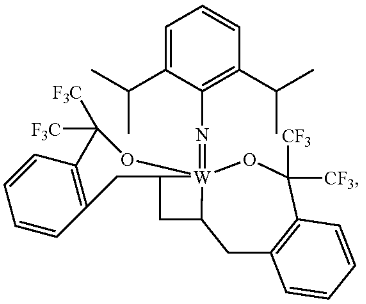
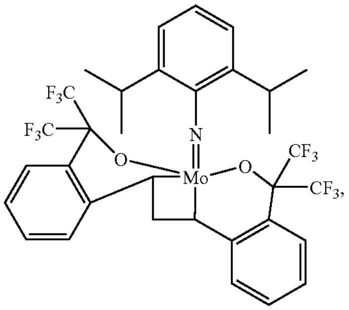
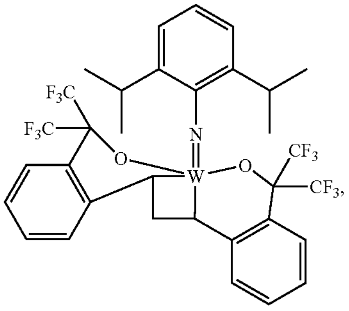
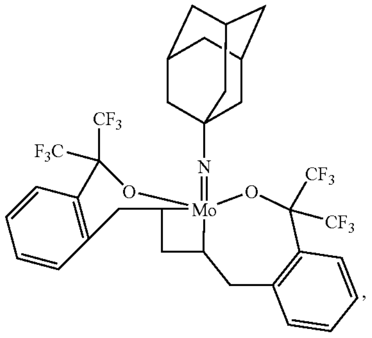
-continued
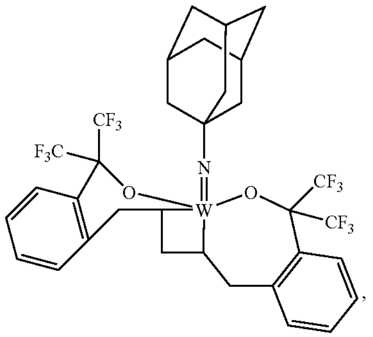
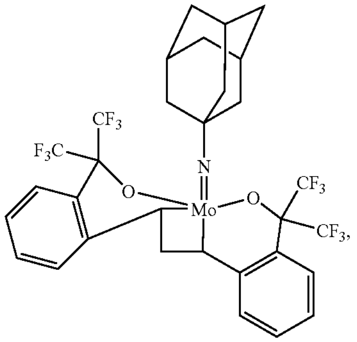
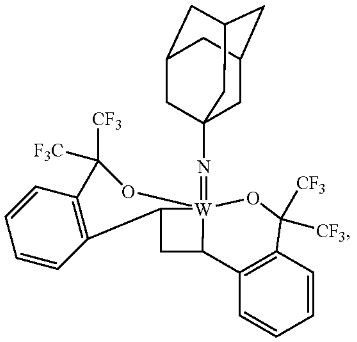
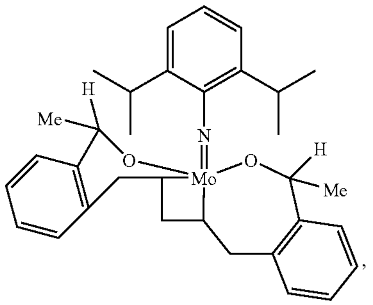
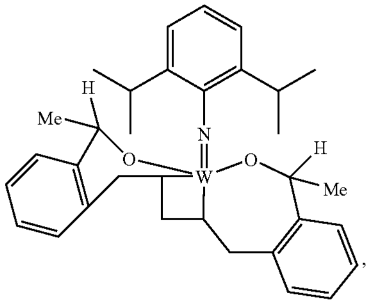

-continued

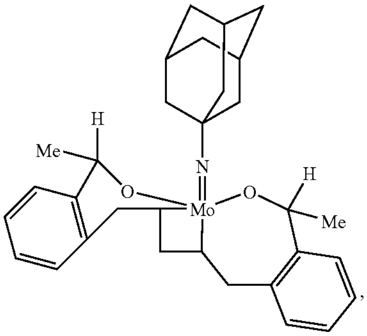
,

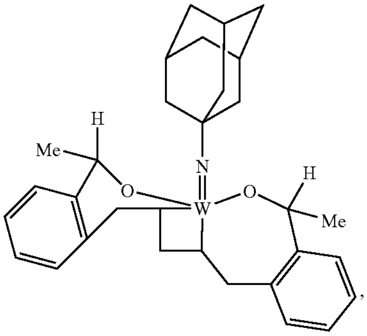
,

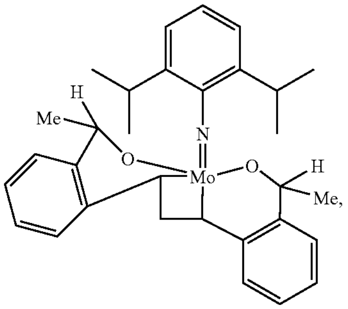
,

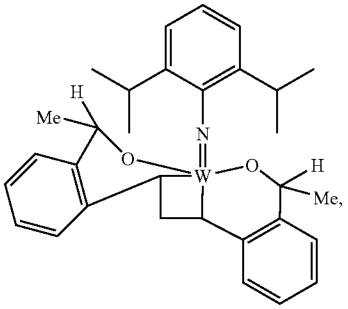
,

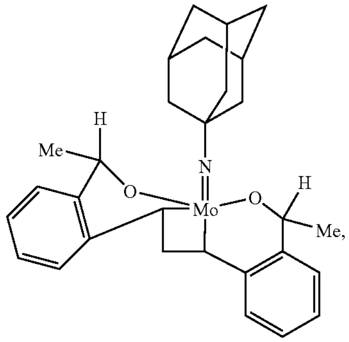
and

-continued

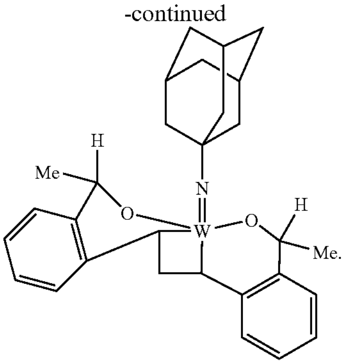
.

Also provided herein are methods of preparing a compound of the disclosure, the method comprising:

admixing a compound of formula (III) and a compound of formula (IV) or a compound of formula (V) under conditions sufficient to form the compound of formula (I) or formula (II):

(III)

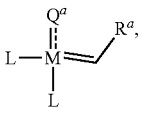
, (IV)

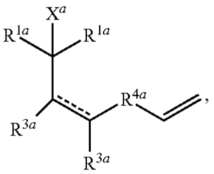
, (V)

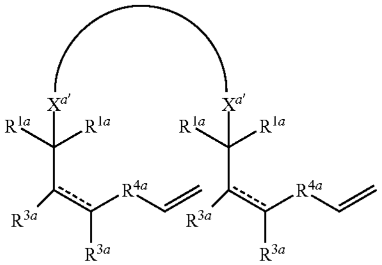

wherein the dashed lines are optional double bonds;

M is a transition metal; $Q^a$ is a neutral or anionic ligand;

each $X^a$ is independently selected from SH, OH, $NHR^{5a}$, $NH(R^{5a})_2$, $PH(R^{6a})_2$, $CH(R^{7a})_2$ SeH, TeH, $BHR^{11a}$, and $SiH(R^{12a})_2$; each $X^{a'}$ is independently selected from S, O, NH, $NHR^{5a}$, PH, $PHR^{6a}$, $CHR^{7a}$, BH, $SiHR^{12a}$, Se, and Te;

wherein the curved line represents a chain of 1 to 6 atoms, each atom independently selected from C, O, N, and S;

$R^a$ is selected from $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^{1a}$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^{2a}$ is independently selected from H, $C_1$-$C_{22}$alkyl, $C_4$-$C_8$cycloalkyl, and $Ar^{1a}$;

each $R^{3a}$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{3a}$ together with the carbon atoms to which they are attached, form a five- to eight-member cycloalkyl, aryl, heteroaryl, or heterocycloalkyl comprising 1 to 5 heteroatoms selected from O, N, and S;

each $R^{4a}$ is independently selected from a bond, $—C(R^{2a})_2—$, or $—C(R^{2a})_2C(R^{2a})_2—$ each $R^{5a}$ is independently selected from $C_1$-$C_{22}$alkyl, $C_4$-$C_{10}$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{5a}$ together with the atoms to which they are attached, form a five- to eight-member cycloalkyl, aryl, heteroaryl, or heterocycloalkyl comprising 1 to 5 heteroatoms selected from O, N, and S;

each $R^{6a}$ is independently selected from $C_1$-$C_{22}$ alkyl, $C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{6a}$ together with the atoms to which they are attached, form a five- to eight-member cycloalkyl, aryl, heteroaryl, or heterocycloalkyl comprising 1 to 5 heteroatoms selected from O, N, and S;

each $R^{7a}$ is independently selected from H, $C_1$-$C_{22}$ alkyl, $C_4$-$C_8$ cycloalkyl, Aria, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{7a}$ together with the atoms to which they are attached, form a five- to eight-member cycloalkyl, aryl, heteroaryl, or heterocycloalkyl comprising 1 to 5 heteroatoms selected from O, N, and S;

each $R^{11a}$ and $R^{12a}$ are independently selected from $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{11a}$, or two vicinal $R^{12a}$ together with the atoms to which they are attached, form a five- to eight-member cycloalkyl, aryl, heteroaryl, or heterocycloalkyl comprising 1 to 5 heteroatoms selected from O, N, and S;

each L is independently a ligand; and, each $Ar^{1a}$ is independently selected from $C_1$-$C_{22}$aryl and a 5-12 membered heteroaryl comprising from 1 to 3 ring heteroatoms selected from O, N, and S.

Also provided herein are methods of preparing a cyclic polymer, the method comprising: admixing a plurality of alkene monomers, alkyne monomers, or both in the presence of the compounds of formula (I) or (II) of the disclosure under conditions sufficient to polymerize the plurality of alkene monomers, alkyne monomers, or both to form the cyclic polymer.

DETAILED DESCRIPTION

Figure 1:
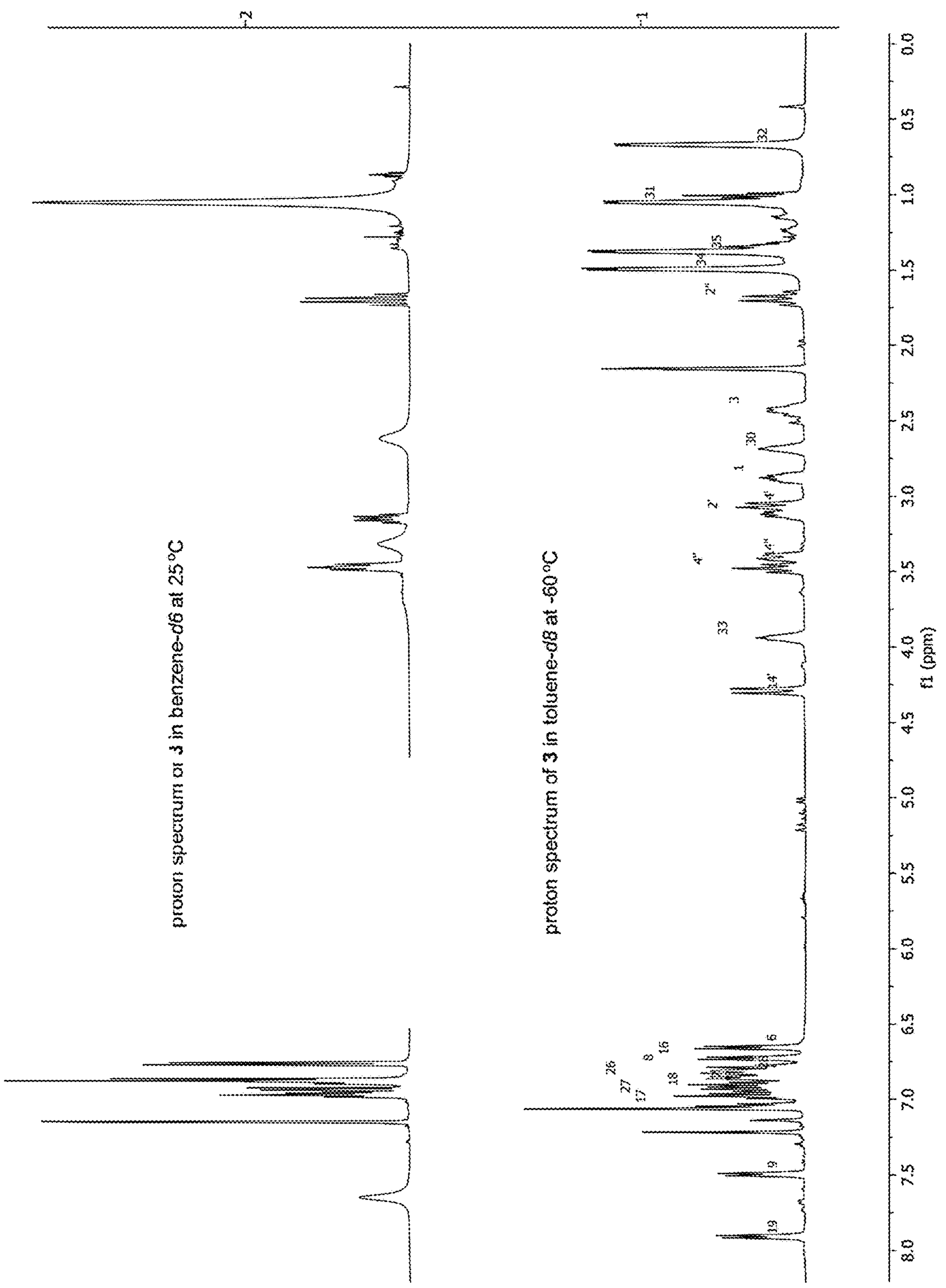
FIG. 1 is a stacked $^1H$ NMR spectrum of a compound of formula (I) of the disclosure, molybdenum metallacyclobutane complex 3, in $C_6D_6$ at 25° C. (upper) at 400.2 MHz and in $C_7D_8$ at −60° C. at 500 MHz (lower).
Figure 2:
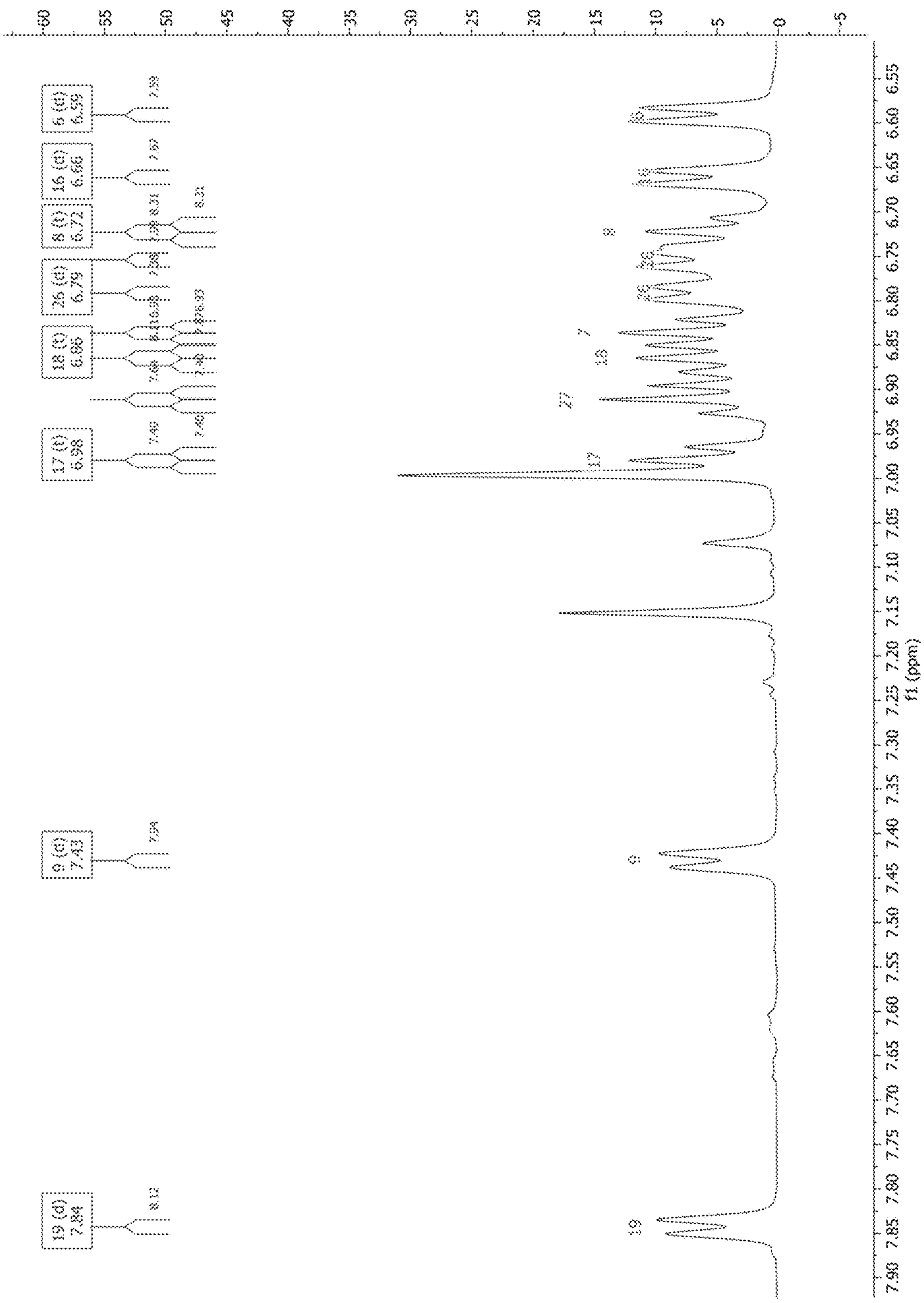
FIG. 2 is a $^1H$ NMR spectrum (aromatic region expanded) of a compound of formula (I) of the disclosure, molybdenum metallacyclobutane complex 3, in $C_7D_8$ at −60° C. at 500 MHz.
Figure 3:
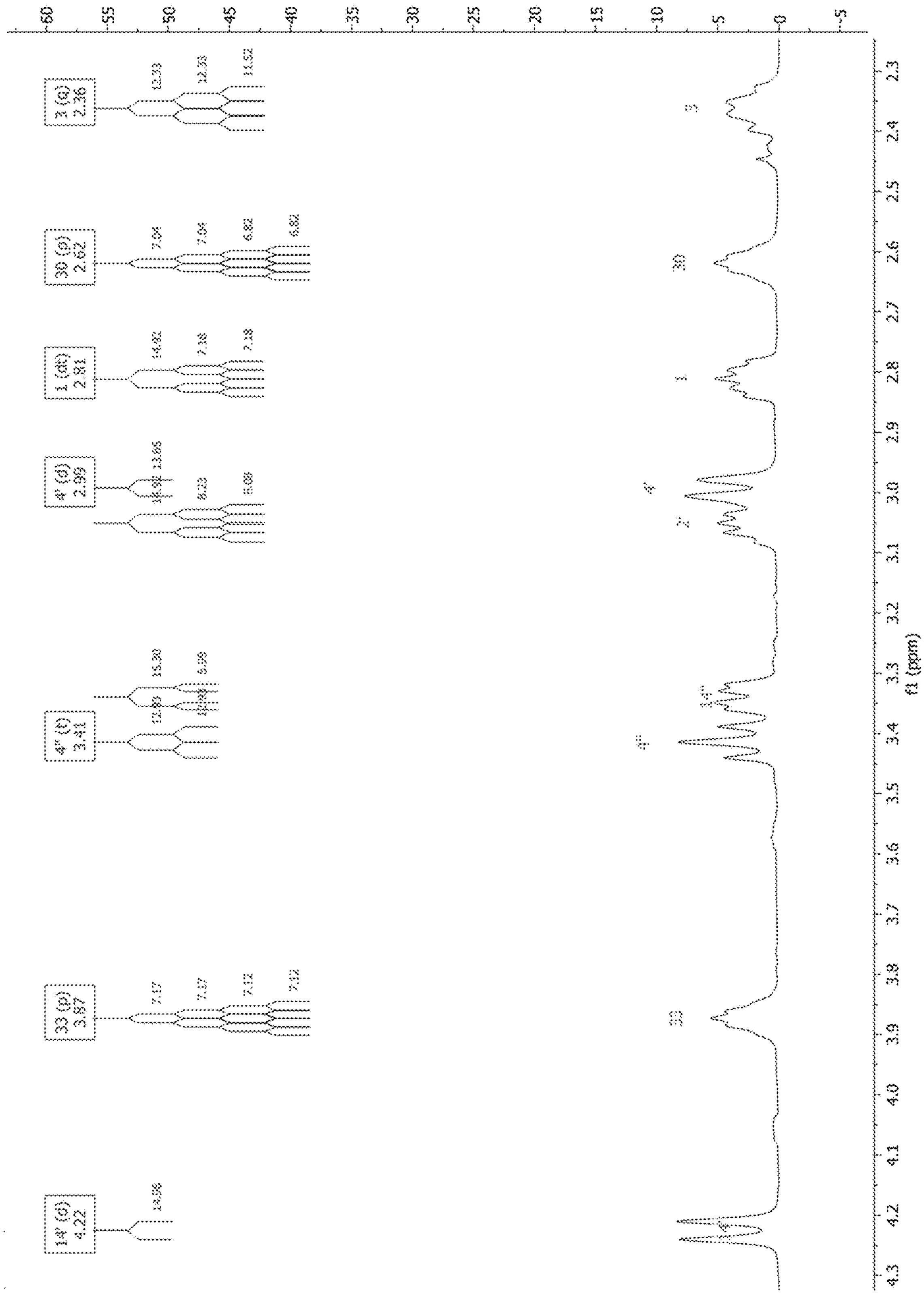
FIG. 3 is a $^1H$ NMR spectrum (aliphatic region expanded) of a compound of formula (I) of the disclosure, molybdenum metallacyclobutane complex 3, in $C_7D_8$ at −60° C. at 500 MHz.
Figure 4:
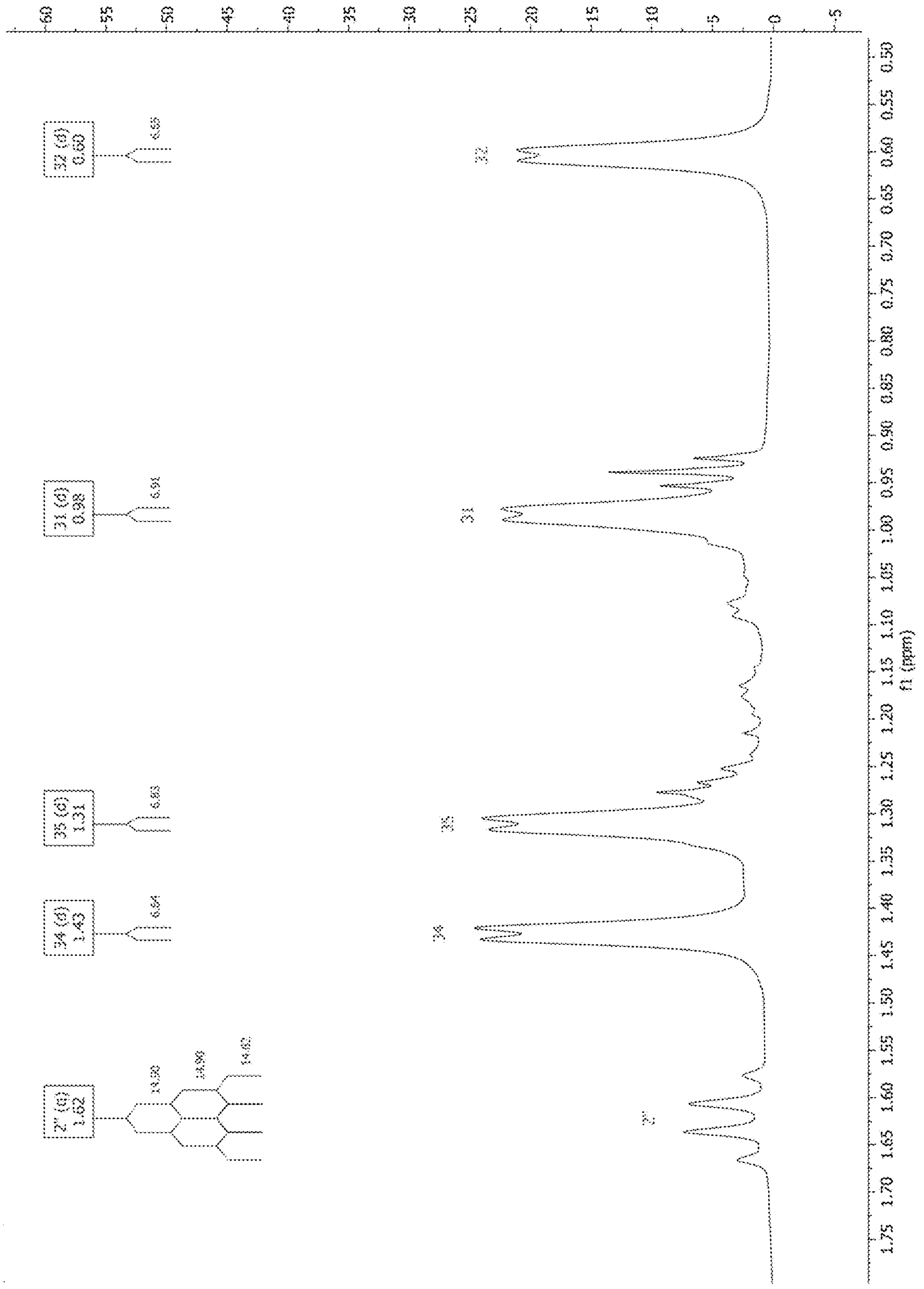
FIG. 4 is a $^1H$ NMR spectrum (aliphatic region expanded) of a compound of formula (I) of the disclosure, molybdenum metallacyclobutane complex 3, in $C_7D_8$ at −60° C. at 500 MHz.
Figure 5:
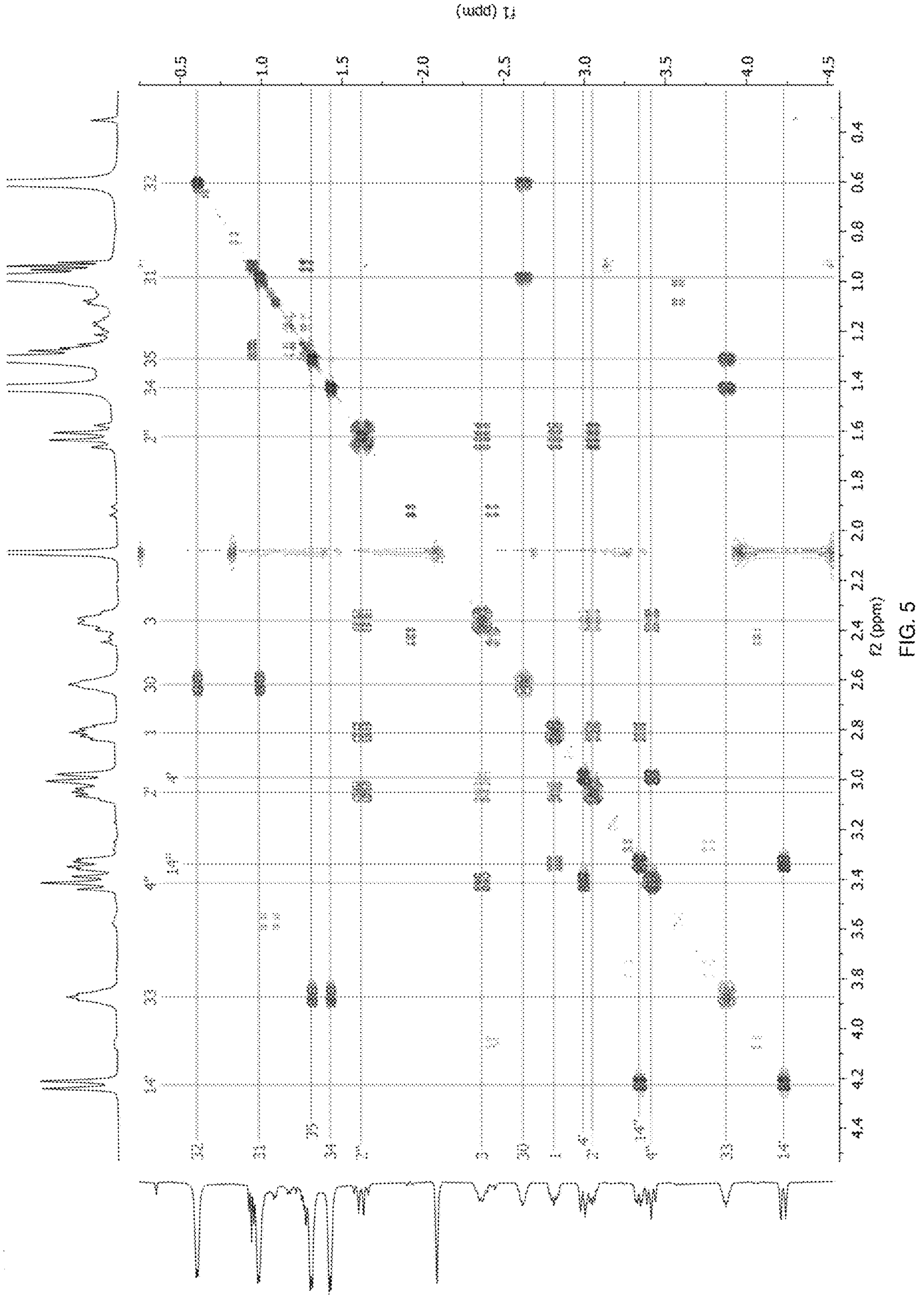
FIG. 5 is a $^1H$-$^1H$ COSY spectrum (aliphatic region expanded) of a compound of formula (I) of the disclosure, molybdenum metallacyclobutane complex 3, in $C_7D_8$ at −60° C. at 500 MHz.
Figure 6:
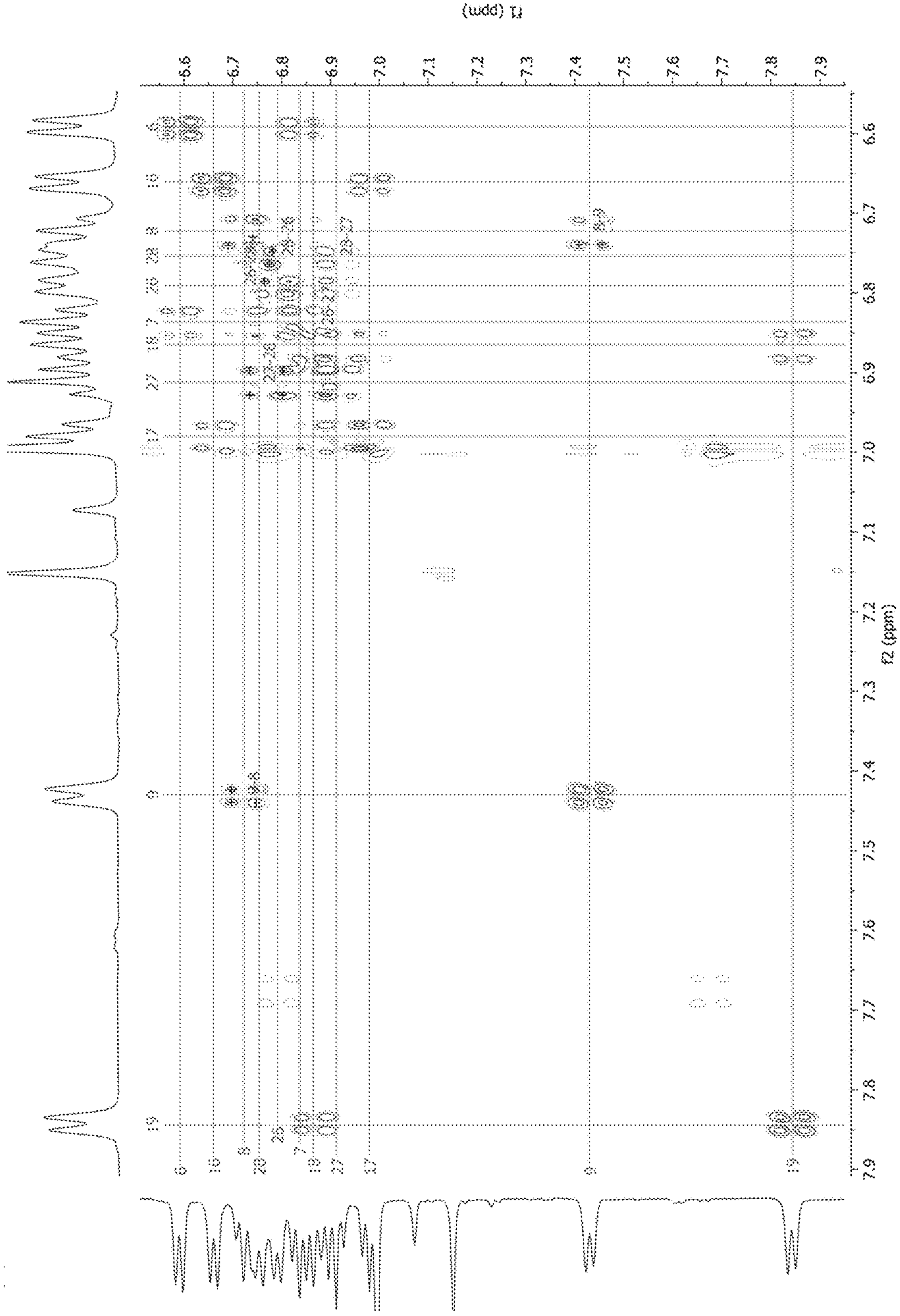
FIG. 6 is a $^1H$-$^1H$ COSY spectrum (aromatic region expanded) of a compound of formula (I) of the disclosure, molybdenum metallacyclobutane complex 3, in $C_7D_8$ at −60° C. at 500 MHz.
Figure 7:
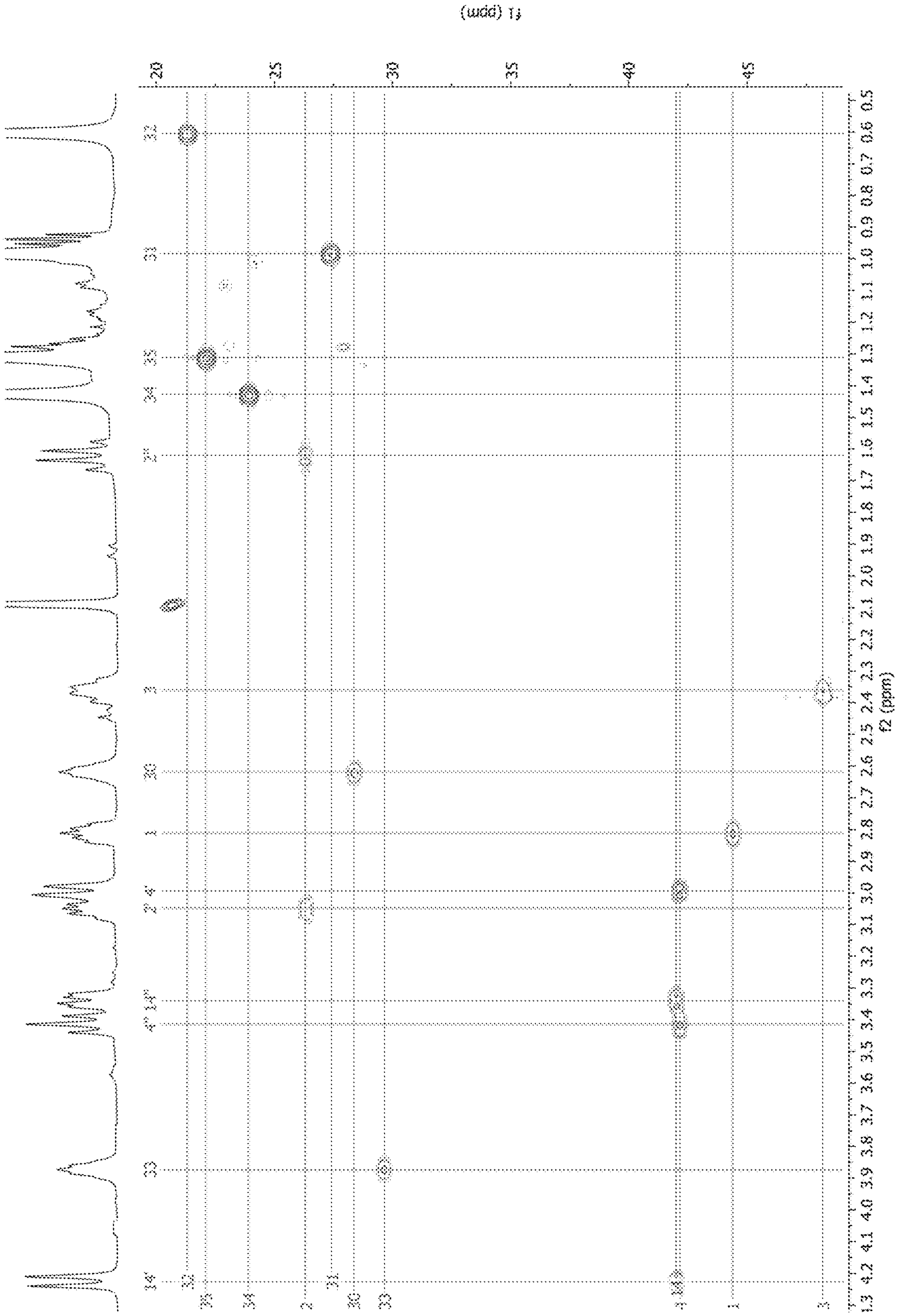
FIG. 7 is a $^1H$-$^{13}C$ gHSQC spectrum (aliphatic region expanded) of a compound of formula (I) of the disclosure, molybdenum metallacyclobutane complex 3, in $C_7D_8$ at −60° C. at 500 MHz.
Figure 8:
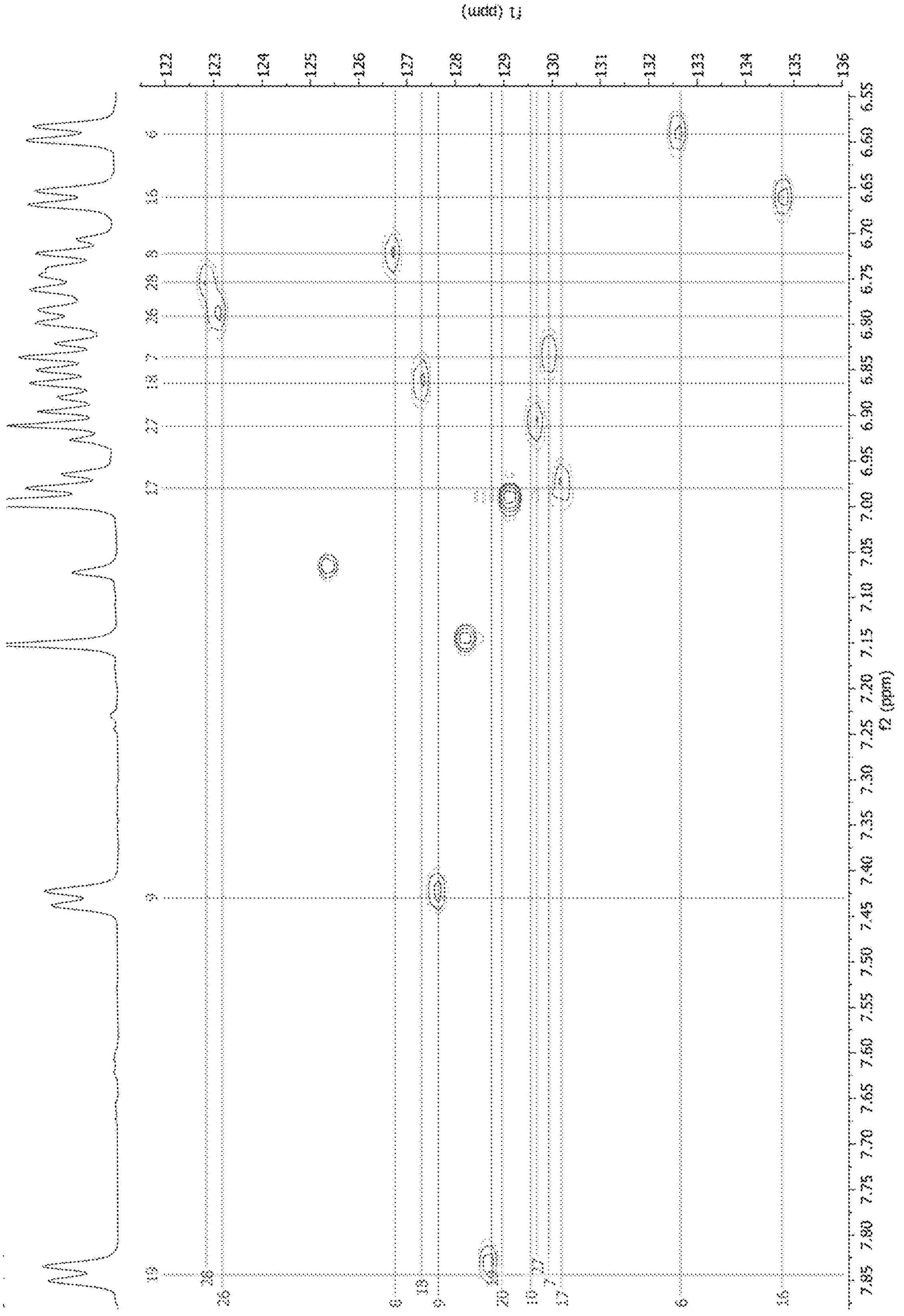
FIG. 8 is a $^1H$-$^{13}C$ gHSQC spectrum (aromatic region expanded) of a compound of formula (I) of the disclosure, molybdenum metallacyclobutane complex 3, in $C_7D_8$ at −60° C. at 500 MHz.
Figure 9:
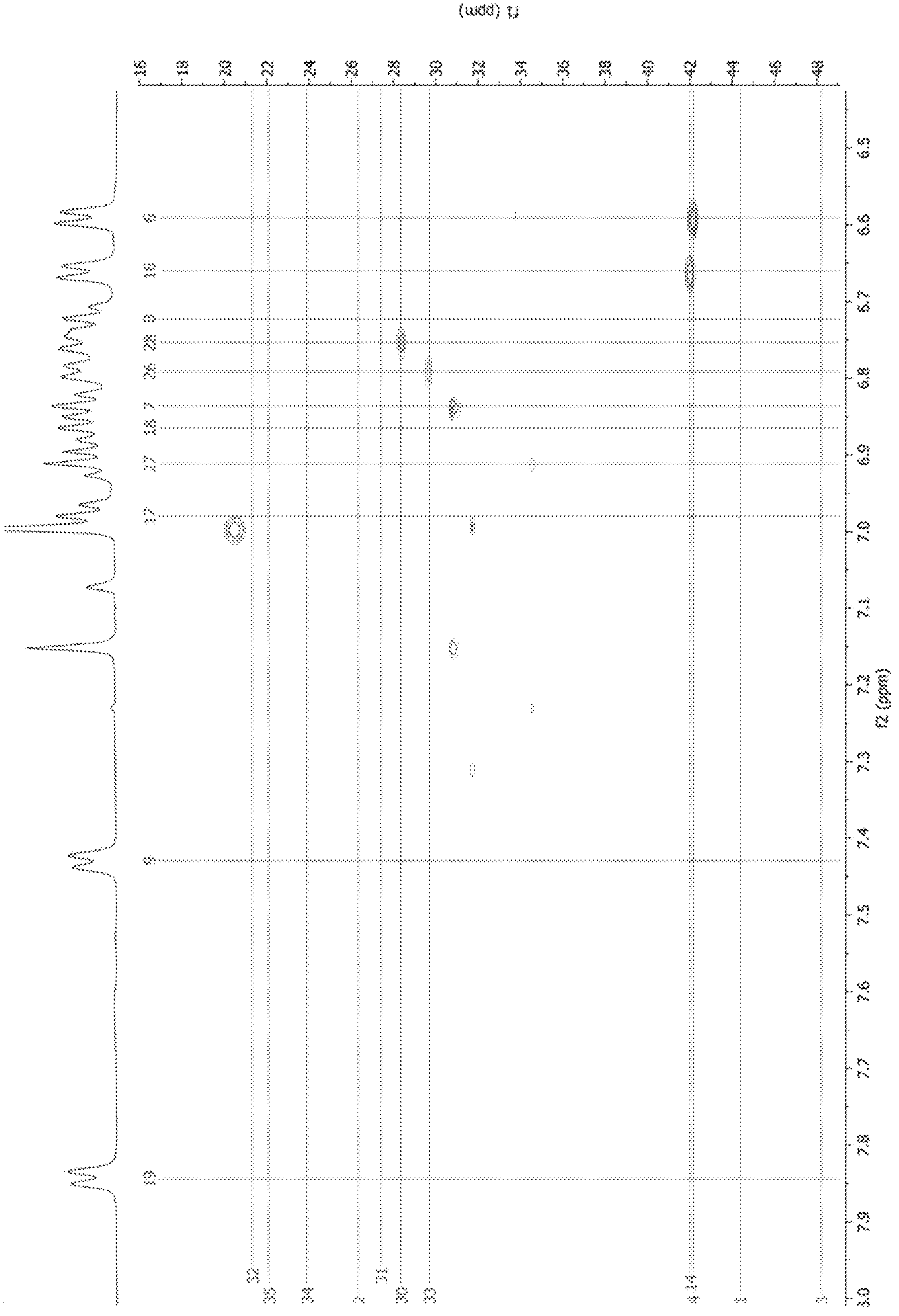
FIG. 9 is a $^1H$-$^{13}C$ gHMBC spectrum (expanded) of a compound of formula (I) of the disclosure, molybdenum metallacyclobutane complex 3, in $C_7D_8$ at −60° C. at 500 MHz.
Figure 10:
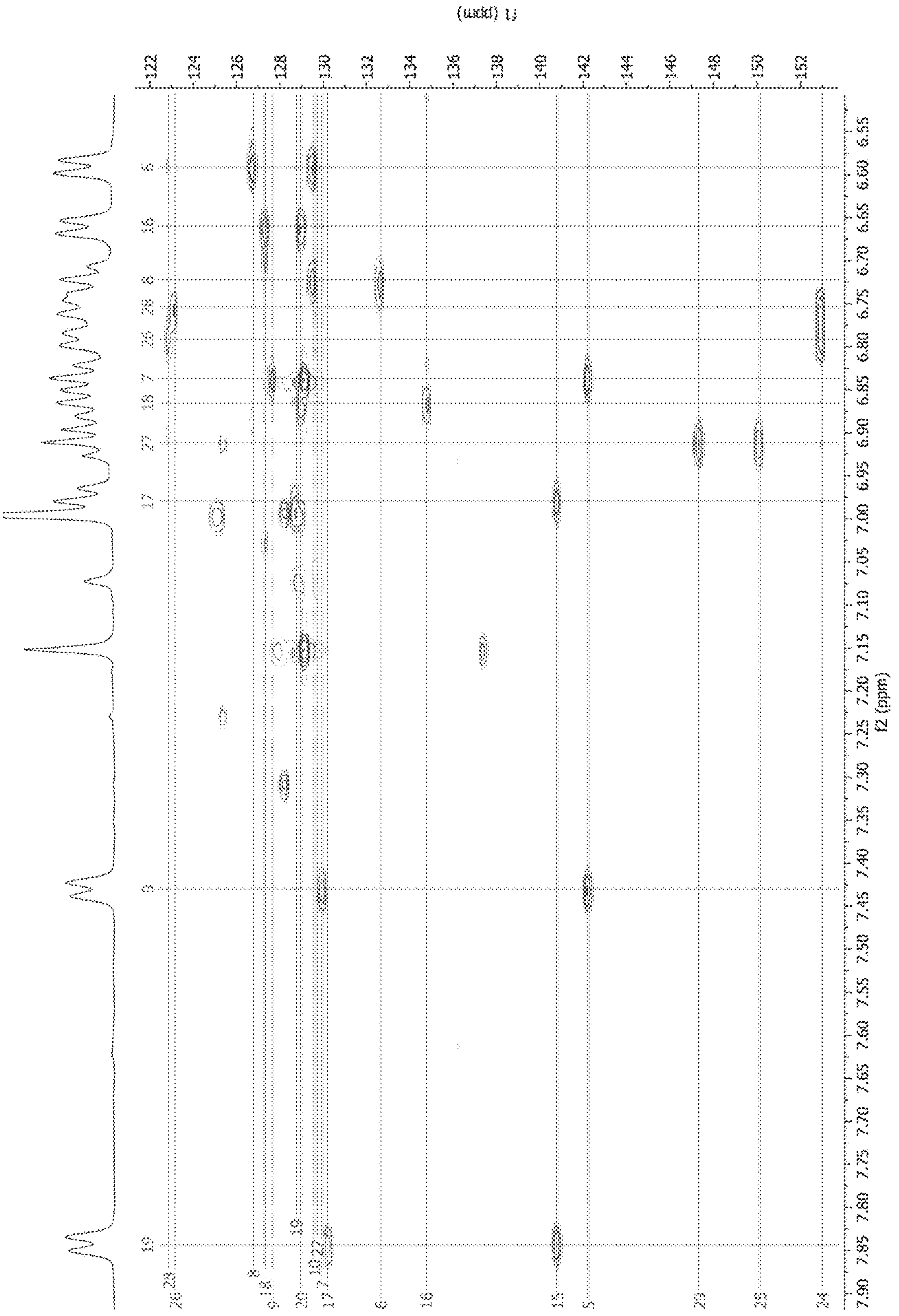
FIG. 10 is a $^1H$-$^{13}C$ gHMBC spectrum (expanded) of a compound of formula (I) of the disclosure, molybdenum metallacyclobutane complex 3, in $C_7D_8$ at −60° C. at 500 MHz.
Figure 11:
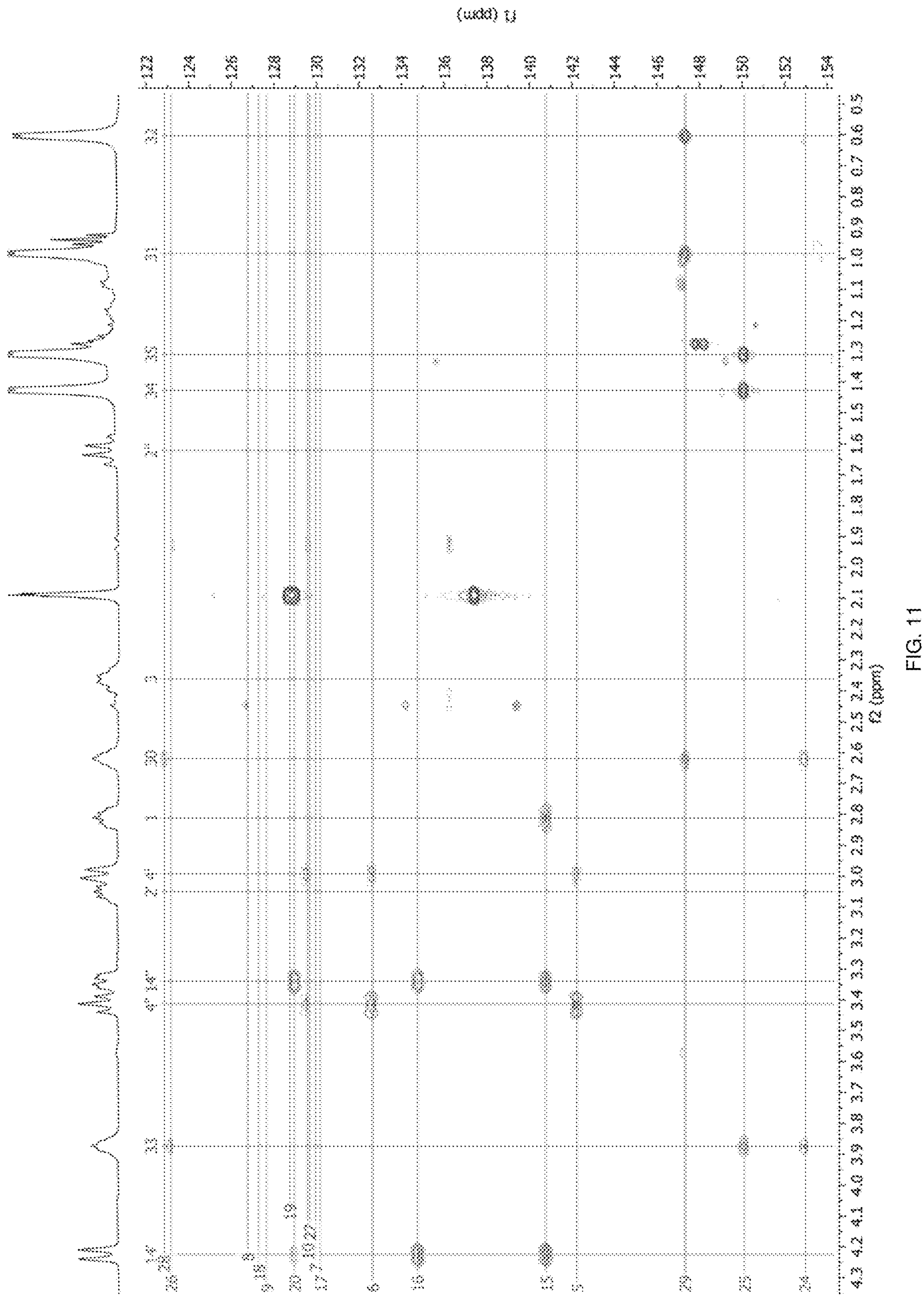
FIG. 11 is a $^1H$-$^{13}C$ gHMBC spectrum (expanded) of a compound of formula (I) of the disclosure, molybdenum metallacyclobutane complex 3, in $C_7D_8$ at −60° C. at 500 MHz.
Figure 12:
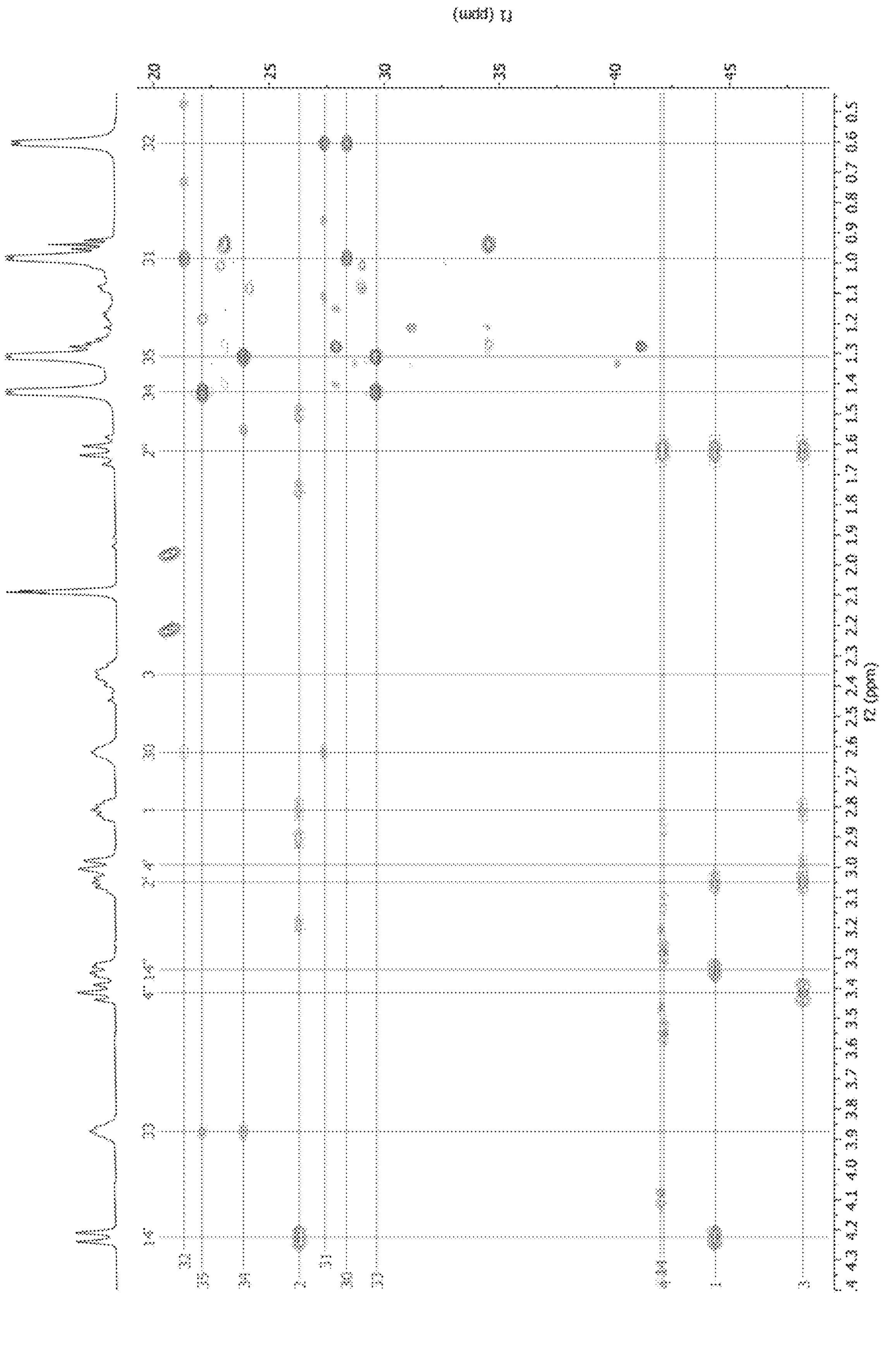
FIG. 12 is a $^1H$-$^{13}C$ gHMBC spectrum (expanded) of a compound of formula (I) of the disclosure, molybdenum metallacyclobutane complex 3, in $C_7D_8$ at −60° C. at 500 MHz.
Figure 13:
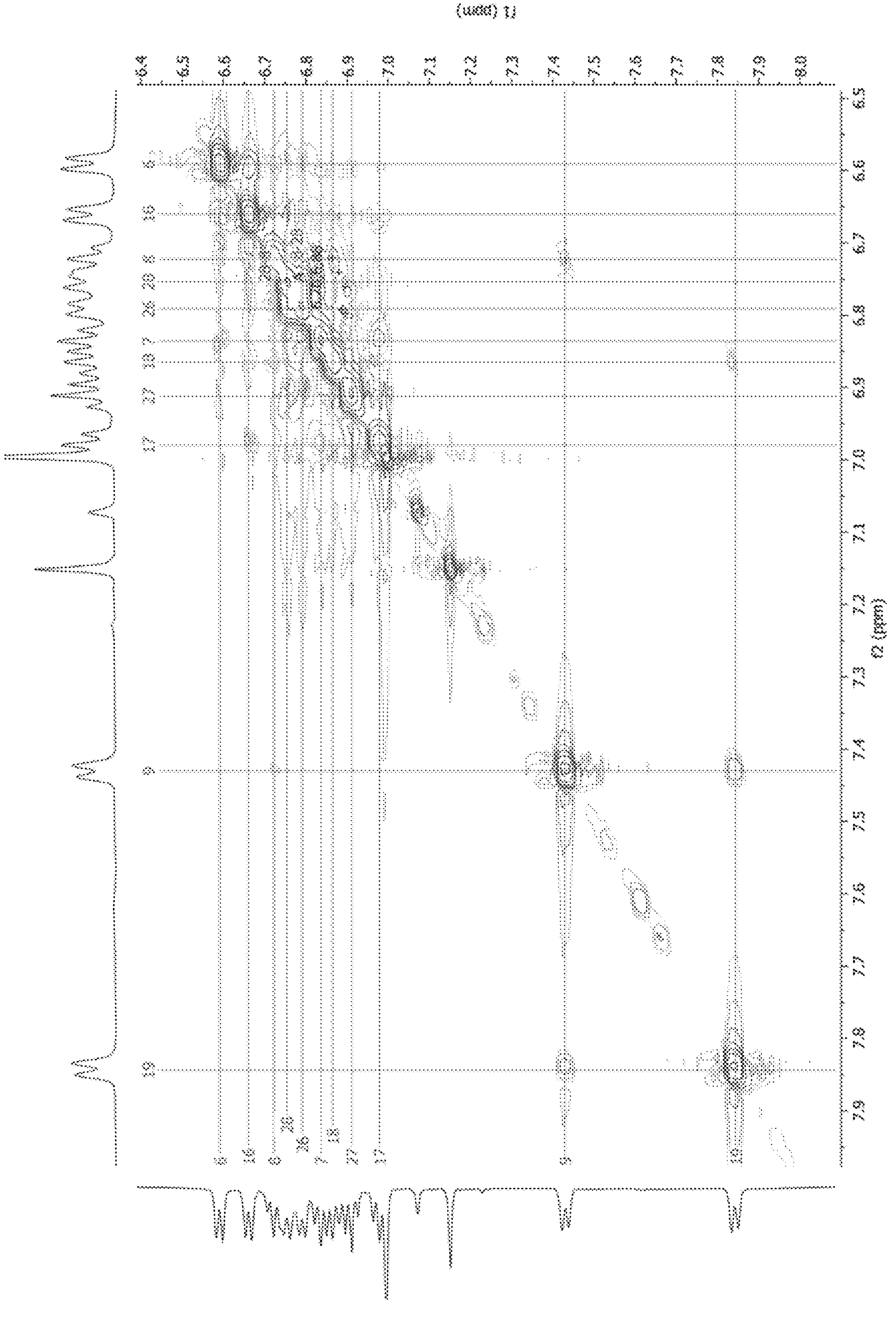
FIG. 13 is a $^1H$-$^1H$ NOESY spectrum (expanded) of a compound of formula (I) of the disclosure, molybdenum metallacyclobutane complex 3, in $C_7D_8$ at −60° C. at 500 MHz.
Figure 14:
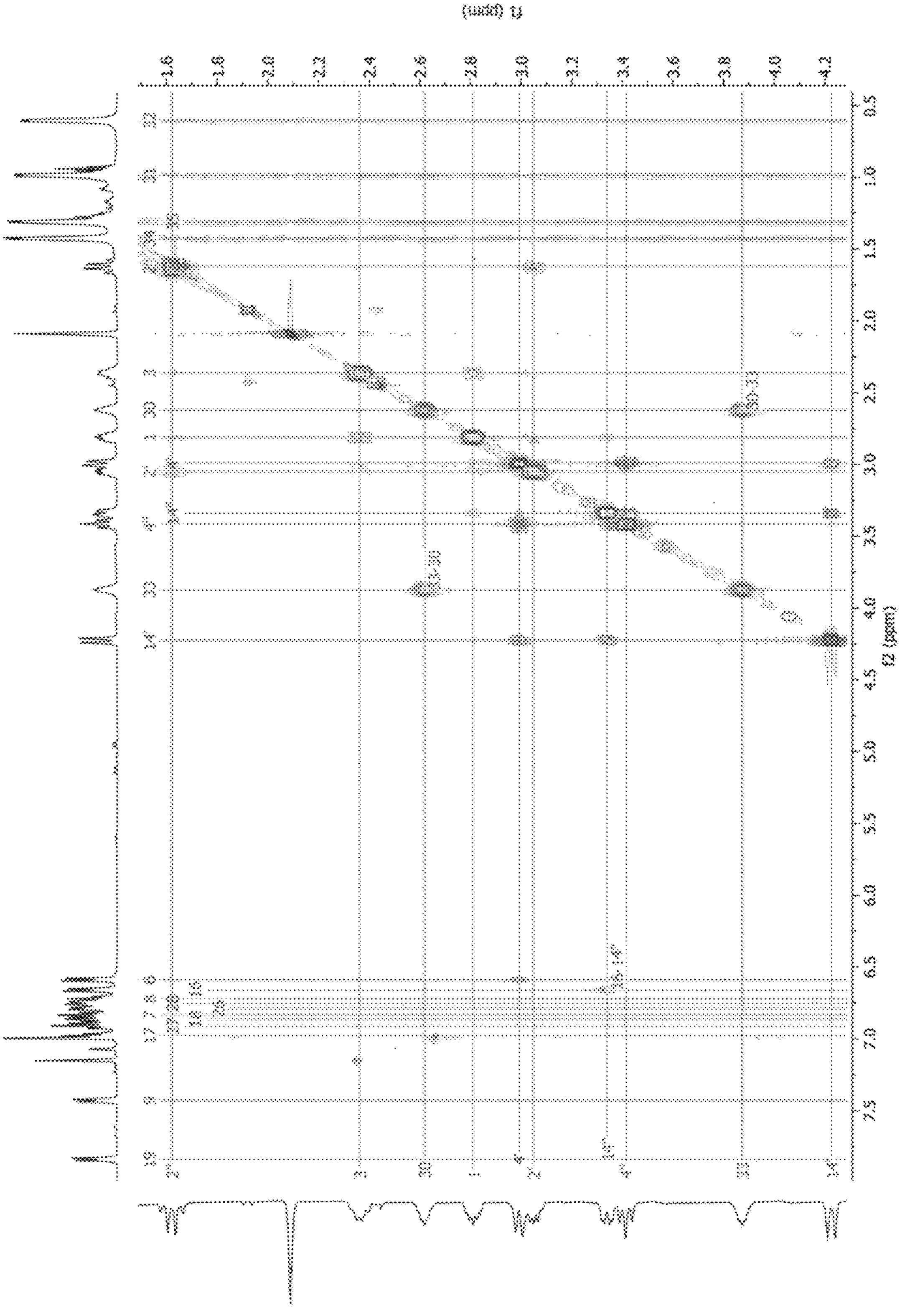
FIG. 14 is a $^1H$-$^1H$ NOESY spectrum (expanded) of a compound of formula (I) of the disclosure, molybdenum metallacyclobutane complex 3, in $C_7D_8$ at −60° C. at 500 MHz.
Figure 15:
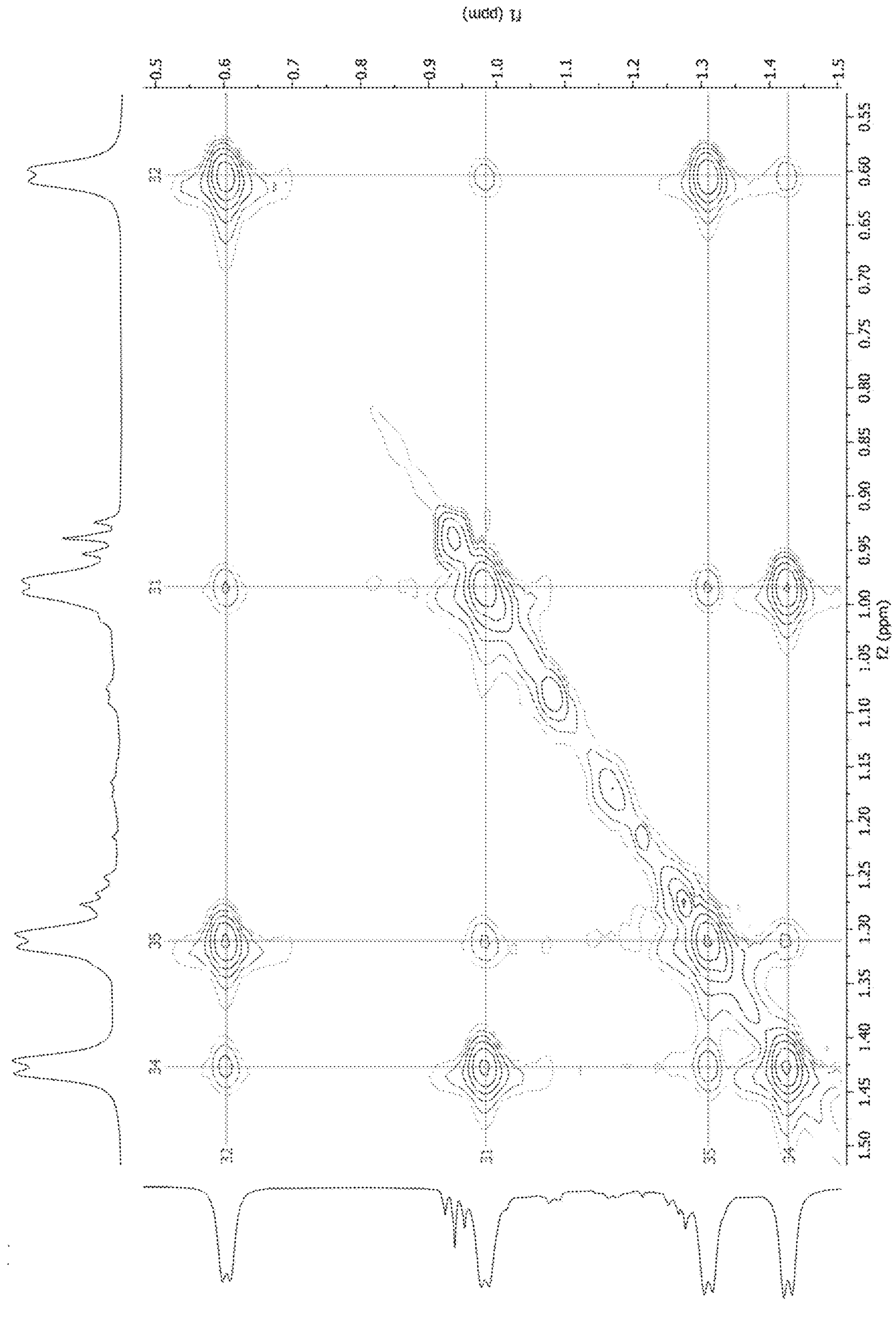
FIG. 15 is a $^1H$-$^1H$ NOESY spectrum (expanded) of a compound of formula (I) of the disclosure, molybdenum metallacyclobutane complex 3, in $C_7D_8$ at −60° C. at 500 MHz.

Provided herein are compounds having a structure represented by formula (I) or formula (II), methods of making said compounds, and methods of preparing cyclic polymers using said compounds. These compounds can be used as a catalyst in the preparation of cyclic polymers.

The compounds of the disclosure have structures represented by formulas (I), (II), (III), (IV), and (V), and these compounds may also be referred to as "compounds of formula (I)," "compounds of formula (II)," "compounds of formula (III)," "compounds of formula (IV)," and "compounds of formula (V)," herein, respectively.

Modifications and other embodiments will come to mind to one skilled in the art to which the disclosed compositions and methods pertain having the benefit of the teachings presented herein and the associated drawings. Therefore, it is to be understood that the disclosures are not to be limited to the specific embodiments disclosed and that modifications and other embodiments are intended to be included within the scope of the appended claims.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Definitions

As used herein, the term "alkyl" refers to straight chained and branched saturated hydrocarbon groups containing one to thirty carbon atoms, for example, one to twenty two carbon atoms, or one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-20}$alkyl and $C_1$-$C_{20}$ alkyl refer to an alkyl group having a number of carbon atoms encompassing the entire range (i.e., 1 to 20 carbon atoms), as well as all subgroups (e.g., 1-20, 2-15, 1-10, 5-12, 1, 2, 3, 4, 5, 6, 7, 8, 9, 10, 11, 12, 13, 14, 15, 16, 17, 18, 19, and 20 carbon atoms). Nonlimiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group. Unless otherwise indicated, an alkyl group can be an unsubstituted alkyl group or a substituted alkyl group. A specific substitution on an alkyl can be indicated by inclusion in the term, e.g., "haloalkyl" indicates an alkyl group substituted with one or more (e.g., one to 10) halogens.

As used herein, the term "heteroalkyl" is defined similarly as alkyl except that the straight chained and branched saturated hydrocarbon group contains, in the alkyl chain, one to five heteroatoms independently selected from oxygen (O), nitrogen (N), and sulfur (S). In particular, the term "heteroalkyl" refers to a saturated hydrocarbon containing one to twenty carbon atoms and one to five heteroatoms. In general, in embodiments wherein the heteroalkyl is provided as a substituent, the heteroalkyl is bound through a carbon atom, e.g., a heteroalkyl is distinct from an alkoxy or amino group.

As used herein, the term "cycloalkyl" refers to an aliphatic cyclic hydrocarbon group containing four to twenty carbon atoms, for example, four to fifteen carbon atoms, or four to ten carbon atoms (e.g., 4, 5, 6, 7, 8, 10, 12, 14, 15, 16, 17, 18, 19 or 20 carbon atoms). The term $C_n$ means the cycloalkyl group has "n" carbon atoms. For example, $C_5$ cycloalkyl refers to a cycloalkyl group that has 5 carbon atoms in the ring. $C_{5-8}$ cycloalkyl and $C_5$-$C_8$ cycloalkyl refer to cycloalkyl groups having a number of carbon atoms encompassing the entire range (i.e., 5 to 8 carbon atoms), as well as all subgroups (e.g., 5-6, 6-8, 7-8, 5-7, 5, 6, 7, and 8 carbon atoms). Nonlimiting examples of cycloalkyl groups include cyclobutyl, cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group, or a bicyclic group or a tricyclic group. For example, the cycloalkyl groups described herein can be a cyclohexyl fused to another cyclohexyl, or an adamantyl.

As used herein, the term "heterocycloalkyl" is defined similarly as cycloalkyl, except the ring contains one to five heteroatoms independently selected from oxygen, nitrogen, and sulfur. In particular, the term "heterocycloalkyl" refers to a ring containing a total of five to twenty atoms, for example three to fifteen atoms, or three to ten atoms, of which 1, 2, 3, 4, or 5 of those atoms are heteroatoms independently selected from the group consisting of oxygen, nitrogen, and sulfur, and the remaining atoms in the ring are carbon atoms. Nonlimiting examples of heterocycloalkyl groups include piperidine, tetrahydrofuran, tetrahydropyran, dihydrofuran, morpholine, and the like. The heterocycloalkyl groups described herein can be isolated or fused to another heterocycloalkyl group, a cycloalkyl group, an aryl group, and/or a heteroaryl group. In some embodiments, the heterocycloalkyl groups described herein comprise one oxygen ring atom (e.g., oxiranyl, oxetanyl, tetrahydrofuranyl, and tetrahydropyranyl).

As used herein, the term "alkenyl" is defined identically as "alkyl," except for containing at least one carbon-carbon double bond, and having two to thirty carbon atoms, for example, two to twenty carbon atoms, or two to ten carbon atoms. The term $C_n$ means the alkenyl group has "n" carbon atoms. For example, $C_4$ alkenyl refers to an alkenyl group that has 4 carbon atoms. $C_{2-7}$ alkenyl and $C_2$-$C_7$ alkenyl refer to an alkenyl group having a number of carbon atoms encompassing the entire range (i.e., 2 to 7 carbon atoms), as well as all subgroups (e.g., 2-6, 2-5, 3-6, 2, 3, 4, 5, 6, and 7 carbon atoms). Specifically contemplated alkenyl groups include ethenyl, 1-propenyl, 2-propenyl, and butenyl. Unless otherwise indicated, an alkenyl group can be an unsubstituted alkenyl group or a substituted alkenyl group.

As used herein, the term "aryl" refers to monocyclic or polycyclic (e.g., fused bicyclic and fused tricyclic) carbocyclic aromatic ring systems having six to twenty carbon atoms, for example six to fifteen carbon atoms or six to ten carbon atoms. The term $C_n$ means the aryl group has "n" carbon atoms. For example, $C_6$ aryl refers to an aryl group that has 6 carbon atoms in the ring. Examples of aryl groups include, but are not limited to, phenyl, naphthyl, tetrahydronaphthyl, phenanthrenyl, biphenylenyl, indanyl, indenyl, anthracenyl, and fluorenyl. Unless otherwise indicated, an aryl group can be an unsubstituted aryl group or a substituted aryl group.

As used herein, the term "heteroaryl" refers to a cyclic aromatic ring system having five to twenty total ring atoms (e.g., a monocyclic aromatic ring with 5-6 total ring atoms), of which 1, 2, 3, 4, or 5 of those atoms are heteroatoms independently selected from the group consisting of oxygen, nitrogen, and sulfur, and the remaining atoms in the ring are carbon atoms. Unless otherwise indicated, a heteroaryl group can be unsubstituted or substituted with one or more, and in particular one to four, substituents selected from, for example, halo, alkyl, alkenyl, $OCF_3$, $NO_2$, CN, NC, OH, alkoxy, amino, $CO_2H$, $CO_2$alkyl, aryl, and heteroaryl. In some cases, the heteroaryl group is substituted with one or more of alkyl and alkoxy groups. Heteroaryl groups can be isolated (e.g., pyridyl) or fused to another heteroaryl group (e.g., purinyl), a cycloalkyl group (e.g., tetrahydroquinolinyl), a heterocycloalkyl group (e.g., dihydronaphthyridinyl), and/or an aryl group (e.g., benzothiazolyl and quinolyl). Examples of heteroaryl groups include, but are not limited to, thienyl, furyl, pyridyl, pyrrolyl, oxazolyl, quinolyl, thiophenyl, isoquinolyl, indolyl, triazinyl, triazolyl, isothiazolyl, isoxazolyl, imidazolyl, benzothiazolyl, pyrazinyl, pyrimidinyl, thiazolyl, and thiadiazolyl. When a heteroaryl group is fused to another heteroaryl group, then each ring can contain five to twenty total ring atoms and one to five heteroatoms in its aromatic ring.

As used herein, the term "hydroxy" or "hydroxyl" refers to the "—OH" group. As used herein, the term "thiol" refers to the "—SH" group.

As used herein, the term "alkoxy" or "alkoxyl" refers to a "—O-alkyl" group. As used herein, the term "aryloxy" or "aryloxyl" refers to a "—O-aryl" group. As used herein, the term "heteroaryloxy" or "heteroaryloxyl" refers to a "—O-heteroaryl" group.

As used herein, the term "alkylthio" refers to a "—S-alkyl" group. As used herein, the term "arylthio" refers to a "—S-aryl" group. As used herein, the term "heteroarylthio" refers to a "—S-heteroaryl" group.

As used herein, the term "halo" is defined as fluoro, chloro, bromo, and iodo. The term "haloalkyl" refers to an alkyl group that is substituted with at least one halogen, and includes perhalogenated alkyl (i.e., all hydrogen atoms substituted with halogen), for example, $CH_3CHCl_2$, $CH_2ICHBr_2CH_3$, or $CF_3$.

As used herein, the term "carboxy" or "carboxyl" refers to a "—COOH" group.

As used herein, the term "amino" refers to a $—NH_2$ group, wherein one or both hydrogens can be replaced with an alkyl, cycloalkyl, aryl, heterocycloalkyl, or heteroaryl group. As used herein, the term "amido" refers to an amino group that is substituted with a carbonyl moiety (e.g., —NRC(═O) or —C(═O)—NR), wherein R is a substituent on the nitrogen (e.g., alkyl or H). As used herein "imine" refers to a $—N(R)═CR_2$ group, wherein each R is independently a H, alkyl, cycloalkyl, aryl, heterocycloalkyl, or heteroaryl group. When referring to a ligand, the term "amine" refers to a $—NH_3$ group, where one, two, or three hydrogens can be replaced with an alkyl, cycloalkyl, aryl, heterocycloalkyl, or heteroaryl group. When referring to a ligand, the term "amide" refers to a $NR_2$ group, wherein each R is independently a hydrogen, alkyl, cycloalkyl, aryl, heterocycloalkyl, or heteroaryl group.

As used herein, the term "phosphine" refers to a $—PH_3$ group, wherein 0, 1, 2, or 3 hydrogens can be replaced with an alkyl, cycloalkyl, aryl group, heterocycloalkyl, or heteroaryl. As used herein "phosphite" refers to a $—P(OR)_3$ group, wherein each R can individually be an alkyl, cycloalkyl, aryl, heterocycloalkyl, or heteroaryl group. As used herein, "phosphonite" refers to a $—PR(OR)_2$ group, wherein each R can individually be an alkyl, cycloalkyl, aryl, heterocycloalkyl, or heteroaryl group. As used herein, "phosphinite" refers to a $—PR_2(OR)$ group, wherein each R can individually be alkyl, cycloalkyl, aryl, heterocycloalkyl, or heteroaryl group. As used herein, the term "diphosphine" refers to a $—P(R_2)—(CH_2)_n—P(R_2)—$ group, wherein each R can individually be an alkyl, cycloalkyl, aryl, heterocycloalkyl, or heteroaryl group and n can be 1, 2, 3, 4, or 5.

As used herein, the term "carbene" refers to a $—CH_2$ ligand, wherein 0, 1, or 2 hydrogens can be replaced with an alkyl, cycloalkyl, aryl, heterocycloalkyl, or heteroaryl group.

As used herein, the term "N-heterocyclic carbene" refers to a carbene, wherein the carbene is a ring atom in a heterocycle comprising 1 to 5 nitrogen atoms. Examples of N-heterocyclic carbenes include, but are not limited to,

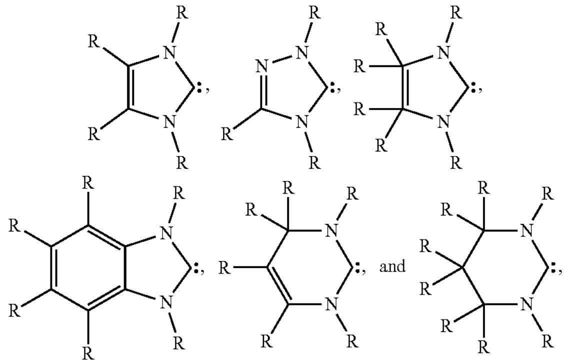

and wherein, each R group is independently selected from the group of: H, alkyl, cycloalkyl, alkenyl, aryl, alkoxy, aryloxy, heterocycloalkyl, and heteroaryl.

As used herein, the term “metallacycle” refers to a cycloalkyl or a heterocycloalkyl wherein one of the ring atoms is replaced by a metal atom.

As used herein, the term “substituted,” when used to modify a chemical functional group, refers to the replacement of at least one hydrogen radical on the functional group with a substituent. Substituents can include, but are not limited to, alkyl, cycloalkyl, alkenyl, cycloalkenyl, alkynyl, heterocycloalkyl, heterocycloalkenyl, ether, polyether, thioether, polythioether, aryl, heteroaryl, hydroxyl, oxy, alkoxy, heteroalkoxy, aryloxy, heteroaryloxy, ester, thioester, carboxy, cyano, nitro, amino, amido, acetamide, and halo (e.g., fluoro, chloro, bromo, or iodo). When a chemical functional group includes more than one substituent, the substituents can be bound to the same carbon atom or to two or more different carbon atoms.

As used herein, “bidentate ligand” refers to a ligand that has two atoms that can coordinate directly to the metal center of a metal complex, e.g., a single molecule which can form two bonds to a metal center. Non-limiting examples of bidentate ligands include ethylenediamine, bipyridine, phenanthroline, and diphosphine.

A “neutral ligand,” as used herein, refers to a ligand that, when provided as a free molecule, does not bear a charge. Examples of neutral ligands include, but are not limited to, water, phosphines, ethers (e.g., tetrahydrofuran), and amines (e.g., pyridine, triethylamine, or the like). An “anionic ligand” refers to a ligand that, when provided as a free molecule, has a formal charge of −1. Examples of anionic ligands include, but are not limited to, chloride, methoxy, ethoxy, isopropoxy, tertbutoxy, tertbutyl, neopentyl, and cyclopentadienyl.

Compounds of the Disclosure

Provided herein are compounds having a structure represented by formula (I) or formula (II):

(I)

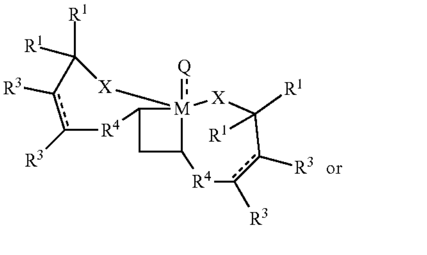

or

-continued (II)

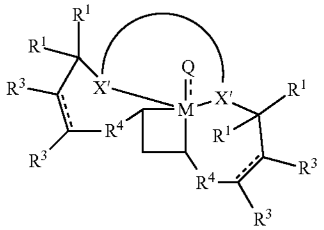

wherein the dashed lines are optional double bonds;

M is a transition metal;

Q is a neutral or anionic ligand;

each X is independently selected from S, O, $NR^5$, $N(R^5)_2$, $P(R^6)_2$, $C(R^7)_2$, $BR^{11}$, $Si(R^{12})_2$, Se, and Te;

each X' is independently selected from S, O, N, $NR^5$, P, $PR^6$, $CR^7$, B, $SiR^{12}$, Se, and Te;

wherein the curved line, together with each X' and M, form a metallacycle and the curved line represents a chain of 1 to 6 atoms independently selected from C, O, N, and S;

each $R^1$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^2$ is independently selected from H, $C_1$-$C_{22}$ alkyl, $C_4$—C cycloalkyl, and $Ar^1$;

each $R^3$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^3$ together with the carbon atoms to which they are attached, form a five- to eight-member cycloalkyl, aryl, heteroaryl, or heterocycloalkyl comprising 1 to 5 heteroatoms selected from O, N, and S;

each $R^4$ is independently selected from a bond, —$C(R^2)_2$—, or —$C(R^2)_2C(R^2)_2$— each $R^5$ is independently selected from $C_1$-$C_{22}$alkyl, $C_4$-$C_{10}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^5$ together with the atoms to which they are attached, form a five- to eight-member cycloalkyl, aryl, heteroaryl, or heterocycloalkyl comprising 1 to 5 heteroatoms selected from O, N, and S;

each $R^6$ is independently selected from $C_1$-$C_{22}$alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^6$ together with the atoms to which they are attached, form a five- to eight-member cycloalkyl, aryl, heteroaryl, or heterocycloalkyl comprising 1 to 5 heteroatoms selected from O, N, and S;

each $R^7$ is independently selected from H, $C_1$-$C_{22}$alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^7$ together with the atoms to which they are attached, form a fiveto eight-member cycloalkyl, aryl, heteroaryl, or heterocycloalkyl comprising 1 to 5 heteroatoms selected from O, N, and S; and, each $R^1$ and $R^{12}$ are independently selected from $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and C, $C_1$-$C_{20}$heterocycloalkyl comprising 1 to 5 heteroatoms selected from O, N, and S, or two vicinal $R^1$, or two vicinal $R^{12}$ together with the atoms to which they are attached, form a five- to eight-member cycloalkyl, aryl, heteroaryl, or heterocycloalkyl comprising 1 to 5 heteroatoms selected from O, N, and S;

each $Ar^1$ is independently selected from $C_6$-$C_{22}$aryl and a 5-12 membered heteroaryl comprising from 1 to 3 ring heteroatoms selected from O, N, and S.

In general, M is a transition metal. In embodiments, M is selected chromium (Cr), molybdenum (Mo), tungsten (W), iron (Fe), ruthenium (Ru), rhodium (Rh), iridium (Ir), and osmium (Os). In embodiments, M is Mo or W. In embodiments, M is Mo.

In general, Q is a neutral or anionic ligand. In embodiments, Q comprises one or more functional groups selected from the group of amine, amide, imide, phosphine, phosphite, phosphinite, phosphonite, N-heterocyclic carbene, hydroxyl, oxo, alkoxide, aryloxide, thiol, alkylthiol, arylthiol, nitride, carbene, alkyl, cycloalkyl, aryl, heteroaryl, and heterocycloalkyl.

In embodiments, Q is a neutral ligand. The neutral ligands of the disclosure are L-type ligands. L-type ligands are described in detail throughout Gray L. Spessard and Gary L. Miessler, Organometallic Chemistry, published by Oxford University Press, 2016, incorporated herein by reference. In embodiments, Q comprises $NH_3$, $N(R^5)_3$, $Ar^1$, $C_{1-6}$ hydroxyalkyl, $R^1OR^8$, $P(R^6)_3$, $R^8CHO$, $R^8COR^8$, $R^8COOR^B$, and $S(R^8)_2$. In embodiments, Q is $N(R^5)_3$, $P(R^6)_3$, $S(R^8)_2$ or $R^8OR^8$. In some cases, Q is selected from the group comprising diethyl ether, methyl tert-butyl ether (MTBE), diisopropyl ether, tetrahydrofuran (THF), dioxane and the like. In embodiments, Q can be pyridine or derivatives thereof, such as, N,N-dimethylaminopyridine. In embodiments, Q can comprise tetrahydrofuran or substituted versions thereof (e.g., substituted with 1-3 $C_{1-6}$alkyl groups), pyridine or derivatives thereof, or thiophene or substituted versions thereof (e.g., substituted with 1-3 groups selected from $C_{1-6}$alkyl, halo, CN, and $C_{1-6}$haloalkyl).

In embodiments, Q is an anionic ligand. In embodiments, Q is selected from the group consisting of halide, $C_1$-$C_{22}$alkyl, $C_2$-$C_{20}$amide, $C_7$-$C_{22}$alkoxy, $C_6$-$C_{20}$aryloxy, $C_1$-$C_{20}$heteroaryloxy comprising 1 to 5 heteroatoms selected from O, N, and S, $C_1$-$C_{20}$alkylthio, $C_6$-$C_{20}$arylthio, $C_1$-$C_{20}$heteroarylthio comprising 1 to 5 heteroatoms selected from O, N, and S, SCN, $ONO_2$, azide, OH, SH, isothiocyanate, nitrite, sulfite, cyanide, cyclopentadienyl, imidazolyl, and dimethylglyoximate. In embodiments, Q is selected from the group of $N(R^5)_2$, $N(R^5)$, $OR^8$, $SR^9$, O, carbene, N-heterocyclic carbene, $C_1$-$C_{22}$ alkyl, $C_4$-$C_{10}$ cycloalkyl, $Ar^1$, $C_1$-$C_{20}$heteroalkyl comprising 1 to 5 heteroatoms selected from O, N, and S, and $C_7$-$C_{20}$heterocycloalkyl comprising 1 to 5 heteroatoms selected from O, N, and S, wherein each of $R^8$ and $R^9$ are independently selected from $C_1$-$C_{22}$alkyl, $C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S. In embodiments, Q is selected from the group of $N(R^5)_2$, $N(R^5)$, $OR^8$, $SR^9$, O, S, carbene, and N-heterocyclic carbene. In embodiments, Q is selected from the group of 0, S, a carbene, an N-heterocyclic carbene, and $N(R^5)$. In embodiments, Q is $N(R^5)$.

In general, each X is independently selected from S, O, $NR^5$, $N(R^5)_2$, $P(R^8)_2$, $C(R^7)_2$, $BR^{11}$, $Si(R^{12})_2$, Se, and Te. In embodiments, each X is independently selected from O, $NR^5$, and $C(R^7)_2$. In embodiments, at least one X is selected from $BR^{11}$, $Si(R^{12})_2$, Se, and Te. In embodiments, each X is selected from $BR^{11}$, $Si(R^{12})_2$, Se, and Te. In embodiments, at least one X is selected from $BR^{11}$ and $Si(R^{12})_2$. In embodiments, at least one X is 0. In embodiments, at least one X is S. In embodiments, at least one X is $NR^5$. In embodiments, each X is O. In embodiments, each X is S. In embodiments, each X is $NR^5$.

In general, each X' is independently selected from S, O, N, $NR^5$, P, $PR^6$, $CR^7$; B, $SiR^{12}$, Se, and Te. In embodiments, each X' is independently selected from N, P, and $CR^7$. In embodiments, at least one X is selected from B, $SiR^{12}$, Se, and Te. In embodiments, each X' is selected from B, $SiR^{12}$, Se, and Te. In embodiments, at least one X' is selected from B or $SiR^{12}$. In embodiments, at least one X' is N or $CR^7$. In embodiments, each X' is $CR^7$. In embodiments, each X' is N.

In general, the curved line, together with each X and M, form a metallacycle, wherein the curved line represents a chain of 1 to 6 atoms independently selected from C, O, N, and S. In embodiments, the curved line, together with each X' and M, form a five membered, six membered, seven membered, or eight membered, metallacycle. In embodiments, the curved line represents a chain of 1 to 4 atoms independently selected from C, O, or N. In embodiments, the curved line represents a chain of 1 to 4 carbon atoms. In embodiments, the curved line represents a chain of 1 to 2 carbon atoms. It will be understood by those of ordinary skill in the art that the atoms represented by the curved line will have full valence shell and can include electron lone pairs, multiple bonds, and/or substituents as necessary to achieve the full valence shell. In some embodiments, the curved line represents $CH_2$, $CH_2CH_2$, $CH_2CH_2CH_2$, $CH_2CH_2CH_2CH_2$, $CH_2C(Me)_2CH_2$, $C(Me)_2C(Me)_2$, $C(Et)_2C(Et)_2$, $CH_2N(Me)_2CH_2$, $CH_2N(Et)_2N(Et)_2CH_2$, $CH_2OCH_2$, $CH_2SCH_2$, substituted derivatives thereof, or the like.

Generally, each $R^1$ can be independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S. In embodiments, each $R^1$ is independently selected from $C_1$-$C_{20}$alkyl, $C_1$-$C_{20}$haloalkyl, $C_4$-$C_{20}$cycloalkyl, or $Ar^1$. In embodiments, at least one $R^1$ is selected from $C_1$-$C_{20}$alkyl, $C_1$-$C_{20}$haloalkyl, $C_4$-$C_{20}$cycloalkyl, or $Ar^1$. In embodiments each $R^1$ is selected from $C_1$-$C_{20}$alkyl, $C_1$-$C_{20}$haloalkyl, $C_4$-$C_{20}$cycloalkyl, or $Ar^1$. In embodiments, at least one $R^1$ is $C_1$-$C_{20}$haloalkyl. In embodiments, at least two $R^1$ are $C_1$-$C_{20}$haloalkyl. In embodiments, each $R^1$ is $C_1$-$C_{20}$haloalkyl. In embodiments, at least one $R^1$ is $C_1$-$C_5$haloalkyl. In embodiments, each $R^1$ is $C_1$-$C_5$haloalkyl. In embodiments, at least one $R^1$ is $CF_3$. In embodiments, at least two $R^1$ are $CF_3$. In embodiments, each $R^1$ is $CF_3$. In embodiments, at least one $R^1$ is methyl. In embodiments, at least one $R^1$ is H. In embodiments, at least one $R^1$ is Me and at least one $R^1$ is H.

Generally, each $R^3$ can be independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or both $R^3$ together with the atoms to which they are attached, form a five- to eight-member cycloalkyl, aryl, heteroaryl comprising 1 to 5 heteroatoms selected from O, N, and S, or heterocycloalkyl comprising 1 to 5 heteroatoms selected from O, N, and S. In embodiments, at least one $R^3$ is $C_1$-$C_{20}$alkyl. In embodiments, each $R^3$ is independently $C_1$-$C_{20}$alkyl. In embodiments, two vicinal $R^3$ together with the atoms to which they are attached, form a five- to eight-member cycloalkyl, aryl, heteroaryl comprising 1 to 5 heteroatoms selected from O, N, and S, or heterocycloalkyl comprising 1 to 5 heteroatoms selected from O, N, and S. In embodiments, two vicinal $R^3$ together with the atoms to which they are attached, form a five- to eight-member cycloalkyl. In embodiments, two vicinal $R^3$ together with the atoms to which they are attached, form a five- to eight-member aryl. In embodiments, two vicinal $R^3$ together with the atoms to which they are attached, form phenyl.

Generally, each $R^4$ can be independently selected from a bond, —$C(R^2)_2$—, or —$C(R^2)_2C(R^2)_2$—. In embodiments, at least one $R^4$ is a bond. In embodiments, each $R^4$ is a bond. In embodiments, at least one $R^4$ is —$C(R^2)_2$—. In embodiments, each $R^4$ is —$C(R^2)_2$—.

Generally, each $R^5$ is independently selected from $C_1$-$C_{22}$ alkyl, $C_4$-$C_{10}$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^5$ together with the atoms to which they are attached, form a five- to eight-member cycloalkyl, aryl, heteroaryl, or heterocycloalkyl comprising 1 to 5 heteroatoms selected from O, N, and S. In embodiments, at least one $R^5$ is $C_1$-$C_{22}$ alkyl. In embodiments, each $R^5$ is independently $C_1$-$C_{22}$ alkyl. In embodiments, at least one $R^5$ is $C_1$-$C_6$ alkyl. In embodiments, at least one $R^5$ is $C_4$-$C_{10}$ cycloalkyl. In embodiments, at least one $R^5$ is adamantyl. In embodiments, each $R^5$ is adamantyl. In embodiments, at least one $R^5$ is $Ar^1$. In embodiments, each $R^5$ is independently $Ar^1$. In embodiments, at least one $R^5$ is a halogenated $Ar^1$. In embodiments, each $R^5$ is a halogenated $Ar^1$. In embodiments, at least one $R^5$ is a halogenated arene. In embodiments, each $R^5$ is a halogenated arene. In embodiments $R^5$ is phenyl, 1,3-diisopropylbenzene, 1,3-ditertbutylbenzene, or 1,3-cyclohexylbenzene. In embodiments, $R^5$ is 1,3-diisopropylbenzene. In embodiments, at least one $R^5$ is chiral and is independently selected from $C_1$-$C_{22}$ alkyl, $C_4$-$C_{10}$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^5$ together with the atoms to which they are attached, form a five- to eight-member cycloalkyl, aryl, heteroaryl, or heterocycloalkyl comprising 1 to 5 heteroatoms selected from O, N, and S.

In general, each $R^2$ is independently selected from H, $C_1$-$C_{22}$ alkyl, $C_4$-$C_8$ cycloalkyl, and $Ar^1$. In embodiments, $R^2$ is selected from $C_1$-$C_6$alkyl, $C_4$-$C_{10}$cycloalkyl, $Ar^1$, and H. In embodiments, at least one $R^2$ is H or $C_1$-$C_6$alkyl. In embodiments, each $R^2$ is H or $C_1$-$C_6$alkyl.

Generally, each $R^8$ is independently selected from $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^6$ together with the atoms to which they are attached, form a five- to eight-member cycloalkyl, aryl, heteroaryl, or heterocycloalkyl comprising 1 to 5 heteroatoms selected from O, N, and S. In embodiments, each $R^6$ is $C_1$-$C_{22}$alkyl, $C_4$-$C_8$ cycloalkyl, or $Ar^1$. In embodiments, at least one $R^6$ is $C_1$-$C_{22}$ alkyl. In embodiments, each $R^6$ is independently $C_1$-$C_{22}$ alkyl. In embodiments, at least one $R^6$ is $C_1$-$C_6$alkyl. In embodiments, each $R^6$ is $C_1$-$C_6$alkyl. In embodiments, at least one $R^6$ is $Ar^1$. In embodiments, each $R^6$ is independently $Ar^1$. In embodiments, each $R^6$ is phenyl.

In general, each $R^7$ is independently selected from H, $C_1$-$C_{22}$alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^7$ together with the atoms to which they are attached, form a five- to eight-member cycloalkyl, aryl, heteroaryl, or heterocycloalkyl comprising 1 to 5 heteroatoms selected from O, N, and S. In embodiments, each $R^7$ is $C_1$-$C_{22}$alkyl, $C_4$-$C_8$ cycloalkyl, or $Ar^1$. In embodiments, at least one $R^7$ is H or $C_1$-$C_{22}$alkyl. In embodiments, each $R^7$ is independently $C_1$-$C_{22}$ alkyl. In embodiments, at least one $R^7$ is $C_1$-$C_6$alkyl. In embodiments, each $R^7$ is $C_1$-$C_6$alkyl. In embodiments, at least one $R^7$ is $Ar^1$. In embodiments, each $R^7$ is independently $Ar^1$. In embodiments, each $R^7$ is methyl, ethyl, isopropyl, or tertbutyl.

Generally, each $Ar^1$ can be independently selected from $C_6$-$C_{22}$ aryl and a 5-12 membered heteroaryl comprising from 1 to 3 ring heteroatoms selected from O, N, and S.

Generally, each $R^8$ and $R^9$ are independently selected from $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^8$ or two vicinal $R^9$ together with the atoms to which they are attached, form a five- to eight-member cycloalkyl, aryl, heteroaryl, or heterocycloalkyl comprising 1 to 5 heteroatoms selected from O, N, and S.

Generally, each $R^{11}$ and $R^{12}$ are independently selected from $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{11}$, or two vicinal $R^{12}$ together with the atoms to which they are attached, form a five- to eight-member cycloalkyl, aryl, heteroaryl, or heterocycloalkyl comprising 1 to 5 heteroatoms selected from O, N, and S.

Provided herein are compounds selected from the group of:

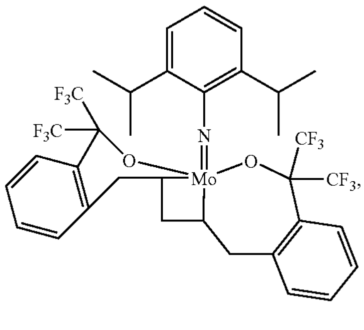

-continued
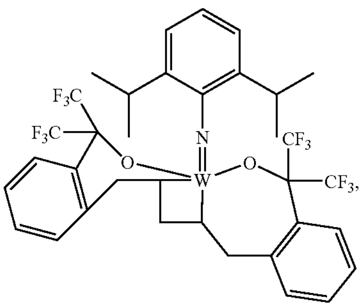
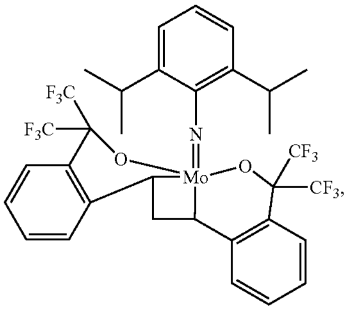
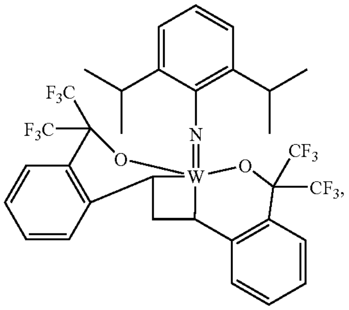
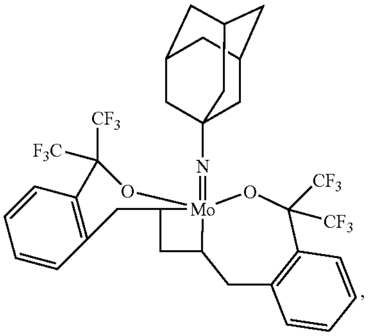
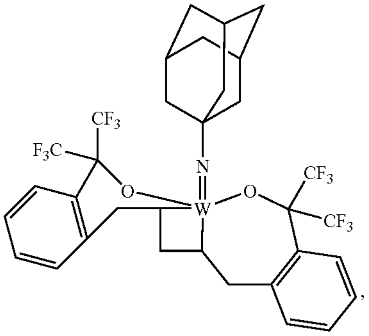
-continued
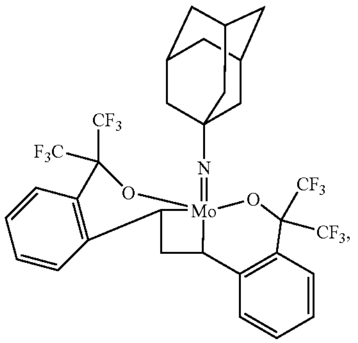
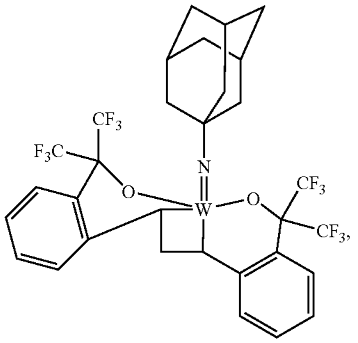
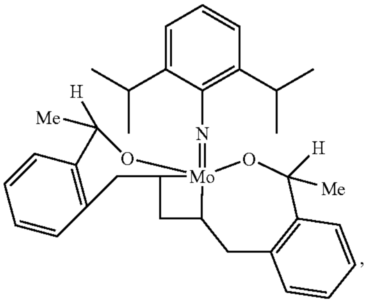
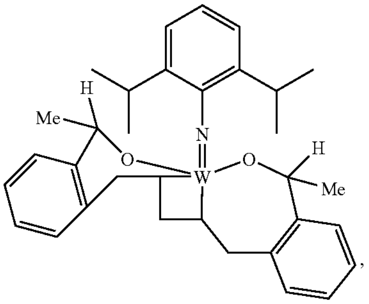
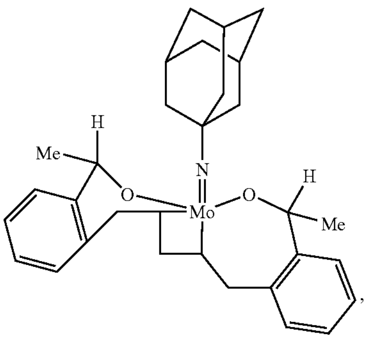

-continued

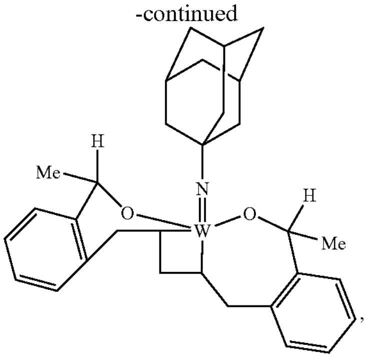

,

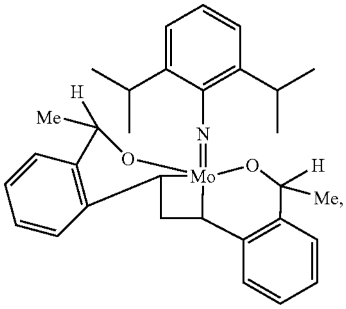

,

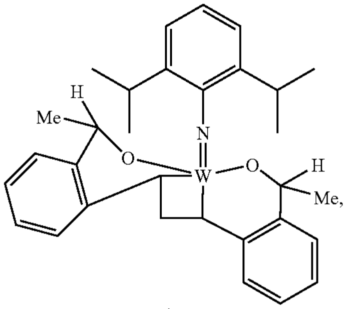

,

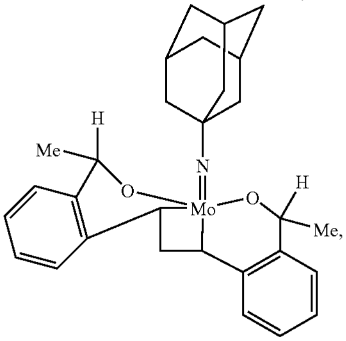

and

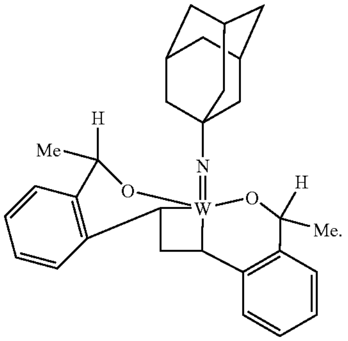

.

Figure 27:
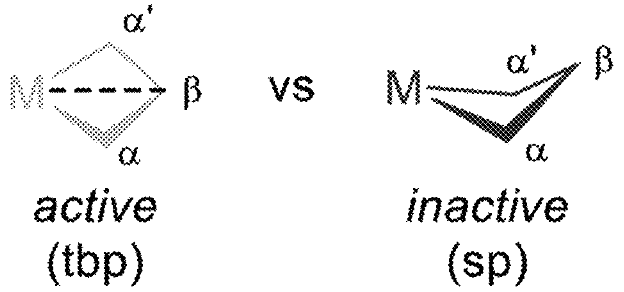
FIG. 27 is a scheme demonstrating the geometry of metallacyclobutanes.

In metallacyclobutanes, low-lying empty M-$C_\alpha$ $\pi$* orbitals are key features of an active intermediate. These $\pi$* orbitals are lower in energy due to the metal ion geometry coupling with the frontier orbitals within the metallacyclobutane. Trigonal bipyramidal (tbp) intermediates with flat rings are active while square pyramidal (sp) intermediates with bent rings are inactive, as shown in FIG. 27. Within a tbp metallacyclobutane, there is strong alkylidene character seen within the frontier orbitals, and the $C_\alpha$ is where this M=C character is retained, while the $C_\beta$ dramatically loses its original olefinic character. With this significant M=C double bond character there is less energy required for reorganization when an alkene and the alkylidene couple in [2+2]cyclo- and retro-cycloaddition. Conversely, sp metallacyclobutanes, which are considered inactive, tend to exhibit $sp^3$ carbon-like character.

The geometry of the metallacyclobutane can be observed in $^{13}C$ NMR spectroscopy. For trigonal bipyramidal intermediates, the $C_\alpha$ shift is seen at ~100 ppm, due to M=$C_\alpha$ character, while $C_\beta$ shifts are seen with a chemical shift close to 0 ppm. For square pyramidal intermediates, the $C_\alpha$ signals tend to be ~40 ppm, due to the $sp^3$ character of the $C_\alpha$, and the $C_\beta$ signals tend to be ~30 ppm.

Synthesizing Compounds of Formula (I)

The disclosure further provides a method of making the compound having a structure represented by formula (I) or formula (11), the method includes admixing a compound of formula (III) and a compound of formula (IV) or a compound of formula (V) under conditions sufficient to form the compound of formula (I) or formula (II):

(III)

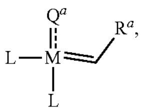

(IV)

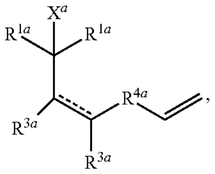

(V)

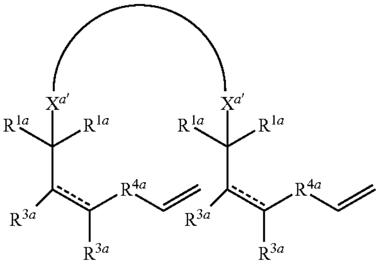

wherein the dashed lines are optional double bonds;

M is a transition metal;

$Q^a$ is a neutral or anionic ligand;

each $X^a$ is independently selected from SH, OH, $NHR^{5a}$, $NH(R^{5a})_2$, $PH(R^{6a})_2$, $CH(R^{7a})_2$, SeH, TeH, $BHR^{11a}$, and $SiH(R^{12a})_2$;

each $X^{a'}$ is independently selected from S, O, NH, $NHR^{5a}$, PH, $PHR^{6a}$, $CHR^{7a}$, BH, $SiHR^{12a}$, Se, and Te;

wherein the curved line represents a chain of 1 to 6 atoms, each atom independently selected from C, O, N, and S;

$R^a$ is selected from $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^{1a}$ is independently selected from H, $C_1$-$C_{20}$haloalkyl, $C_1$-$C_{20}$alkyl, $C_1$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^{2a}$ is independently selected from H, $C_1$-$C_{22}$ alkyl, $C_4$-$C_8$ cycloalkyl, and $Ar^{1a}$; each $R^{3a}$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{3a}$ together with the carbon atoms to which they are attached, form a five- to eight-member cycloalkyl, aryl, heteroaryl, or heterocycloalkyl comprising 1 to 5 heteroatoms selected from O, N, and S;

each $R^{4a}$ is independently selected from a bond, —C$(R^{2a})_2$—, or —C$(R^{2a})_2$C$(R^{2a})_2$— each $R^{5a}$ is independently selected from $C_1$-$C_{22}$alkyl, $C_4$-$C_{10}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{5a}$ together with the atoms to which they are attached, form a five- to eight-member cycloalkyl, aryl, heteroaryl, or heterocycloalkyl comprising 1 to 5 heteroatoms selected from O, N, and S;

each $R^{6a}$ is independently selected from $C_1$-$C_{22}$alkyl, $C_4$-$C_8$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{6a}$ together with the atoms to which they are attached, form a five- to eight-member cycloalkyl, aryl, heteroaryl, or heterocycloalkyl comprising 1 to 5 heteroatoms selected from O, N, and S;

each $R^{7a}$ is independently selected from H, $C_1$-$C_{22}$alkyl, $C_4$-$C_8$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{7a}$ together with the atoms to which they are attached, form a five- to eight-member cycloalkyl, aryl, heteroaryl, or heterocycloalkyl comprising 1 to 5 heteroatoms selected from O, N, and S;

each $R^{11a}$ and $R^{12a}$ are independently selected from $C_1$-$C_{22}$alkyl, $C_4$-$C_8$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{11a}$, or two vicinal $R^{12a}$ together with the atoms to which they are attached, form a five- to eight-member cycloalkyl, aryl, heteroaryl, or heterocycloalkyl comprising 1 to 5 heteroatoms selected from O, N, and S;

each L is independently a ligand; and, each $Ar^{1a}$ is independently selected from $C_6$-$C_{22}$aryl and a 5-12 membered heteroaryl comprising from 1 to 3 ring heteroatoms selected from O, N, and S.

In general, each L is independently a ligand (e.g., neutral ligand or anionic ligand). In embodiments, each L can be a neutral ligand or both L together can form a neutral bidentate ligand. In embodiments, each L can include a phosphine, phosphite, phosphinite, phosphonate, ether, thioether, amine, amide, imine, and five- or six-membered monocyclic groups containing 1 to 4 heteroatoms. The five- or six-membered monocyclic groups can include 1 to 4 heteroatoms, 1 to 3 heteroatom, or 1 to 2 heteroatoms, for example, pyridine, pyridazine, pyrimidine, pyrazine, triazine, pyrrole, pyrazole, imidazoletriazole, pyran, pyrone, dioxin, and furan. The five- or six-membered monocyclic groups can be substituted with halo, $C_1$-$C_{20}$alkyl, $C_1$-$C_{20}$heteroalkyl, $C_5$-$C_{24}$aryl, $C_5$-$C_{24}$heteroaryl, and functional groups, including but not limited to, $C_1$-$C_{20}$ alkoxy, $C_5$-$C_{24}$ aryloxy, $C_2$-$C_{20}$alkylcarbonyl, $C_6$-$C_{24}$ arylcarbonyl, carboxy, carboxylate, carbamoyl, carbamido, formyl, thioformyl, amino, nitro, and nitroso. Phosphine and amine ligands can include primary, secondary, and tertiary phosphines and amines. The phosphine and amine ligands can include 0 to 3 alkyl groups, 1 to 3 alkyl groups, or 1 to 2 alkyl groups selected from $C_1$-$C_{20}$alkyl. The phosphine and amine ligands can also include 0 to 3 aryl or heteroaryl groups, 1 to 3 aryl or heteroaryl groups, or 1 to 2 aryl or heteroaryl groups selected from five- and six-membered aryl or heteroaryl rings.

In embodiments, each L can be an anionic ligand or both L together can form an anionic bidentate ligand. In embodiments, each L is independently selected from the group consisting of halide, $C_1$-$C_{20}$alkyl, $C_2$-$C_{20}$amide, $C_1$-$C_{20}$alkoxy, $C_6$-$C_{20}$aryloxy, $C_1$-$C_{20}$heteroaryloxy comprising 1 to 5 heteroatoms selected from O, N, and S, $C_1$-$C_{20}$alkylthio, $C_6$-$C_{20}$arylthio, $C_1$-$C_{20}$heteroarylthio comprising 1 to 5 heteroatoms selected from O, N, and S, SCN, $ONO_2$, azide, —OH, —SH, isothiocyanate, nitrite, sulfite, cyanide, cyclopentadienyl, imidazolyl, and dimethylglyoximate. In embodiments, at least one L is a $C_1$-$C_{20}$alkoxy. In embodiments, each L is a $C_1$-$C_{20}$alkoxy. In embodiments, at least one L independently is a $C_1$-$C_5$alkoxy. In embodiments, each L independently is a $C_1$-$C_5$alkoxy. In embodiments, each L independently is tert-butoxide.

In general, $Q^a$ is a neutral or anionic ligand. In embodiments, $Q^a$ comprises one or more functional groups selected from the group of amine, amide, imide, phosphine, phosphite, phosphinite, phosphonite, N-heterocyclic carbene, hydroxyl, oxo, alkoxide, aryloxide, thiol, alkylthiol, arylthiol, carbene, alkyl, cycloalkyl, aryl, heteroaryl, and heterocycloalkyl.

In embodiments, $Q^a$ is a neutral ligand. The neutral ligands of the disclosure are L-type ligands. L-type ligands are described in detail throughout Gray L. Spessard and Gary L. Miessler, Organometallic Chemistry, published by Oxford University Press, 2016. In embodiments, $Q^a$ comprises $NH_3$, $N(R^{5a})_3$, $Ar^{1a}$, $C_{1-6}$ hydroxyalkyl, $R^{6a}OR^{5a}$, $P(R^{5a})_3$, $R^{6a}CHO$, $R^{6a}COR^{8a}$, $R^{8a}COOR^{8a}$, and $S(R^{8a})_2$. In embodiments, $Q^a$ is $N(R^{8a})_3$, $P(R^{8a})_3$, $S(R^{6a})_2$ or $R^{8a}OR^{8a}$. In some cases, $Q^a$ is selected from the group comprising diethyl ether, methyl tert-butyl ether (MTBE), diisopropyl ether, tetrahydrofuran (THF), dioxane and the like. In embodiments, $Q^a$ can be pyridine or derivatives thereof, such as, N,N-dimethylaminopyridine. In embodiments, $Q^a$ can comprise tetrahydrofuran or substituted versions thereof (e.g., substituted with 1-3 $C_{1-6}$alkyl groups), pyridine or derivatives thereof, or thiophene or substituted versions thereof (e.g., substituted with 1-3 groups selected from $C_{1-6}$alkyl, halo, CN, and $C_{1-6}$haloalkyl).

In embodiments, $Q^a$ is an anionic ligand. In embodiments, $Q^a$ is selected from the group consisting of halide, $C_1$-$C_{22}$alkyl, $C_2$-$C_{20}$amide, $C_1$-$C_{22}$alkoxy, $C_6$-$C_{20}$aryloxy, $C_1$-$C_{20}$heteroaryloxy comprising 1 to 5 heteroatoms selected from O, N, and S, $C_1$-$C_{20}$alkylthio, $C_6$-$C_{20}$arylthio, $C_1$-$C_{20}$heteroarylthio comprising 1 to 5 heteroatoms selected from O, N, and S, SCN, $ONO_2$, azide, —OH, —SH, isothiocyanate, nitrite, sulfite, cyanide, cyclopentadienyl, imidazolyl, and dimethylglyoximate. In embodiments, $Q^a$ is selected from the group of $N(R^{1a})_2$, $N(R^{5a})$, $OR^{8a}$, $SR^{9a}$, O, carbene, N-heterocyclic carbene, $C_1$-$C_{22}$alkyl, $C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S. In embodiments, $Q^a$ is selected from the group of $N(R^{5a})_2$, $N(R^{5a})$, $OR^{8a}$, $SR^{9a}$, O, S, carbene, and N-heterocyclic carbene. In embodiments, $Q^a$ is selected from the group of O, S, a carbene, an N-heterocyclic carbene, and $N(R^5)$. In embodiments, $Q^a$ is $N(R^{5a})$.

In general, each $X^a$ is independently selected from SH, OH, $NHR^{1a}$, $NH(R^{1a})_2$, $PH(R^{6a})_2$, $CH(R^{7a})_2$, SeH, TeH, $BHR^{11a}$, and $SiH(R^{12a})_2$. In embodiments, $X^a$ is OH or SH. In embodiments, $X^a$ is OH. In embodiments, $X^a$ is SH. In embodiments, $X^a$ is $NH(R^{5a})_2$. In embodiments, $X^a$ is $PH(R^{5a})_2$ or $CH(R^{7a})_2$. In embodiments, $X^a$ is $BHR^{11a}$ or $SiH(R^{12a})_2$.

In general, each $X^{a\prime}$ is independently selected from S, O, NH, $NHR^{1a}$, PH, $PHR^{8a}$, $CHR^{7a}$, BH, $SiHR^{12a}$, Se, and Te. In embodiments, each $X^{a\prime}$ is independently selected from S, O, NH, and PH. In embodiments, each $X^{a\prime}$ is independently selected from $NHR^{5a}$, $PHR^{1a}$, and $CHR^7$a. In embodiments, each $X^{a\prime}$ is NH or PH. In embodiments, each $X^{a\prime}$ is NH. In embodiments, $X^{a\prime}$ is BH or $SiHR^{12a}$.

In general, in reference to the compound of formula (V), the curved line represents a chain of 1 to 6 atoms independently selected from C, O, N, and S. In embodiments, the curved line represents a chain of 1 to 4 atoms independently selected from C, O, or N. In embodiments, the curved line represents a chain of 1 to 4 carbon atoms. In embodiments, the curved line represents a chain of 1 to 2 carbon atoms. It will be understood by those of ordinary skill in the art that the atoms represented by the curved line will have full valence shell and can include electron lone pairs, multiple bonds, and/or substituents as necessary to achieve the full valence shell. In some embodiments, the curved line represents $CH_2$, $CH_2CH_2$, $CH_2CH_2CH_2$, $CH_2CH_2CH_2CH_2$, $CH_2C(Me)_2CH_2$, $C(Me)_2C(Me)_2$, $C(Et)_2C(Et)_2$, $CH_2N(Me)_2CH_2$, $CH_2N(Et)_2N(Et)_2CH_2$, $CH_2OCH_2$, $CH_2SCH_2$, substituted derivatives thereof, or the like.

Generally, $R^a$ is selected from $C_1$-$C_{20}$alkyl, $C_2$-$C_{20}$alkenyl, $C_1$-$C_{20}$cycloalkyl, Aria, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S. In embodiments, $R^a$ is $C_1$-$C_{20}$alkyl or $Ar^{1a}$. In embodiments, $R^a$ is $C_1$-$C_{20}$alkyl. In embodiments, $R^a$ is —$C(CH_3)_2(Ph)$.

In general, each $R^{1a}$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S. In embodiments, each $R^{1a}$ is independently selected from $C_1$-$C_{20}$alkyl, $C_1$-$C_{20}$haloalkyl, $C_4$-$C_{20}$cycloalkyl, and $Ar^{1a}$. In embodiments, at least one $R^{1a}$ is selected from $C_1$-$C_{20}$alkyl, $C_1$-$C_{20}$haloalkyl, $C_4$-$C_{20}$cycloalkyl, and $Ar^{1a}$. In embodiments, each $R^{1a}$ is independently selected from $C_1$-$C_{20}$alkyl, $C_1$-$C_{20}$haloalkyl, $C_4$-$C_{20}$cycloalkyl, and $Ar^{1a}$. In embodiments, at least one $R^{1a}$ is $C_1$-$C_{20}$haloalkyl. In embodiments, at least two $R^{1a}$ are $C_1$-$C_{20}$haloalkyl. In embodiments, each $R^{1a}$ is $C_1$-$C_{20}$haloalkyl. In embodiments, at least one $R^{1a}$ is $CF_3$. In embodiments, at least two $R^{1a}$ are $CF_3$. In embodiments, each $R^{1a}$ is $CF_3$. In embodiments, at least one $R^1$ is methyl. In embodiments, at least one $R^1$ is H. In embodiments, at least one $R^1$ is Me and at least one $R^1$ is H.

Generally, each $R^{3a}$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{3a}$ together with the carbon atoms to which they are attached, form a five- to eight-member cycloalkyl, aryl, heteroaryl, or heterocycloalkyl comprising 1 to 5 heteroatoms selected from O, N, and S. In embodiments, at least one $R^{3a}$ is $C_1$-$C_{20}$alkyl. In embodiments, each $R^{3a}$ is independently $C_1$-$C_{20}$alkyl. In embodiments, two vicinal $R^{3a}$ together with the atoms to which they are attached, form a five- to eight-member cycloalkyl, aryl, heteroaryl comprising 1 to 5 heteroatoms selected from O, N, and S, or heterocycloalkyl comprising 1 to 5 heteroatoms selected from O, N, and S. In embodiments, two vicinal $R^{3a}$ together with the atoms to which they are attached, form a five- to eight-member cycloalkyl. In embodiments, both $R^{3a}$ together with the atoms to which they are attached, form a five- to eight-member aryl. In embodiments, two vicinal $R^{3a}$ together with the atoms to which they are attached, form phenyl.

Generally, $R^{4a}$ can be selected from a bond, —$C(R^{2a})_2$—, or —$C(R^{2a})_2C(R^{2a})_2$—. In embodiments, $R^{4a}$ is a bond. In embodiments, $R^{4a}$ is —$C(R^{2a})_2$—.

In general, each $R^{2a}$ is independently selected from H, $C_1$-$C_{22}$ alkyl, $C_4$-$C_8$ cycloalkyl, and $Ar^{1a}$. In embodiments, $R^{2a}$ is selected from $C_1$-$C_6$alkyl, $C_4$-$C_{10}$cycloalkyl, $Ar^{1a}$, and H. In embodiments, at least one $R^{2a}$ is H or $C_1$-$C_6$alkyl. In embodiments, each $R^{2a}$ is H or $C_1$-$C_6$alkyl. In embodiments, at least one $R^{2a}$ is H. In embodiments, each $R^{2a}$ is H.

In general, each $R^{5a}$ is independently selected from $C_1$-$C_{22}$ alkyl, $C_4$-$C_{10}$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{5a}$ together with the atoms to which they are attached, form a five- to eight-member cycloalkyl, aryl, heteroaryl, or heterocycloalkyl comprising 1 to 5 heteroatoms selected from O, N, and S. In embodiments, at least one $R^{5a}$ is $C_1$-$C_{22}$ alkyl. In embodiments, each $R^{5a}$ is independently $C_1$-$C_{22}$ alkyl. In embodiments, at least one $R^{5a}$ is $C_1$-$C_6$ alkyl. In embodiments, at least one $R^{5a}$ is $C_4$-$C_{10}$ cycloalkyl. In embodiments, at least one $R^{5a}$ is adamantyl. In embodiments, each $R^{5a}$ is adamantyl. In embodiments, at least one $R^{5a}$ is $Ar^{1a}$. In embodiments, each $R^{5a}$ is independently $Ar^{1a}$. In embodiments, at least one $R^{5a}$ is a halogenated $Ar^1$. In embodiments, each $R^{5a}$ is a halogenated $Ar^1$. In embodiments, at least one $R^a$ is a halogenated arene. In embodiments, each $R^{5a}$ is a halogenated arene. In embodiments $R^{5a}$ is phenyl, 1,3-diisopropylbenzene, 1,3-ditertbutylbenzene, or 1,3-cyclohexylbenzene. In embodiments, $R^{5a}$ is 1,3-diisopropylbenzene. In embodiments, at least one $R^{5a}$ is chiral and is independently selected from $C_1$-$C_{22}$ alkyl, $C_4$-$C_1$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{5a}$ together with the atoms to which they are attached, form a five- to eight-member cycloalkyl, aryl, heteroaryl, or heterocycloalkyl comprising 1 to 5 heteroatoms selected from O, N, and S.

Generally, each $R^{6a}$ is independently selected from $C_1$-$C_{22}$ alkyl, $C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{6a}$ together with the atoms to which they are attached, form a five- to eight-member cycloalkyl, aryl, heteroaryl, or heterocycloalkyl comprising 1 to 5 heteroatoms selected from O, N, and S. In embodiments, each $R^{6a}$ is $C_1$-$C_{22}$ alkyl, $C_4$-$C_8$ cycloalkyl, or Aria. In embodiments, at least one $R^{6a}$ is $C_1$-$C_{22}$ alkyl. In embodiments, each Rea is independently $C_1$-$C_{22}$ alkyl. In embodiments, at least one $R^{6a}$ is $C_1$-$C_6$alkyl. In embodiments, each $R^{6a}$ is $C_1$-$C_6$alkyl. In embodiments, at least one $R^{6a}$ is $Ar^{1a}$. In embodiments, each $R^{6a}$ is independently $Ar^{1a}$. In embodiments, each $R^{6a}$ is phenyl.

In general, each $R^{7a}$ is independently selected from H, $C_1$-$C_{22}$ alkyl, $C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{7a}$ together with the atoms to which they are attached, form a five- to eight-member cycloalkyl, aryl, heteroaryl, or heterocycloalkyl comprising 1 to 5 heteroatoms selected from O, N, and S. In embodiments, each $R^{7a}$ is $C_1$-$C_{22}$ alkyl, $C_4$-$C_8$ cycloalkyl, or Aria. In embodiments, at least one $R^{7a}$ is H or $C_1$-$C_{22}$ alkyl. In embodiments, each $R^{7a}$ is independently $C_1$-$C_{22}$ alkyl. In embodiments, at least one $R^{7a}$ is $C_1$-$C_6$alkyl. In embodiments, each $R^{7a}$ is $C_1$-$C_6$alkyl. In embodiments, at least one $R^{7a}$ is $Ar^{1a}$. In embodiments, each $R^{7a}$ is independently $Ar^{1a}$. In embodiments, each $R^{7a}$ is methyl, ethyl, isopropyl, or tertbutyl.

Generally, each $Ar^{1a}$ can be independently selected from $C_6$-$C_{22}$ aryl and a 5-12 membered heteroaryl comprising from 1 to 3 ring heteroatoms selected from O, N, and S.

Generally, each $R^{8a}$ and $R^{9a}$ are independently selected from $C_1$-$C_{22}$alkyl, $C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{8a}$ or two vicinal $R^{9a}$ together with the atoms to which they are attached, form a five- to eight-member cycloalkyl, aryl, heteroaryl, or heterocycloalkyl comprising 1 to 5 heteroatoms selected from O, N, and S.

Generally, each $R^{11a}$ and $R^{12a}$ are independently selected from $C_1$-$C_{22}$alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{11a}$, or two vicinal $R^{12a}$ together with the atoms to which they are attached, form a five- to eight-member cycloalkyl, aryl, heteroaryl, or heterocycloalkyl comprising 1 to 5 heteroatoms selected from O, N, and S.

In general, the compound of formula (III) and the compound of formula (IV) or the compound of formula (V) can be admixed under conditions sufficient to form the compound having a structure represented by formula (I) or the compound of formula (II). In embodiments, the admixing comprises a molar ratio of the compound of formula (III) and the compound of formula (IV) of at least about 1:1.9, respectively. In embodiments, the admixing comprises a molar ratio of the compound of formula (III) and the compound of formula (IV) of at least about 1:2, or about 1:2.1, or about 1:2.2, or about 1:2.3, or about 1:2.4, or about 1:2.5, respectively. In embodiments, the admixing comprises a molar ratio of the compound of formula (III) and the compound of formula (IV) in a range of about 1:1.9 to about 1:2.5, or about 1:1.9 to about 1:2.3, or about 1:2 to about 1:2.2, respectively. In general, increasing the concentration of the compound of formula (IV) can increase the rate the reaction to form the compound of formula (I); however, as the concentration of the compound of formula (IV) increases, the likelihood of intermolecular reactions also increases, such as, the aggregation of multiple metal complexes, or over ligation of the metal center with the compound of formula (IV).

In general, about two molar equivalents (e.g., at least 1.9 molar equivalents) of the compound of formula (IV) per molar equivalent of the compound of formula (III) can be used to form the compound of formula (I).

In embodiments, the admixing comprises a molar ratio of the compound of formula (III) and the compound of formula (V) of at least about 1:1, respectively. In embodiments, the admixing comprises a molar ratio of the compound of formula (III) and the compound of formula (V) of at least about 1:1, or about 1:1.1, or about 1:1.2, or about 1:1.3, or about 1:1.4, or about 1:1.5, respectively. In embodiments, the admixing comprises a molar ratio of the compound of formula (III) and the compound of formula (V) in a range of about 1:0.9 to about 1:1.5, or about 1:0.9 to about 1:1.3, or about 1:1 to about 1:1.2, respectively. In general, increasing the concentration of the compound of formula (V) can increase the rate the reaction to form the compound of formula (II); however, as the concentration of the compound of formula (V) increases, the likelihood of intermolecular reactions also increases, such as, the aggregation of multiple metal complexes, or over ligation of the metal center with the compound of formula (V).

In embodiments, the admixing of the compound of formula (III) and the compound of formula (IV) or formula (V) can occur neat, for example, in cases where the compound of formula (IV) or formula (V) is a liquid. In embodiments, the admixing of the compound of formula (III) and the compound of formula (IV) or formula (V) can occur in solution. Suitable solvents include, but are not limited to, nonpolar aprotic solvents, such as, but not limited to, benzene, toluene, hexanes, pentanes, dichloromethane, trichloromethane, chloro-substituted benzenes, deuterated analogs of the foregoing and combinations of the foregoing. As will be understood by one of ordinary skill in the art, polar aprotic solvents may also be suitable provided they do not compete with the coordination of the compound of formula (IV) or formula (V) at the metal center. Suitable polar aprotic solvents can include, but are not limited to, diethyl ether, ethyl acetate, acetone, dimethylformamide, dimethoxyethane, tetrahydrofuran, acetonitrile, dimethyl sulfoxide, nitromethane, propylene carbonate, deuterated analogs of the foregoing, and combinations of the foregoing.

The admixing of the compound of formula (III) and the compound of formula (IV) and formula (V) can occur at any suitable temperature for any suitable time. It is well understood in the art that the rate of a reaction during admixing can be controlled by tuning the temperature. Thus, in general, as the reaction temperature increases the reaction time can decrease.

Reaction temperatures can be in a range of about −80° C. to about 100° C., about −70° C. to about 80° C., about −50° C. to about 75° C., about −25° C. to about 50° C., about 0° C. to about 35° C., about 5° C. to about 30° C., about 10° C. to about 30° C., about 15° C. to about 25° C., about 20° C. to about 30° C., or about 20° C. to about 25° C., for example, about 0° C., about 5° C., about 10° C., about 15° C., about 20° C., about 25° C., about 30° C., or about 35° C. Reaction times can be instantaneous or in a range of about 30 seconds to about 72 hours, about 1 minute to about 72 hours, about 5 minutes to about 72 hours, about 10 minutes to about 48 hours, about 15 minutes to about 24 hours, about 1 minute to about 24 hours, about 5 minutes to about 12 hours, about 10 minutes to about 6 hours, about 20 minutes to about 1 hour, about 20 minutes (min) to about 12 hours (h), about 25 min to about 6 h, or about 30 min to about 3 h, for example, about 30 seconds, 1 min, 5 min, 10 min, 15 min, 20 min, 25 min, 30 min, 35 min, 40 min, 45 min, 50 min, 55 min, 60 min, 75 min, 90 min, 105 min, 2 h, 3 h, 4 h, 5 h, 6 h, 12 h, 18 h, 24 h, 36 h, 48 h, 60 h, or 72 h. When the reaction temperature increases above 100° C., generally the risk of decomposition of the product increases.

Methods of Using Compounds of Formula (I)

The disclosure further provides a method of preparing a cyclic polymer, the method including admixing a plurality of alkene monomers, alkyne monomers, or both in the presence of the compound of formula (I) or the compound of formula (II) under conditions sufficient to polymerize the plurality of alkene monomers, alkyne monomers, or both to form the cyclic polymer.

Cyclic polymers can be prepared from any monomer that includes a carbon-carbon double bond or a carbon-carbon triple bond. In embodiments, the admixing comprises a plurality of alkyne monomers. In embodiments, the admixing comprises a plurality of alkene monomers.

Suitable alkyne monomers include, but are not limited to, $C_2$-$C_{20}$alkynyl, $C_8$-$C_{20}$ monocyclic cycloalkynes, 8-20 membered monocyclic heterocycloalkynes comprising one to five ring heteroatoms selected from S, O, and N, $C_8$-$C_{20}$polycyclic cycloalkynes, or 8-20 membered polycyclic heterocycloalkynes comprising one or more ring heteroatoms selected from S, O, and N. The alkyne monomers can be substituted or unsubstituted. For example, the plurality of alkyne monomers can include phenylacetylene.

Suitable alkene include, but are not limited to, $C_3$-$C_{20}$alkenyl, $C_5$-$C_{20}$ monocyclic cycloalkenes, 5-20 membered monocyclic heterocycloalkenes comprising one to five ring heteroatoms selected from S, O, and N, $C_5$-$C_{20}$polycyclic cycloalkenes, or 5-20 membered polycyclic heterocycloalkenes comprising one or more ring heteroatoms selected from S, O, and N. The alkene monomers can be substituted or unsubstituted. For example, the plurality of alkene monomers can include norbornene.

The polymerization reaction occurs upon combining in a fluid state the compound having a structure according to formula (I) or the compound having a structure according to formula (II) and the plurality of alkenes, alkynes, or both. In some embodiments the reaction can be in neat alkene, alkyne, or both, wherein the monomers are provided in a fluid state. In some embodiments, the reaction can include a solvent such that the fluid state can be in solution.

Examples of solvents that may be used in the polymerization reaction include, but are not limited to, organic (e.g., nonpolar aprotic solvents) that are inert under the polymerization conditions, such as aromatic hydrocarbons, halogenated hydrocarbons, ethers, aliphatic hydrocarbons, or mixtures thereof. In embodiments, the solvent is a nonpolar aprotic solvent. In embodiments, the nonpolar aprotic solvent comprises benzene, toluene, hexanes, pentanes, dichloromethane, trichloromethane, chloro-substituted benzenes, deuterated analogs thereof, or combinations thereof.

The polymerization can be carried out at, for example, ambient temperatures (e.g., about 20° C. to about 25° C.) at dry conditions (e.g., about 0-1% RH) under an inert atmosphere (e.g., nitrogen or argon). Polymerization temperatures can be in a range of about −80° C. to about 100° C., about −70° C. to about 80° C., about −50° C. to about 75° C., about −25° C. to about 50° C., about 0° C. to about 35° C., about 5° C. to about 30° C., about 10° C. to about 30° C., about 15° C. to about 25° C., about 20° C. to about 30° C., or about 20° C. to about 25° C., for example, about 0° C., about 5° C., about 10° C., about 15° C., about 20° C., about 25° C., about 30° C., or about 35° C. Reaction times can be instantaneous or otherwise until completion. The progress of the reaction can be monitored by standard techniques, e.g., nuclear magnetic resonance (NMR) spectroscopy. In embodiments, the reaction times are in a range of about 30 seconds to about 72 hours, about 1 minute to about 72 hours, about 5 minutes to about 72 hours, about 10 minutes to about 48 hours, about 15 minutes to about 24 hours, about 1 minute to about 24 hours, about 5 minutes to about 12 hours, about 10 minutes to about 6 hours, about 20 minutes to about 1 hour, about 30 minutes (min) to about 12 hours (h), about 1 hour to about 10 hours, about 1 hour to 3 hours, about 25 min to about 6 h, or about 30 min to about 3 h, for example, about 30 seconds, 1 min, 5 min, 10 min, 15 min, 20 min, 25 min, 30 min, 35 min, 40 min, 45 min, 50 min, 55 min, 60 min, 75 min, 90 min, 105 min, 2 h, 3 h, 4 h, 5 h, 6 h, 12 h, 18 h, 24 h, 36 h, 48 h, 60 h, or 72 h. Polymerization times will vary, depending on the particular monomer and the metal complex. The rate of the reaction can decrease if the temperature of the polymerization is below room temperature. Reactions that occur over 100° C. can lead to the catalyst decomposing.

The method of preparing cyclic polymers includes the plurality of alkene monomers, alkyne monomers, or both, and the compound of formula (I) or the compound of formula (II) in a molar ratio in a range of about 1,000,000:1 to about 10:1, or about 100,000:1 to about 50:1, or about 50,000:1 to about 100:1, or about 50,000:1 to about 500:1, or about 50,000:1 to about 100:1, respectively. For example, the molar ratio of the plurality of alkene monomers, alkyne monomers, or both, to the compound of formula (I) or the compound of formula (II) is about 1,000,000:1, about 500,000:1, about 100,000:1, about 50,000:1, about 25,000:1, about 10,000:1, about 5,000:1, about 1000:1, about 500:1, or about 100:1.

The cyclic polymer product can have a percentage of cis double bonds in a range of about 50% to about 99.99%, or about 50% to about 99%, or about 50% to about 95%, or about 60% to about 90%, or about 65% to about 90%, or about 70% to about 85%, or about 70% to about 80%.

Polymerization may be terminated at any time by addition of a solvent effective to precipitate the polymer, for example, methanol. The precipitated polymer may then be isolated by filtration or other conventional means.

The molecular weight of the cyclic polymers can be small, equivalent to oligomers of three to ten repeating units, or the molecular weights can be of any size up to tens and hundreds of thousands or millions in molecular weight, for example, in a range of about 200 Da to about 5,000,000 Da, about 500 Da to about 4,000,000 Da, about 1,000 Da to about 3,000,000 Da, about 5,000 Da to about 2,000,000 Da or about 10,000 to about 1,000,000 Da. The molecular weight is measured using gel permeation chromatography (GPC) and is calculated in number averaged molecular weight.

EXAMPLES

Materials and Methods

Compound 1 (shown in the scheme in Example 1) was purchased from Strem Chemicals (Schrock, R. R.; Murdzek, J. S.; Bazan, G. C.; Robbins, J.; DiMare, M.; O'Regan, *J. Am. Chem. Soc.* 1990, 112, 3875-3886) and used without further purification. $Mo(CHCMe_2Ph)(NAd)(OSO_2CF_3)_2$(DME) was synthesized according to literature procedures (Oskam, J. H.; Fox, H. H.; Yap, K. B.; McConville, D. H.;

ODell, R.; Lichtenstein, B. J.; Schrock, R. R. *J. Organomet. Chem.* 1993, 459 (1-2), 185-198). 1,1,1,3,3,3-Hexafluoro-2-phenyl-2-propanol and allyl chloride were purchased from commercial vendors and reacted together to generate compound 2 (shown below in the scheme in Example 1). (R)-phenylethanol was purchased from commercial vendors and reacted with allyl chloride to generate compound 2' (shown below in the scheme in Example 3). 1,1,1,3,3,3-Hexafluoro-2-phenyl-2-propanol and (R)-phenylethanol were stored over 3 Å molecular sieves. Pentane, toluene, tetrahydrofuran (THF), diethyl ether ($Et_2O$), acetonitrile and benzene ($C_6H_6$) were dried using a GlassContours drying column and stored over 3 Å molecular sieves. Benzene-$d_6$ (Cambridge Isotopes) was dried over sodium-benzophenone ketyl, distilled, and stored over 3 Å molecular sieves. Chloroform-$d_1$ (Cambridge Isotopes) was dried over $CaH_2$, vacuum transferred and stored over 3 Å molecular sieves.

Example 1—Synthesis of the Compound of Formula (I)

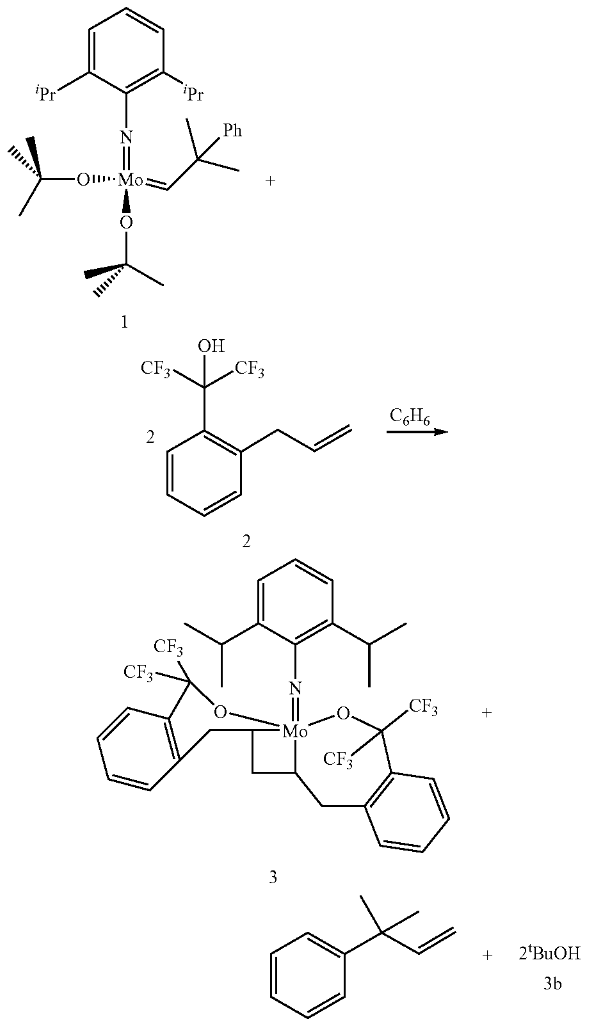

1
2
2
3
3a
$2^tBuOH$
3b

In a nitrogen filled glovebox, a 20 mL glass vial was charged with Schrock's Catalyst (1) (90.0 mg, $1.64\times10^{-4}$ mol, 1 equiv) and dissolved in 1.00 ml of benzene, resulting in a first solution. In another vial, 2-(2-allylphenyl)-1,1,1,3,3,3-hexafluoropropan-2-ol (2, 93.1 mg, $3.27\times10^{-4}$ mol, 2.0 equiv) was dissolved in 1.00 mL of benzene resulting in a second solution. The first solution containing (1) was added dropwise to the colorless ligand solution (2) at room temperature. The resulting reaction mixture was then stirred at room temperature for 30 minutes. The reaction mixture was then stripped for 4 h under dynamic vacuum to remove the volatiles (3a and 3b) that were generated in situ. The remaining solid was then triturated three times using pentane to yield molybdenum metallacyclobutane complex (3) (125 mg, 93%). The solid was then dissolved in minimum amount of a 1:1 mixture of acetonitrile and diethyl ether and kept at −35° C. After 24 h, reddish-brown precipitate forms which was filtered and dried under dynamic vacuum. Single crystals amenable to X-ray diffraction deposited upon cooling a concentrated 1:1 toluene:pentane solution of 3 to −35° C. (analytically pure material yield 58%).

Figure 16:
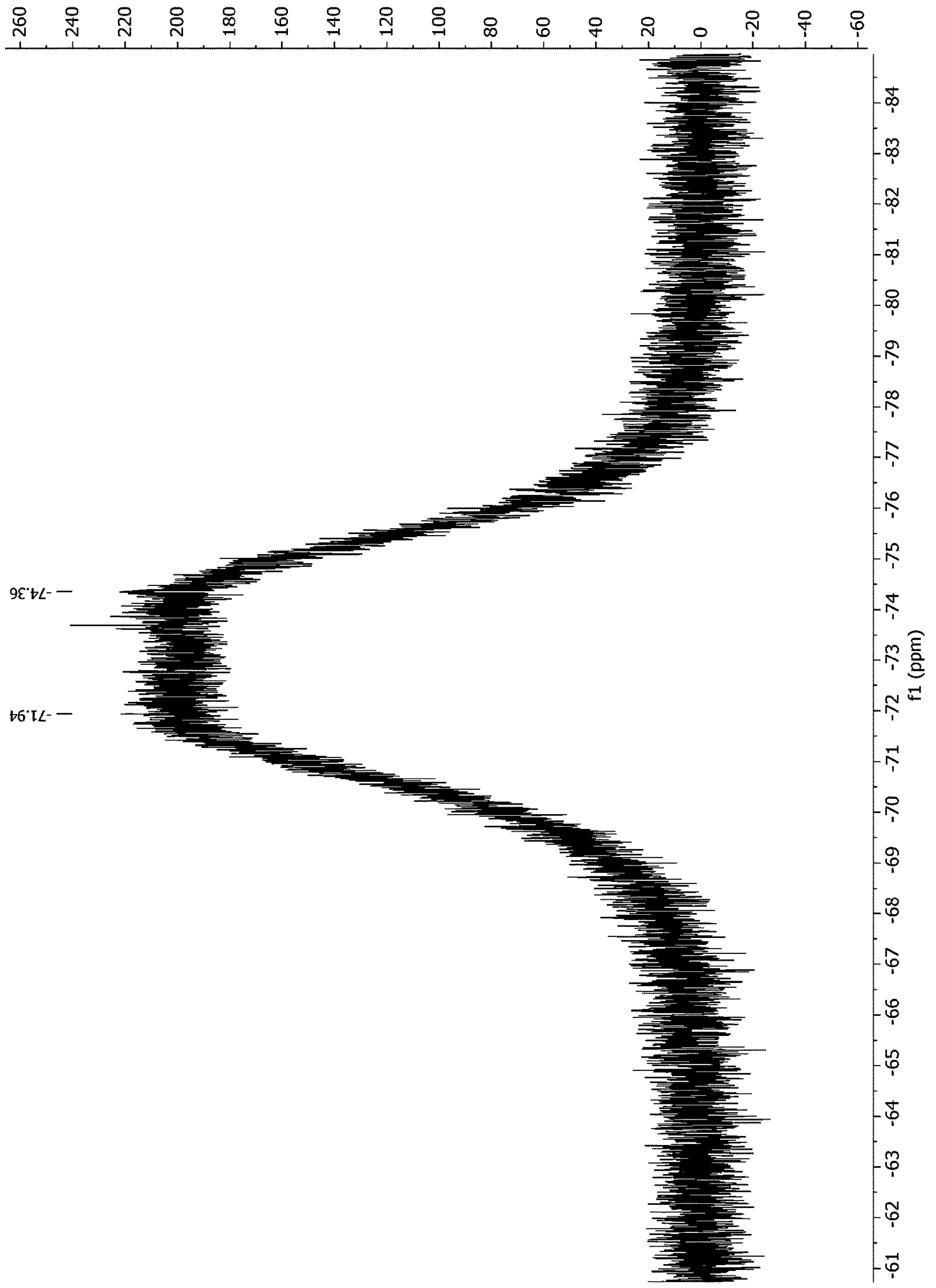
FIG. 16 is a 19F NMR spectrum of a compound of formula (I) of the disclosure, molybdenum metallacyclobutane complex 3, in $C_6D_6$ at 25° C. at 376.2 MHz.
Figure 17:
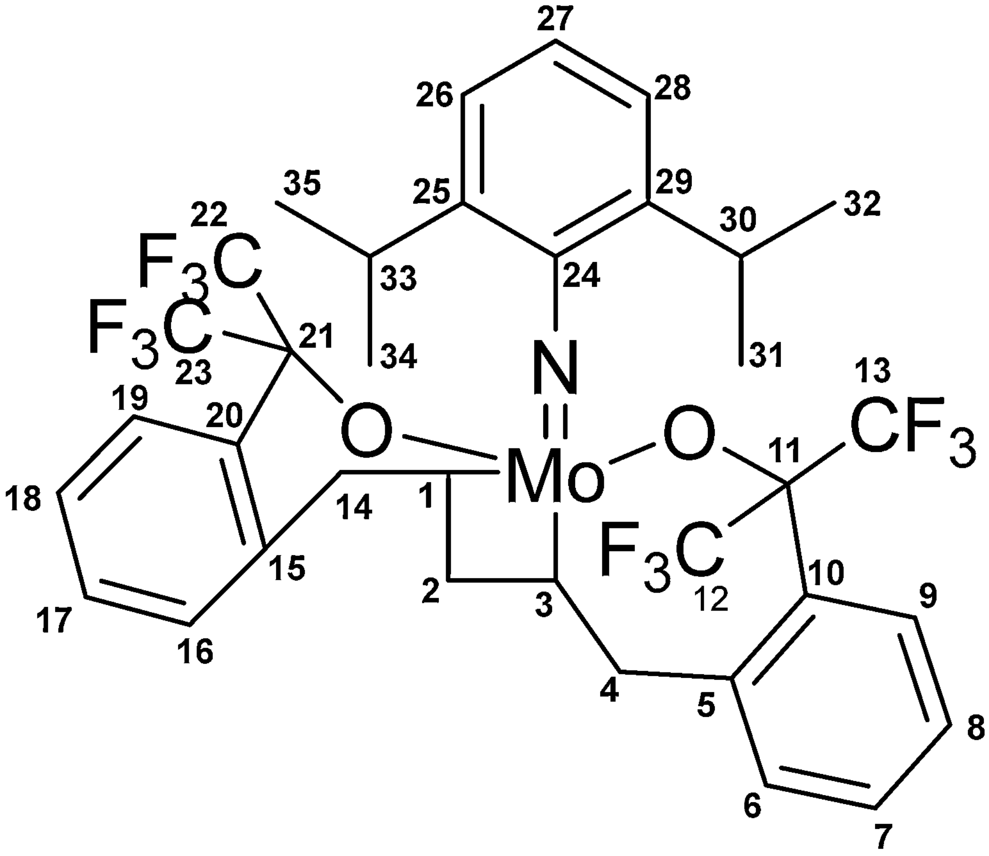
FIG. 17 is a chemical structure of a compound of the disclosure, molybdenum metallacyclobutane complex 3.
Figure 18:
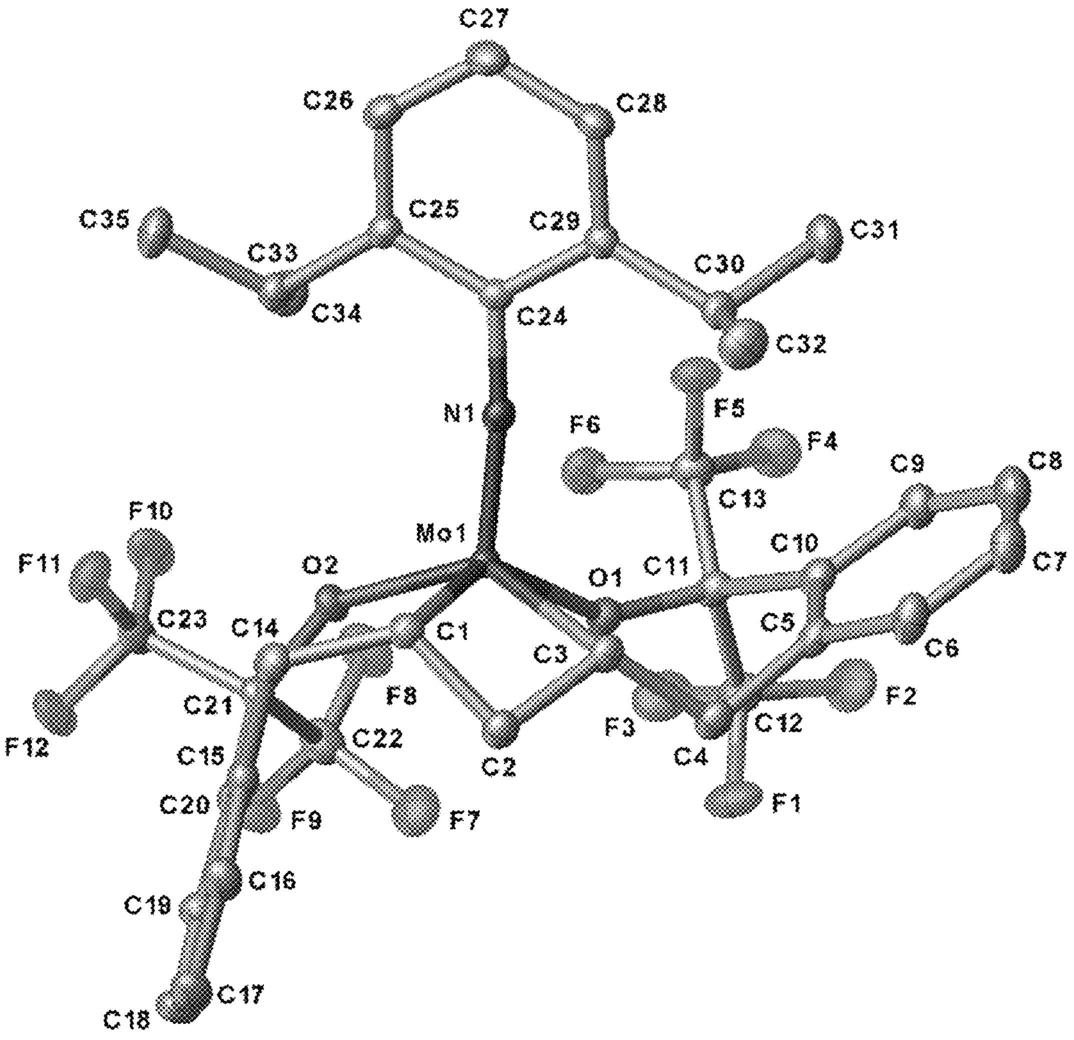
FIG. 18 is a solid-state molecular structure of a compound of the disclosure, molybdenum metallacyclobutane complex 3.
Figure 19:
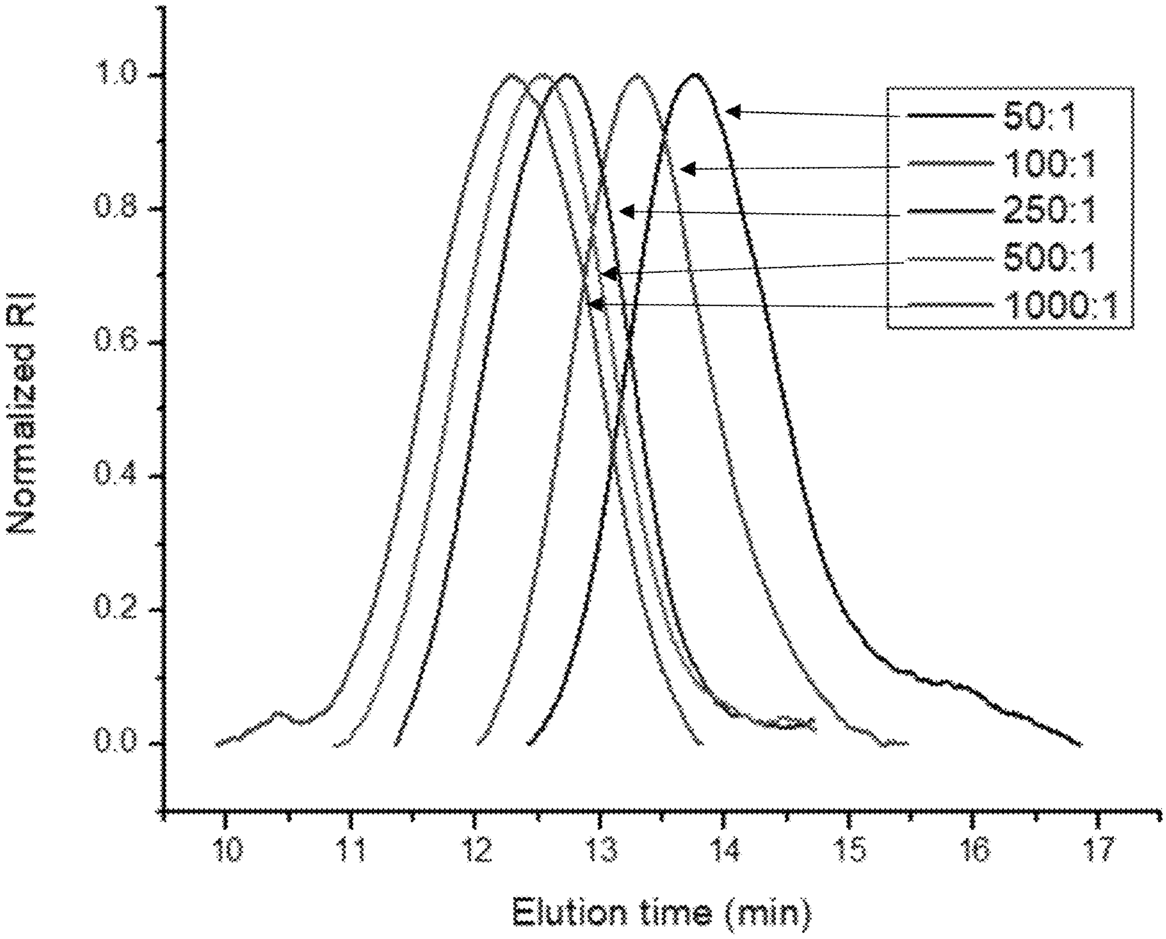
FIG. 19 is the Gel permeation chromatography (GPC) traces of cyclic poly(norbornene) synthesized by molybdenum metallacyclobutane complex 3.

Complex 3 was characterized via 1 D and 2D NMR techniques, such as shown in FIGS. 1-16. Broad signals in $^1H$ NMR spectrum (FIG. 1, top spectrum) and $^{19}F$ NMR spectrum (FIG. 16) of complex 3 in $C_6D_6$ obtained at ambient temperature signify the complex is undergoing dynamic processes. Lowering the temperature to −60° C. using toluene-$d_8$ as the solvent resolves the signals. FIGS. 1-16 were used to assign the chemical shifts and characterize the compound structure as described in Table 1 and shown in FIGS. 17 and 18. In Table 1, "nm" means "not measured" because the indicated atom lacks cross-peaks with protons in the gHMBC spectrum.

TABLE 1

| Atom | δ (ppm) |
|---|---|
| H1 | 2.81 |
| H2' | 3.05 |
| H2" | 1.62 |
| H3 | 2.36 |
| H4' | 2.99 |
| H4" | 3.41 |
| H6 | 6.59 |
| H7 | 6.84 |
| H8 | 6.72 |
| H9 | 7.43 |
| H14' | 4.23 |
| H14" | 3.34 |
| H16 | 6.66 |
| H17 | 6.98 |
| H18 | 6.86 |
| H19 | 7.84 |
| H26 | 6.79 |
| H27 | 6.91 |
| H28 | 6.75 |
| H30 | 2.62 |
| H31 | 0.98 (3H) |
| H32 | 0.60 (3H) |
| H33 | 3.87 |
| H34 | 1.43 (3H) |
| H35 | 1.31 (3H) |
| Atom | δ (ppm) |
| C1 | 44.37 |
| C2 | 26.32 |
| C3 | 48.20 |
| C4 | 42.16 |
| C5 | 142.24 |
| C6 | 132.66 |
| C7 | 129.93 |

TABLE 1-continued

| | |
|---|---|
| C8 | 126.76 |
| C9 | 127.66 |
| C10 | 129.56 |
| C11 | 88.74 |
| C12 | nm |
| C13 | nm |
| C14 | 42.02 |
| C15 | 140.77 |
| C16 | 134.76 |
| C17 | 130.19 |
| C18 | 127.30 |
| C19 | 128.75 |
| C20 | 128.96 |
| C21 | 88.31 |
| C22 | nm |
| C23 | nm |
| C24 | 152.96 |
| C25 | 150.11 |
| C26 | 123.18 |
| C27 | 129.69 |
| C28 | 122.85 |
| C29 | 147.33 |
| C30 | 28.35 |
| C31 | 27.42 |
| C32 | 21.32 |
| C33 | 29.68 |
| C34 | 23.90 |
| C35 | 22.10 |

Example 2—Polymerization of Alkenes and Alkynes

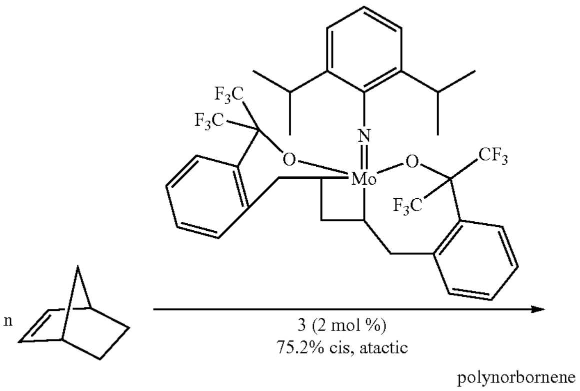

Synthesis of Cyclic Polynorbornene: In a nitrogen-filled glovebox, a stock solution was prepared from 3 (30.0 mg) in toluene (3 mL). A 20 mL vial was then charged with norbornene (50.0 mg, $5.31\times10^{-4}$ mol, 100 equiv) in 1.08 mL of toluene. A volume of 0.437 mL (4.37 mg, $5.31\times10^{-6}$ mol, 1 equiv) of stock solution of 3 was added to the vigorously stirred norbornene solution and the reaction was allowed to stir for 5 h at ambient temperature (about 20-25° C.). After this period, the reaction vessel was brought outside the glovebox, and the reaction mixture was added to stirring methanol. Polynorbornene precipitated as a white solid and was isolated by filtration and dried overnight under vacuum (47.2 mg, 95% yield, 75% cis, atactic). $^1H$ and $^{13}C\{^1H\}$ NMR spectral assignments were consistent with previous reports (Nadif, S. S.; Kubo, T.; Gonsales, S. A.; VenkatRamani, S.; Ghiviriga, I.; Sumerlin, B. S.; Veige, A. S. *J. Am. Chem. Soc.* 2016, 138, 6408-6411). A number of experiments were run to determine what the relationship of the ratio of catalyst to monomer was on the product. As shown below in Table 2, as the amount of catalyst decreases compared to monomer, the yield very slightly decreases even between a 50:1 monomer to catalyst ratio and a 1000:1 monomer to catalyst ratio. In addition, as the amount of catalyst decreases compared to monomer, the % of cis double bonds in the product also stays consistent no matter what the monomer to catalyst ratio is.

TABLE 2

Polymerization of Norbornene[a] by Catalyst 3 with different Monomer/Catalyst Ratios

| $[mon]/[cat]_0$ | $[mon]_0^b$ | Yield (%) | % cis[c] | $M_n^e$ (g/mol) | $M_w/M_n^e$ |
|---|---|---|---|---|---|
| 50:1 | 0.35 | 96 | 75 | 8,500 | 4.10 |
| 100:1 | 0.35 | 95 | 75 | 30,700 | 1.99 |
| 250:1 | 0.35 | 93 | 76 | 65,600 | 2.29 |
| 500:1 | 0.35 | 92 | 75 | 59,900 | 3.04 |
| 1000:1 | 0.35 | 91 | 74 | 82,600 | 2.95 |

[a]The appropriate amount of a 10 mg/mL solution of catalyst dissolved in toluene is added to 50 mg of norbornene dissolved in toluene and stirred for 5 h at room temperature.
[b]mol L-1.
[c]Determined gravimetrically.
[d]Determined by $^1H$ NMR spectroscopy.
[e]Determined by size-exclusion chromatography (SEC) using dichlorobenzene as the mobile phase at 140° C. with a conventional calibration based on narrow polystyrene standards..

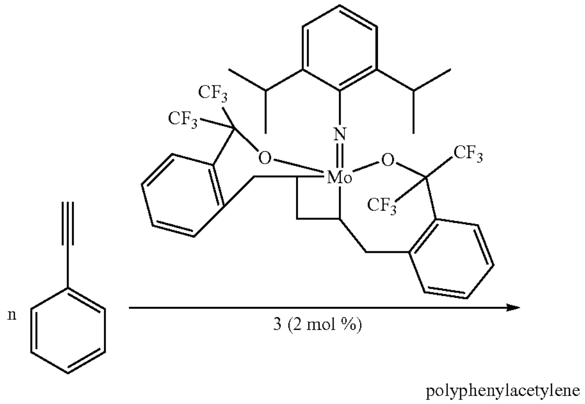

Synthesis of Cyclic Polyphenylacetylene: In a nitrogen filled glovebox, a 20 mL glass vial was charged with phenylacetylene (31.0 mg, $3.04\times10^{-4}$ mol, 50 equiv) and dissolved in 1.00 ml of benzene. In another vial, complex (3) (5.00 mg, $6.07\times10^{-6}$ mol, 1.0 equiv) was dissolved in 0.50 mL of benzene and the resulting solution was added to the vial containing the phenylacetylene solution. The resulting orange reaction mixture was stirred at room temperature. After 24 h of stirring, the mixture was added to stirring diethyl ether. Polyphenylacetylene precipitated as an orange solid and was isolated by filtration and dried overnight under vacuum (26.4 mg, 85%). $^1H$ spectral assignments were consistent with literature reports (Roland, C. D.; Li, H.; Abboud, K. A.; Wagener, K. B.; Veige, A. S. Cyclic polymers from alkynes. *Nature Chem.* 2016, 8, 791-796). As shown below in Table 3, as the amount of catalyst decreases compared to monomer, the yield slightly decreases between a 50:1 monomer to catalyst ratio having a yield of 84%, and a 500:1 monomer to catalyst ratio having a ratio of 71%.

TABLE 3

| Polymerization of Phenylacetylene[a] by Catalyst 3 with different Monomer/Catalyst Ratios | | |
|---|---|---|
| $[mon]/[cat]_0$ | $[mon]_0$[b] | Yield (%) |
| 50:1 | 0.35 | 84 |
| 100:1 | 0.35 | 80 |
| 250:1 | 0.35 | 80 |
| 500:1 | 0.35 | 71 |

[a]The appropriate amount of a 1 mg/mL solution of catalyst dissolved in toluene is added to 70 mg of phenylacetylene dissolved in toluene and stirred for 24 h at room temperature.
[b]mol L−1.

Polymerization Trials with other monomers in a reaction with catalyst 3.

The reactions of various alkynes and catalyst 3 were performed in benzene-$d_6$ at room temperature. No polymerization was observed for 3-hexyne, cyclohexene and cis-cyclooctene even at elevated temperatures. The results of the alkyne polymerization reactions are shown below in Table 4.

TABLE 4

| Polymerization of various Alkynes by Catalyst 3 | | | |
|---|---|---|---|
| Monomer | $[mon]/[cat]_0$ | Product | Yield (%) |
| 1-Pentyne | 100:1 | Poly(1-pentyne)[4] | 66 |
| 1-Hexyne | 100:1 | Poly(1-hexyne) | 58 |
| 3-Hexyne | 100:1 | No reaction | — |
| 1-Nonyne | 100:1 | Poly(1-nonyne) | 60 |
| 1-Undecyne | 100:1 | Poly(1-undecyne) | 29 |
| Cyclohexene | 100:1 | No reaction | — |
| cis-cyclooctene | 100:1 | No reaction | — |

Figure 20:
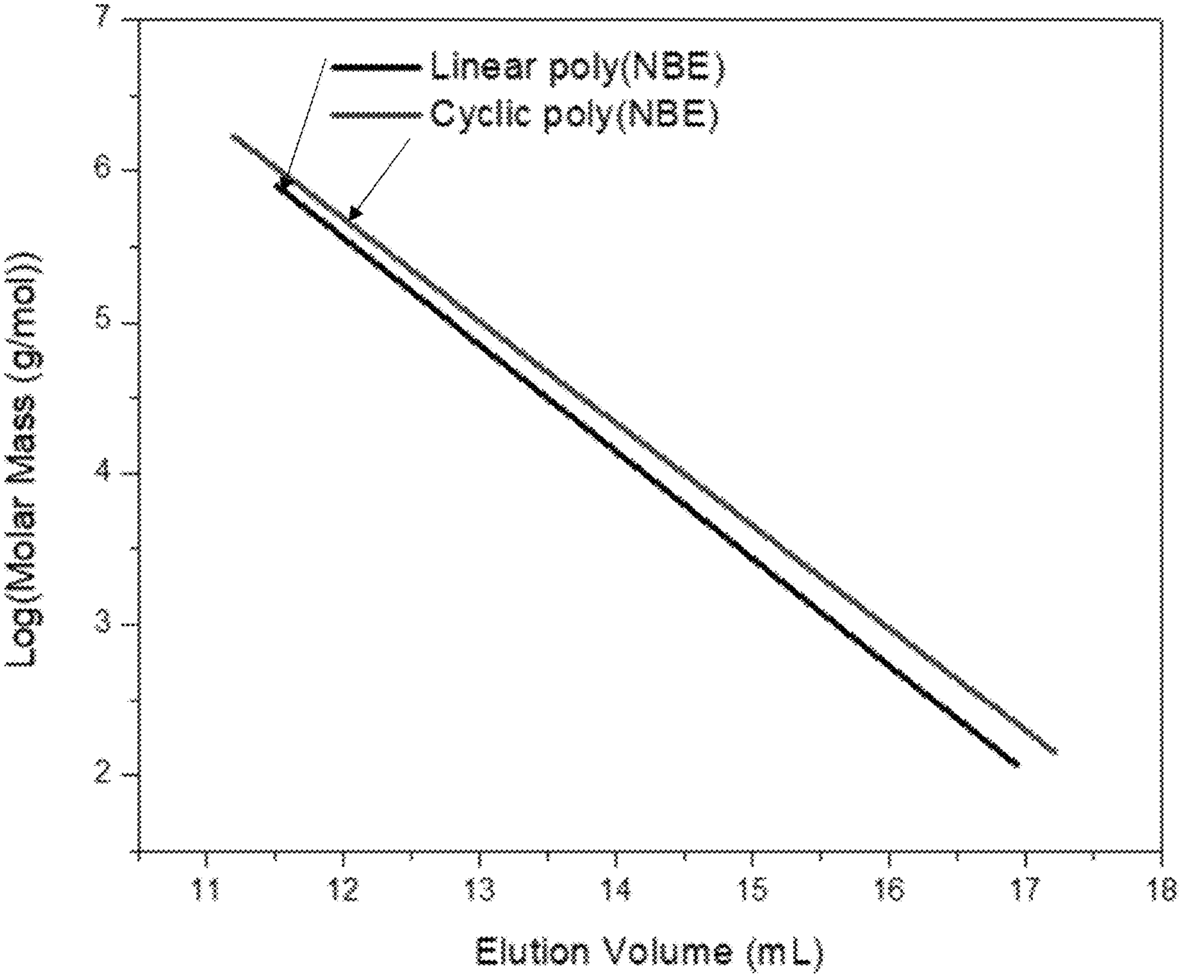
FIG. 20 is the plot of log of molar mass (g/mol) versus elution volume (mL) for poly(norbornene) synthesized using molybdenum metallacyclobutane complex 3 (cyclic) and 1 (linear).
Figure 21:
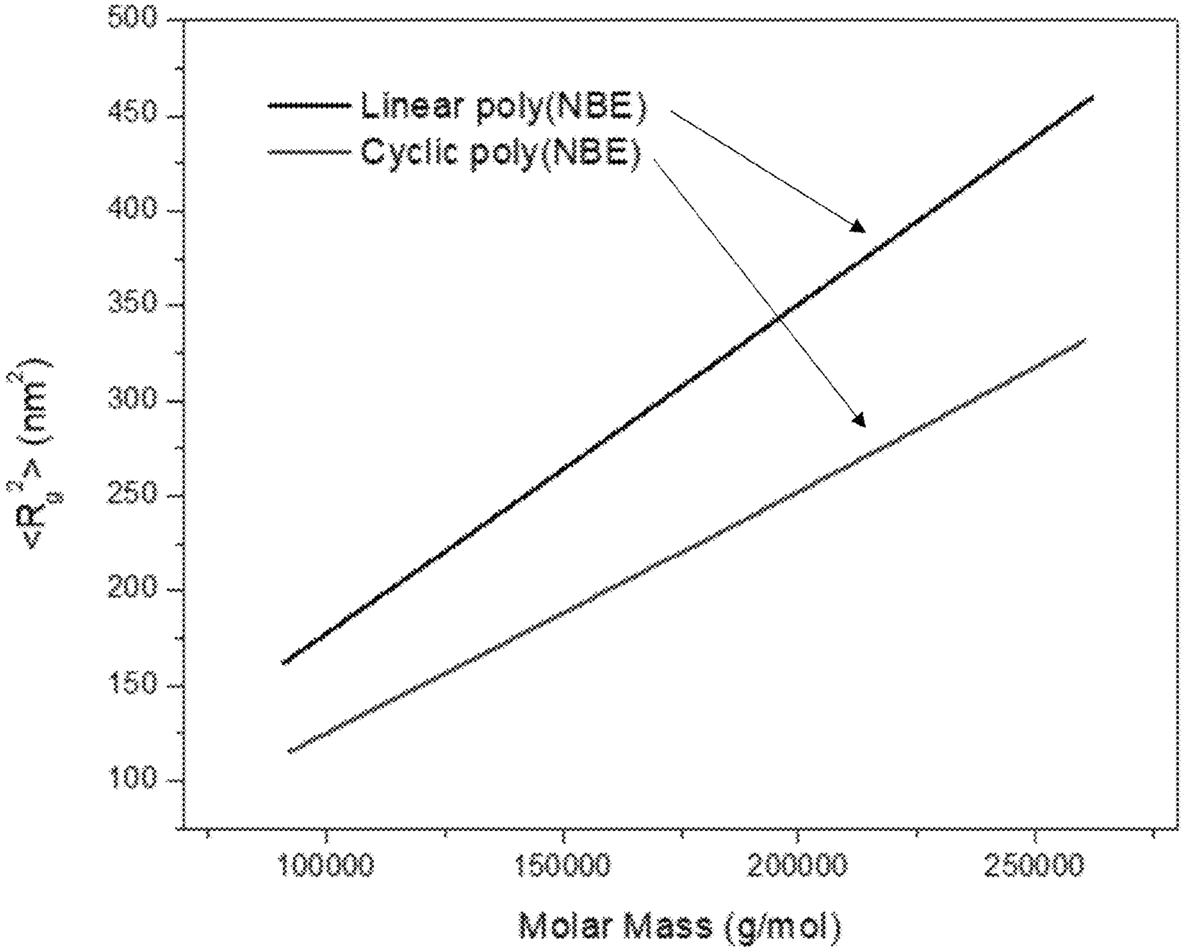
FIG. 21 is the plot of mean square radius (<$Rg^2$>) versus molecular weight for poly(norbornene) synthesized using molybdenum metallacyclobutane complex 3 (cyclic) and 1 (linear).

Proof of Cyclic Topology: Evidence for a cyclic topology came from various measurements that probed the hydrodynamic volume of the polymers. Complex 1, used in the synthesis of 3 is also an active catalyst for the polymerization of norbornene to give linear polynorbornene (Lee, L. B. W.; Register, R. A. *Macromolecules* 2005, 38, 1216-1222), thus providing a convenient comparison of any differences in polymer characterizations and properties. FIG. 20 depicts a plot of log of molar mass versus elution volume. Cyclic polymers with the same molar mass elute later than their linear counterparts. FIG. 20 clearly revealed this fundamental property in the polymers generated with 1 versus 3. Another property that probes the hydrodynamic volume difference between cyclic and linear polymers is the mean square radius. FIG. 21 depicts the mean square radius versus molecular weight (g/mol) of linear versus cyclic polynorbornene. The linear analogue increased as a function of molecular weight, at a greater rate than the cyclic polymer. As molecular weight grew, the linear analogue increased in size outwards more rapidly than the more compact cyclic polymer. The data revealed a ratio of $\langle R_g^2\rangle_{cyclic}/\langle R_g^2\rangle_{linear}$ of 0.715±0.004 across a broad molecular weight range. The theoretical value is 0.5 ((i) Zimm, B. H.; Stockmayer, W. H. *J. Chem. Phys.* 1949, 17, 1301-1314. (ii) Semlyen, J. A. *Cyclic Polymers*; Kluwer Academic Publishers: New York, 2000, 741-790).

Confirmation of a cyclic topology also came from a demonstration of lower intrinsic viscosities [η] of cyclic versus linear polymers via a Mark-Houwink-Sakurada (MHS) plot. Expected was a ratio of 0.65 ((i) Bloomfield, V.; Zimm, B. H. J. Chem. Phys. 1966, 44, 315-323. (ii) Fukatsu, M.; Kurata, M. *J. Chem. Phys.* 1966, 44, 4539-4545) under theta conditions (a=0.5). Alternatively, other more recent predictions suggest a ratio of 0.58±0.01 (Rubio, A. M.; Freire, J. J.; Bishop, M.; Clarke, J. H. R. *Macromolecules* 1995, 28, 2240-2246). Experimental results obtained from the literature are inconsistent, ranging from ~0.4-~0.8 ((i) Roovers, J. *J. Polym. Sci. Polym. Phys.* 1985, 23, 1117-1126. (ii) McKenna, G. B.; Hadziioannou, G.; Lutz, P.; Hild, G.; Strazielle, C.; Straupe, C.; Rempp, P.; Kovacs, A. J. *Macromolecules* 1987, 20, 498-512. (iii) Jeong, Y.; Jin, Y.; Chang, T.; Uhlik, F.; Roovers, J. *Macromolecules* 2017, 50, 7770-7776), depending on molecular weight (Geiser, D.; Hocker, H. *Macromolecules* 1980, 13, 653-656), as well as polymer-solvent systems (Lutz, P.; McKenna, G.; Rempp, P.; Strazielle, C. *Die Makromol. Chemie, Rapid Commun.* 1986, 7, 599-605.).

Figure 22:
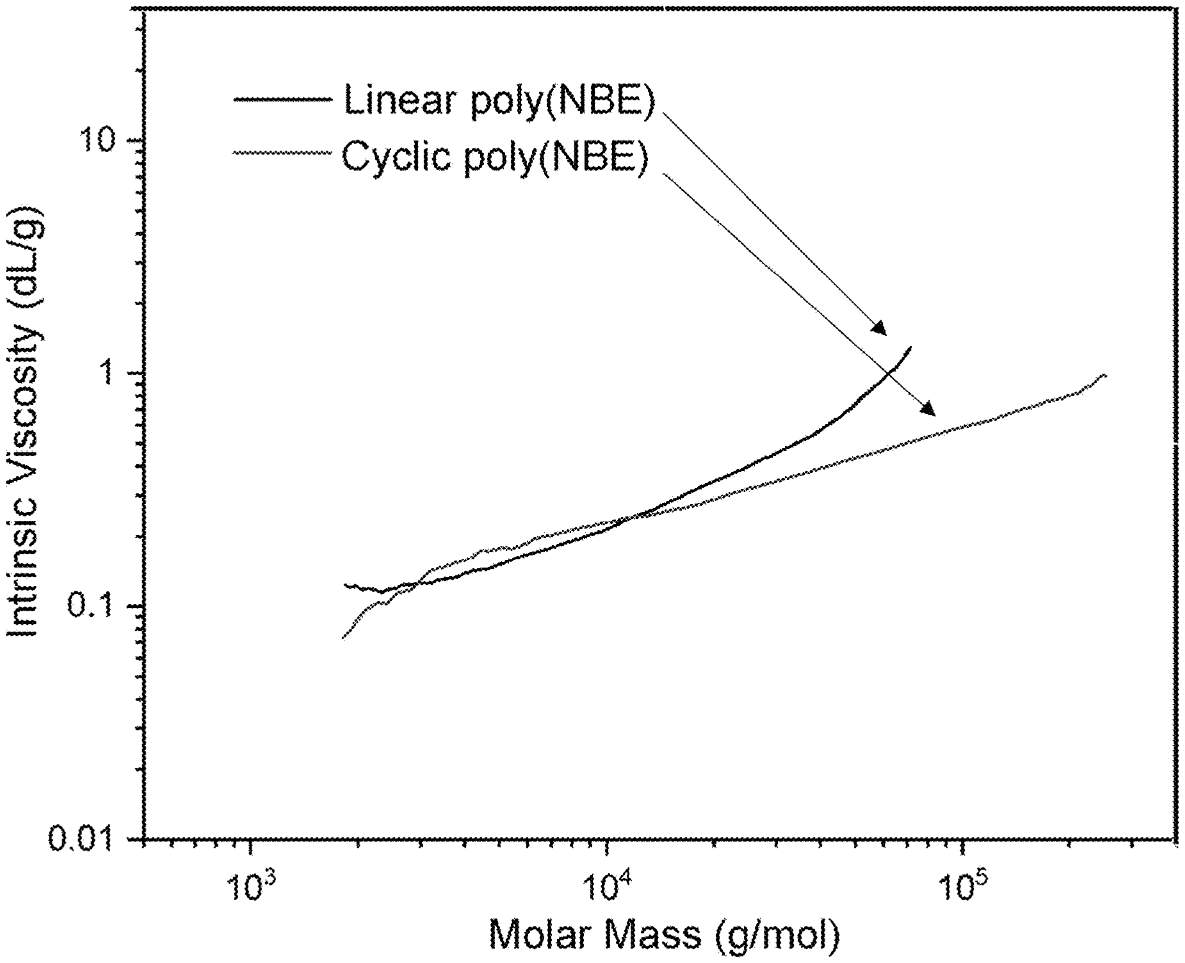
FIG. 22 is the plot of intrinsic viscosity (dL/g) versus molar mass (g/mol) for poly(norbornene) synthesized using molybdenum metallacyclobutane complex 3 (cyclic) and 1 (linear).

FIG. 22 depicts [η] versus molar mass [M] for cyclic and linear polynorbornene produced with catalyst 1 (linear) and 3 (cyclic). Analyzing the viscosity data obtained via size exclusion chromatography (SEC), the relative molecular densities of materials were assessed, where, at a given molecular weight, a cyclic polymer was denser than its linear analogue. These differences became more prominent as the molecular weight increases. As demonstrated in FIG. 22, at the low molecular weight region of the plot, the intrinsic viscosities of the linear and cyclic samples were very similar. As the molecular weight increased the two lines deviated, where the linear sample increased in intrinsic viscosity as a function of molecular weight, faster than the cyclic sample. This is consistent with a well solvated linear molecule, as they will disrupt the laminar flow greater than a cyclic material of the same molecular weight. Overall, the data were consistent with a cyclic topology for polymers produced with 3.

Example 3—Additional Syntheses of Compounds of Formula (I)

Compounds of formula (I) were made with different substituent groups, such as complexes 4 and 5, in a manner similar to that described in example 1. For example, compounds of formula (I) were made using compounds with similar functional groups as 1.

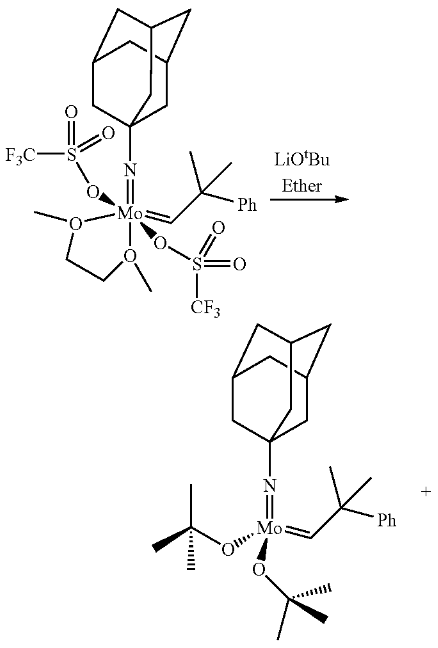

1′

-continued

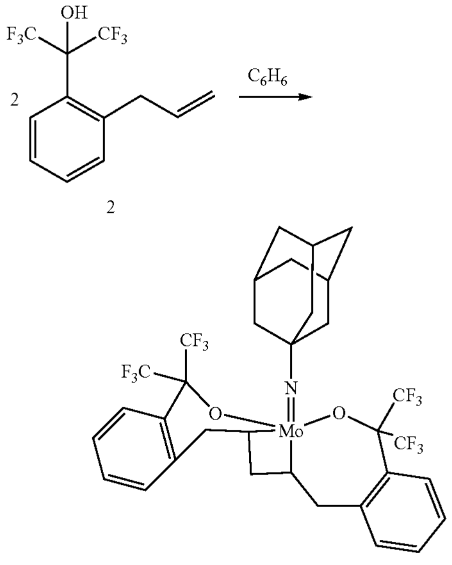

2

4

In a nitrogen filled glovebox, a vial was charged with $Mo(CHCMe_2Ph)(NAd)(OSO_2CF_3)_2(DME)$ (654.9 mg, 0.855 mmol) in diethyl ether (30 mL) at −35° C. Next, lithium tert-butoxide (136.9 mg, $1.71\times10^{-3}$ mol) was added. The mixture was warmed to room temperature (~20° C.) and stirred for 1 h, during which the mixture changed from yellow to red/orange in color. Then, the solvent was removed in vacuo. The remaining solid was then triturated three times using pentane to yield $Mo(CHMe_2Ph)(NAd)(O^tBu)_2$ (1') (325.8 mg, 73%) and was characterized via 1 D and 2D NMR techniques.

$^1H$ NMR ($CD_2Cl_2$, 500 MHz) δ (ppm): 10.77 (s, 1H, $H_9$), 7.42 (d 2H, J=8.5 Hz, Ar-$H_{14, 18}$), 7.22 (d, 2H, J=8.1 Hz, Ar-$H_{15, 17}$), 7.10 (t, 1H, J=7.3 Hz, Ar-$H_{16}$), 2.09 (br m, 3H, $H_{21, 23, 25}$), 2.05 (br m, 6H, $H_{20, 26, 27}$), 1.71 (s, 6H, $H_{11, 12}$), 1.66 (br m, 6H, $H_{22, 24, 28}$), 1.15 (s, 18H, $H_{1, 2, 3, 5, 6, 7}$)

$^{13}C$ NMR ($CD_2Cl_2$, 126 MHz) δ (ppm): 256.3 (s, $C_9$), 151.6 (s, $C_{13}$), 128.1 (s, $C_{15, 17}$), 126.6 (s, $C_{14, 18}$), 125.6 (s, $C_{16}$), 76.6 (s, $C_{4, 8}$), 72.9 (s, $C_{19}$), 48.9 (s, $C_{10}$), 45.6 (s, $C_{20, 26, 27}$), 36.5 (s, $C_{22, 24}$), 34.6 (s, $C_{28}$), 32.6 (s, $C_{11, 12}$), 32.2 (s, $C_{1, 2, 3, 5, 6, 7}$), 30.4 (s, $C_{21, 25}$), 29.2 (s, $C_{23}$)

In a nitrogen filled glovebox, a vial was charged with 1' (47.4 mg, $9.10\times10^{-6}$ mol) in 4 mL of benzene and 3 equivalents of THF (0.02 mL). The reaction was stirred for 5 minutes before 2 (51.4 mg, $1.80\times10^{-3}$ mol, 2.0 equiv) was added to the yellow/brown solution. After stirring for 1 h, the color of the solution became red/orange and the solvent was removed in vacuo. The remaining solid was then triturated three times using pentane to yield molybdenum metallacyclobutane complex (4) (70.2 mg, 97%). Single crystals amenable to X-ray diffraction deposited upon cooling a concentrated 1:1 DCM:pentane solution of complex 4 to −35° C.

Complex 4 was characterized via 1 D and 2D NMR techniques. $^1H$ NMR ($CD_2Cl_2$, 600 MHz) δ (ppm): 7.55 (d, J=8.0 Hz, 2H, $H_{9, 19}$), 7.36 (td, J=7.5, 1.3 Hz, 2H, $H_{7, 17}$), 7.27 (td, J=7.7, 1.6 Hz, 2H, $H_{6, 16}$), 7.24 (dd, J=7.6, 1.5 Hz, 2H, $H_{6, 16}$), 3.72 (dt, J=16.0, 8.7 Hz, 1H, $H_2$), 3.63 (dd, J=13.5, 11.9 Hz, 2H, $H_{4', 14'}$), 3.48 (ddd, J=13.5, 3.8, 1.5 Hz, 2H, $H_{4, 14}$), 2.71 (tdd, J=12.3, 8.5, 3.7 Hz, 2H, $H_{1, 3}$), 2.18 (q, J=14.1 Hz, 1H, $H_1$), 1.83 (p, J=3.2 Hz, 3H, $H_{25, 27, 29}$), 1.52-1.46 (m, 3H, $H_{26', 28', 31}$), 1.39-1.23 (m, 9H, $H_{24, 26, 28, 31, 30, 32}$).

$^{13}C$ determined by $^1H$-$^{13}C$ gHSQC and gHMBC experiments ($CD_2Cl_2$, 600 MHz) δ (ppm): 143.2 (s, $C_{5, 15}$), 132.8 (s, $C_{6, 16}$), 130.9 (s, $C_{11, 20}$), 129.8 (s, $C_{7, 17}$), 127.3 (s, $C_{9, 19}$), 125.9 (s, $C_{8, 18}$), 88.03 (s, $C_{11, 20}$), 78.7 (s, $C_{23}$), 43.3 (s, $C_{1, 3}$), 42.6 (s, $C_{4, 14}$), 41.4 (s, $C_{24, 30, 32}$), 35.3 (s, $C_{26, 28, 21}$), 29.2 (s, $C_{25, 27, 29}$)

$^{15}N$ NMR ($CD_2Cl_2$, 600 MHz) δ (ppm): 448.9 ppm $^{19}F$ NMR ($CD_2Cl_2$, 600 MHz) δ (ppm): −71.2 (q, J=10.3 Hz, 6F), −75.3 (q, J=9.9 Hz, 6F)

Additionally, compounds of formula (I) were made using compounds with similar functional groups as 2.

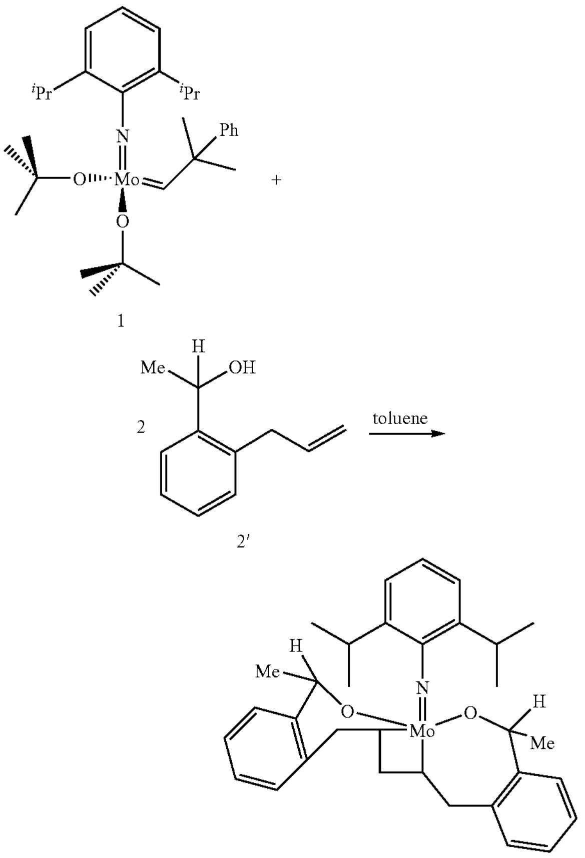

1

2'

5

In a nitrogen filled glovebox, a 20 mL vial was charged with 1 (39.9 mg, $7.26\times10^{-5}$ mol) and dissolved in 1 mL of toluene. In another vial, (R)-1-(2-allylphenylethan-1-ol (2', 23.6 mg, $1.45\times10^{-4}$ mol) was dissolved in 1 mL of toluene. The solutions were combined at room temperature and a color change was observed from orange to red/brown to generate molybdenum metallacyclobutane complex (5). The solution containing 5 was stirred for 10 minutes prior to use in polymerization studies. After 1 h, the NMR peaks broaden and the solution changes from red/brown to orange/brown in color.

Complex 5 was characterized via 1D and 2D NMR techniques at −60° C. $^1H$ NMR (499 MHz, $C_7D_6$) δ (ppm): 7.15 ppm (m, 1H, $H_7$), 7.11 (m, 1H, $H_6$), 7.03 (m, 1H, $H_9$), 7.02 (m, 3H, $H_{8, 15, 16}$), 6.98 (m, 1H, $H_{17}$), 6.95 (s, 1H, $H_{25}$), 6.91 (s, 1H, $H_{18}$), 6.87 (d, J=7.7 Hz, 2H, $H_{24, 26}$), 5.55 (q, J=6.1 Hz, 1H, $H_{11}$), 5.31 (q, J=6.2 Hz, 1H, $H_{20}$), 3.80 (dt, J=13.5, 8.4 Hz, 1H, $H_{2'}$), 3.69 (dd, J=13.9, 3.7 Hz, 1H, $H_{4'}$), 3.42 (dd, J=13.9, 5.6 Hz, 1H, $H_{4''}$), 3.30-3.27 (hept, J=7.0

Hz, 3H, $H_{13', 28, 31}$), 3.0 (ddt, J=13.4, 9.1, 4.8 Hz, 1H, $H_3$), 2.87 (t, J=12.7, Hz, 1H, $H_{13''}$), 2.54 (m, 1H, $H_1$), 2.33 (q, J=12.9 Hz, 1H, $H_{2''}$), 1.63 (d, J=6.5 Hz, 3H, $H_{12}$), 1.42 (d, J=6.3 Hz, 3H, $H_{21}$), 1.08 (d, J=6.9 Hz, 6H, $H_{29, 33}$), 0.99 (d, J=6.8 Hz, 6H, $H_{30, 32}$)

$^{13}C$ NMR determined by $^1H$-$^{13}C$ gHSQC and gHMBC experiments ($C_7D_8$, 499 MHz) δ (ppm): 151.5 (s, $C_{22}$), 143.9 (s, $C_{23, 27}$), 141.2 (s, $C_{14}$), 140.3 (s, $C_{10}$), 138.8 (s, $C_{19}$), 138.6 (s, $C_5$), 129.5 (s, $C_6$), 127.3 (s, $C_{15}$), 125.8 (s, $C_7$), 125.5 (s, $C_{16}$), 124.8 (s, $C_{25}$), 123.9 (s, $C_8$), 123.8 (s, $C_{17}$), 122.5 (s, $C_9$), 121.8 (s, $C_{18}$), 120.3 (s, $C_{26}$), 120.2 (s, $C_{24}$), 75.2 (s, $C_{11}$), 72.5 (s, $C_{20}$), 39.3 (s, $C_1$), 39.2 (s, $C_{13}$), 37.7 (s, $C_3$), 37.4 (s, $C_4$), 31.5 (s, $C_2$), 25.9 (s, $C_{28, 31}$), 21.34 (s, $C_{29, 30, 32, 33}$), 19.5 (s, $C_{12}$), 18.1 (s, $C_{21}$)

Thus, example 3 demonstrates that compounds of formula (I) were made with different substituents.

Example 4 - Polymerization of Alkenes and Alkynes with Complexes 4 and 5

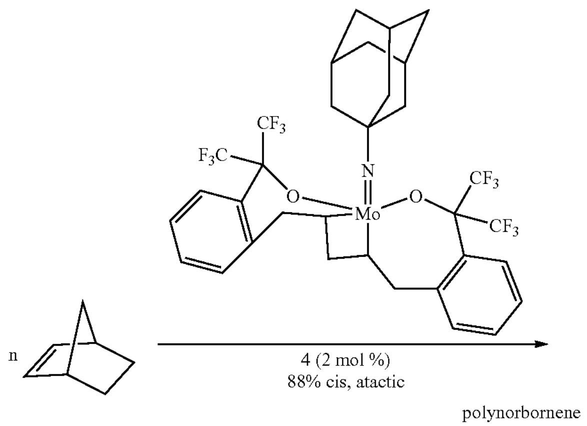

Synthesis of Cyclic Polynorbornene with 4: In a nitrogen-filled glovebox, a stock solution was prepared from 4 (74.3 mg) in toluene (1.486 mL). A 20 mL vial was then charged with norbornene (70.0 mg, $7.43\times10^{-4}$ mol, 50 equiv) in 1.08 mL of toluene. A volume of 0.237 mL (11.9 mg, $3.76\times10^{-6}$ mol, 1 equiv) of stock solution of 4 was added to the vigorously stirred norbornene solution and the reaction was allowed to stir for 5 h at ambient temperature (about 20-25° C.). After this period, the reaction vessel was brought outside the glovebox, and the reaction mixture was added to stirring methanol. Polynorbornene precipitated as a white solid and was isolated by filtration and dried overnight under vacuum (66.5 mg, 95% yield, 88% cis, atactic). $^1H$ and $^{13}C\{^1H\}$ NMR spectral assignments were consistent with previous reports (Nadif, S. S.; Kubo, T.; Gonsales, S. A.; VenkatRamani, S.; Ghiviriga, I.; Sumerlin, B. S.; Veige, A. S. *J. Am. Chem. Soc.* 2016, 138, 6408-6411). A number of experiments were run to determine the effect the ratio of catalyst to monomer on the product. As shown below in Table 5, the % of cis double bonds in the product was higher using complex 4, compared to complex 3. In addition, the % of cis double bonds in the product is consistently higher using complex 4 irrespective of the monomer to catalyst ratio.

TABLE 5

Polymerization of Norbornene[a] by complex 4 with different Monomer/Catalyst Ratios

| $[mon]/[cat]_0$[a] | $[mon]_0$[b] | Yield (%) | % cis[c] | $M_n$[d] (g/mol) | $M_w/M_n$[d] |
|---|---|---|---|---|---|
| 50:1 | 0.75 | 95 | 88 | 10421 | 4.64 |
| 100:1 | 0.75 | 93 | 87 | 6657 | 9.02 |
| 250:1 | 0.75 | 93 | 87 | 7664 | 8.69 |
| 500:1 | 0.75 | 90 | 88 | 5424 | 4.41 |
| 1000:1 | 0.75 | 87 | 86 | 9526 | 7.38 |

[a]The appropriate amount of a 50 mg/mL solution of catalyst dissolved in toluene was added to 70 mg of norbornene dissolved in toluene and stirred for 24 h at room temperature.

[b]mol L-1.

[c]Determined by $^1H$ NMR spectroscopy.

[d]Determined by size-exclusion chromatography (SEC) using multi-angle scattering.

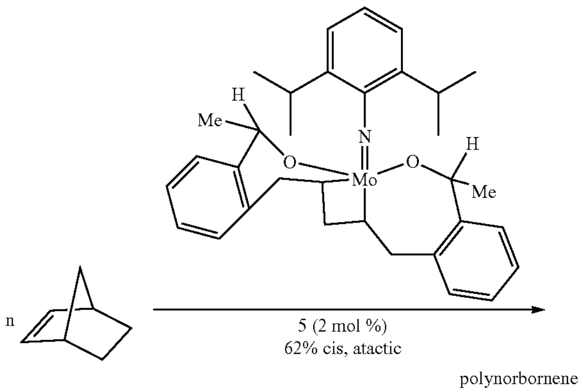

Synthesis of Cyclic Polynorbornene with 5: In a nitrogen-filled glovebox, a stock solution (42 mg/mL) of 5 was prepared in toluene (1.0 mL) following the procedure in example 3. A 20 mL vial was then charged with norbornene (70.0 mg, $7.43\times10^{-4}$ mol, 50 equiv) in 1.0 mL of toluene. An aliquot (0.205 mL) of the stock solution of 5 (8.61 mg, $1.49\times10^{-5}$ mol, 1 equiv) was added to the vigorously stirred norbornene solution and the reaction was allowed to stir for 24 h at ambient temperature (about 20-25° C.). After this period, the reaction vessel was brought outside the glovebox, and the reaction mixture was added to stirring methanol. Polynorbornene precipitated as a white solid and was isolated by filtration and dried overnight under vacuum (66.3 mg, 89% yield, 64% cis, atactic). $^1H$ and $^{13}C\{^1H\}$ NMR spectral assignments were consistent with previous reports (Nadif, S. S.; Kubo, T.; Gonsales, S. A.; VenkatRamani, S.; Ghiviriga, I.; Sumerlin, B. S.; Veige, A. S. *J. Am. Chem. Soc.* 2016, 138, 6408-6411). A number of experiments were run to determine the effect of the ratio of catalyst to monomer on the product. As shown below in Table 6, unlike complexes 3 and 4, polymerization of norbornene can be achieved using monomer to catalyst ratios of 20000:1 with complex 5.

TABLE 6

| Polymerization of Norbornene[a] by complex 5 with different Monomer/Catalyst Ratios | | | | | |
|---|---|---|---|---|---|
| $[mon]/[cat]_0$[a] | $[mon]_0$[b] | Yield (%) | % cis[c] | $M_n$[d] (g/mol) | $M_w/M_n$[d] |
| 50:1 | 0.25 | 98 | 62 | 26762 | 2.98 |
| 100:1 | 0.25 | 89 | 64 | 12437 | 3.25 |
| 250:1 | 0.25 | 93 | 65 | 37061 | 3.54 |
| 500:1 | 0.25 | 92 | 61 | 26058 | 6.76 |
| 1000:1 | 0.25 | 87 | 62 | 99570 | 3.25 |
| 5000:1 | 0.25 | 73 | 63 | 44752 | 7.6 |
| 10000:1 | 0.25 | 68 | 63 | 41073 | 10.99 |
| 15000:1 | 0.25 | 63 | 61 | 25752 | 7.46 |
| 20000:1 | 0.25 | 50 | 60 | 70904 | 3.45 |

[a]The appropriate amount of a 42 mg/mL solution of catalyst dissolved in toluene was added to 70 mg of norbornene dissolved in toluene and stirred for 24 h at room temperature.
[b]mol L-1.
[c]Determined by $^1H$ NMR spectroscopy.
[d]Determined by size-exclusion chromatography (SEC) using multi-angle scattering.

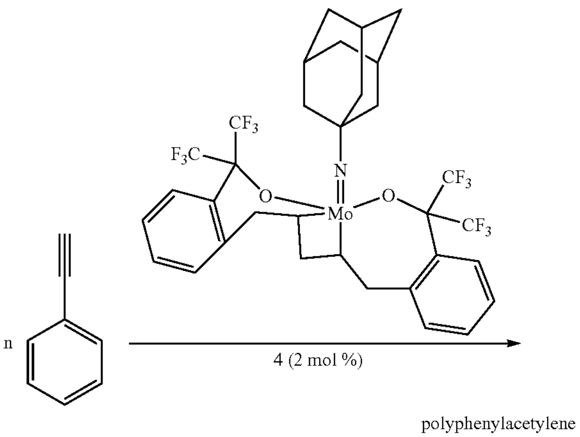

Synthesis of Cyclic Polyphenylacetylene with 4: In a nitrogen filled glovebox, a 20 mL glass vial was charged with phenylacetylene (70.0 mg, 9.79x10$^{-4}$ mol, 50 equiv) and dissolved in 1.00 ml of toluene. In another vial, a 0.313 mL aliquot of the stock solution of complex 4 (15.6 mg, 1.96x10$^{-5}$ mol, 1.0 equiv) in benzene was added to the phenylacetylene solution. The resulting orange reaction mixture was stirred at ambient temperature (about 20-25° C.). After 24 h of stirring, the mixture was added to stirring methanol. Polyphenylacetylene precipitated as an orange solid and was isolated by filtration and dried overnight under vacuum (62 mg, 90%). $^1H$ spectral assignments were consistent with literature reports (Roland, C. D.; Li, H.; Abboud, K. A.; Wagener, K. B.; Veige, A. S. Cyclic polymers from alkynes. *Nature Chem.* 2016, 8, 791-796). As shown below in Table 7, as the amount of catalyst decreased compared to monomer, the yield decreased.

TABLE 7

| Polymerization of Phenylacetylene[a] by complex 4 with different Monomer/Catalyst Ratios | | | | |
|---|---|---|---|---|
| $[mon]/[cat]_0$[a] | $[mon]_0$[b] | Yield (%) | $M_n$[c] (g/mol) | $M_w/M_n$[c] |
| 50:1 | 0.75 | 90 | 35830 | 1.95 |
| 100:1 | 0.75 | 85 | 55500 | 2.23 |
| 250:1 | 0.75 | 64 | 52050 | 2.64 |
| 500:1 | 0.75 | 30 | 133100 | 2.25 |
| 1000:1 | 0.75 | 10 | 86570 | 2.05 |

[a]The appropriate amount of a 50 mg/mL solution of catalyst dissolved in toluene was added to 70 mg of phenylacetylene dissolved in toluene and stirred for 24 h at room temperature.
[b]mol L-1.
[c]Determined by size-exclusion chromatography (SEC) using multi-angle scattering.

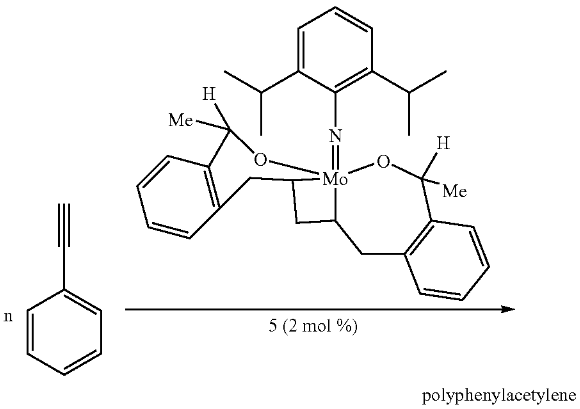

Synthesis of Cyclic Polyphenylacetylene with 5: In a nitrogen filled glovebox, a 20 mL glass vial was charged with phenylacetylene (70.0 mg, 9.79x10$^{-4}$ mol, 50 equiv) and dissolved in 1.00 ml of toluene. A 0.270 mL aliquot of complex 5 (11.4 mg, 1.96x10$^{-1}$ mol, 1.0 equiv) in benzene was added to the phenylacetylene solution. The resulting orange reaction mixture was stirred at room temperature. After 24 h of stirring, the mixture was added to stirring methanol. Polyphenylacetylene precipitated as an orange solid and was isolated by filtration and dried overnight under vacuum (62.4 mg, 90%). $^1H$ spectral assignments were consistent with literature reports (Roland, C. D.; Li, H.; Abboud, K. A.; Wagener, K. B.; Veige, A. S. Cyclic polymers from alkynes. *Nature Chem.* 2016, 8, 791-796). As shown below in Table 8, as the amount of catalyst decreased compared to monomer, the yield decreased. In comparison with complexes 3 and 4, complex 5 is able to polymerize phenylacetylene with monomer to catalyst ratios of 20000:1.

TABLE 8

| Polymerization of Phenylacetylene[a] by complex 5 with different Monomer/Catalyst Ratios | | | | |
|---|---|---|---|---|
| $[mon]/[cat]_0$[a] | $[mon]_0$[b] | Yield (%) | $M_n$[c] (g/mol) | $M_w/M_n$[c] |
| 50:1 | 1 | 90 | 9857 | 1.66 |
| 100:1 | 1 | 89 | 10360 | 1.79 |
| 250:1 | 1 | 93 | 15310 | 1.86 |
| 500:1 | 1 | 92 | 19580 | 1.74 |
| 1000:1 | 1 | 82 | 28140 | 1.49 |
| 5000:1 | 1 | 73 | 43050 | 1.82 |
| 10000:1 | 1 | 62 | 41120 | 2.18 |

TABLE 8-continued

Polymerization of Phenylacetylene[a] by complex 5 with different Monomer/Catalyst Ratios

| $[mon]/[cat]_0$[a] | $[mon]_0$[b] | Yield (%) | $M_n$[c] (g/mol) | $M_w/M_n$[c] |
|---|---|---|---|---|
| 15000:1 | 1 | 50 | 39520 | 2.03 |
| 20000:1 | 1 | 35 | 50150 | 2.13 |

[a]The appropriate amount of a 42 mg/mL solution of catalyst dissolved in toluene was added to 70 mg of phenylacetylene dissolved in toluene and stirred for 24 h at room temperature.
[b]mol L−1.
[c]Determined by size-exclusion chromatography (SEC) using multi-angle scattering.

Figure 23:
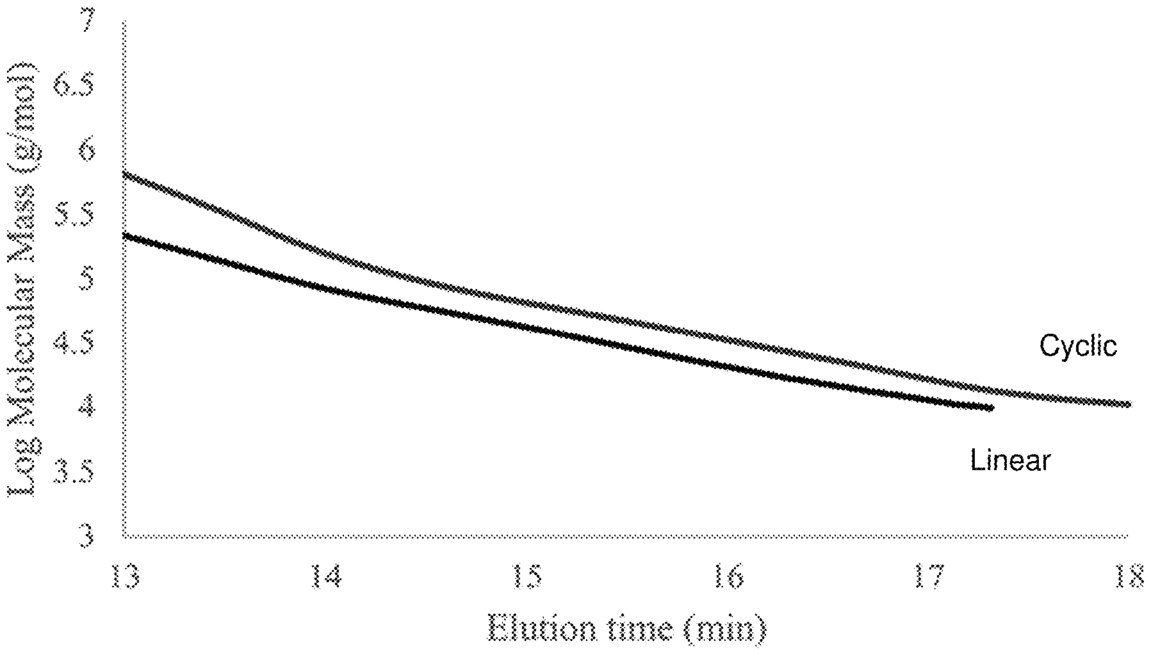
FIG. 23 is the plot of log of molar mass (g/mol) versus elution time (min) for poly(phenylacetylene) synthesized using molybdenum metallacyclobutane complex 4 (cyclic) and 1 (linear).
Figure 24:
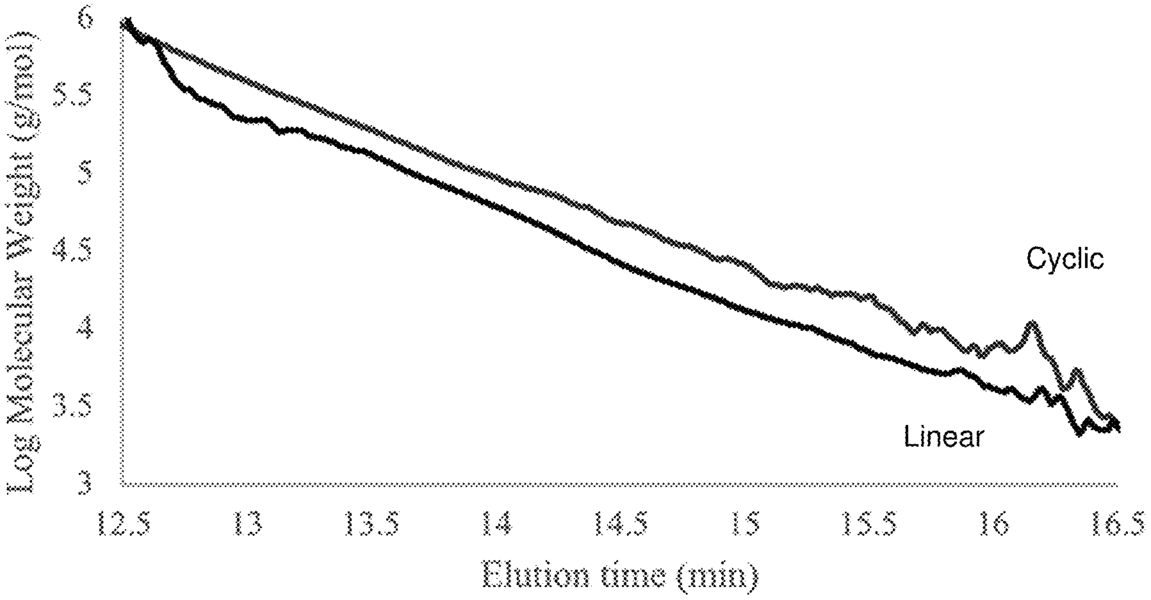
FIG. 24 is the plot of log of molar mass (g/mol) versus elution time (min) for poly(norbornene) synthesized using molybdenum metallacyclobutane complex 5 (cyclic) and 1 (linear).

Proof of Cyclic Topology: Evidence for a cyclic topology came from various measurements that probed the hydrodynamic volume of the polymers. FIG. 23 depicts a plot of log of molar mass versus elution time for linear and cyclic poly(phenylacetylene). FIG. 24 depicts a plot of log of molar mass versus elution time for poly(norbornene) formed using 5 and 1. Cyclic polymers with the same molar mass elute later than their linear counterparts. FIGS. 23 and 24 clearly revealed this fundamental property in the polymers generated with 4 and 5 versus 1, respectively.

Figure 25:
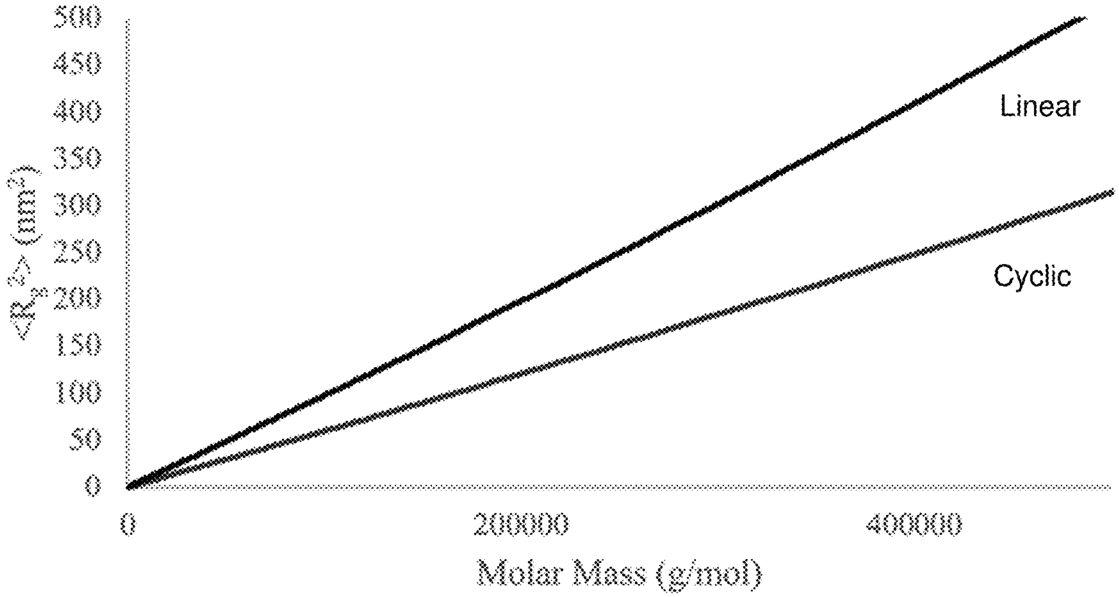
FIG. 25 is the plot of mean square radius (<$Rg^2$>) versus molecular weight for poly(norbornene) synthesized using molybdenum metallacyclobutane complex 5 (cyclic) and 1 (linear).

Another property that probes the hydrodynamic volume difference between cyclic and linear polymers is the mean square radius. FIG. 25 depicts the mean square radius versus molecular weight (g/mol) of linear versus cyclic polynorbornene. The linear analogue increased as a function of molecular weight, at a greater rate than the cyclic polymer. As molecular weight grew, the linear analogue increased in size outwards more rapidly than the more compact cyclic polymer. FIG. 25 clearly reveals this property in the polymers generated with 5 versus 1.

Figure 26:
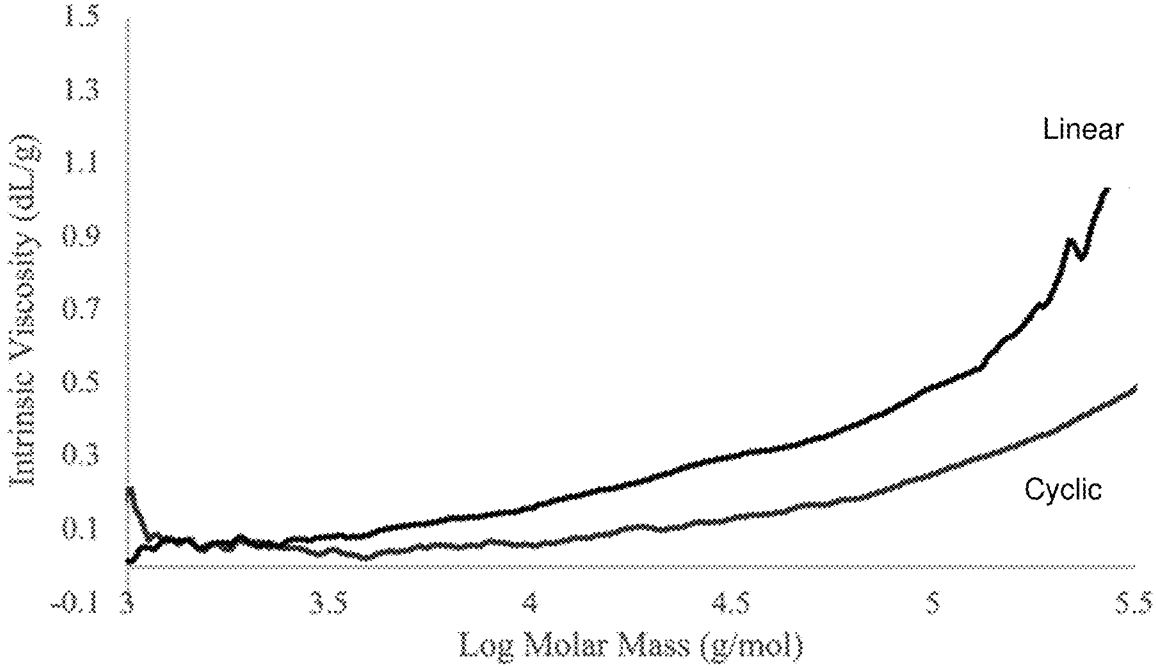
FIG. 26 is the plot of intrinsic viscosity (dL/g) versus molar mass (g/mol) for poly(norbornene) synthesized using molybdenum metallacyclobutane complex 5 (cyclic) and 1 (linear).

Confirmation of a cyclic topology also came from a demonstration of lower intrinsic viscosities [η] of cyclic versus linear polymers via a Mark-Houwink-Sakurada (MHS) plot, shown in FIG. 26. At a given molecular weight, a cyclic polymer is denser than its linear analogue. These differences became more prominent as the molecular weight increased. As demonstrated in FIG. 26, at the low molecular weight region of the plot, the intrinsic viscosities of the linear and cyclic samples were very similar. As the molecular weight increased, the two lines deviated, where the linear sample increased in intrinsic viscosity as a function of molecular weight, faster than the cyclic sample. This is consistent with a well solvated linear molecule, as they will disrupt the laminar flow greater than a cyclic material of the same molecular weight. Overall, the data were consistent with a cyclic topology for polymers produced with 4 and 5.

Thus, example 4 demonstrates that alkenes and alkynes were polymerized using compounds of formula (I).

What is claimed:

1. A compound having a structure represented by formula (I) or formula (II):

(I)

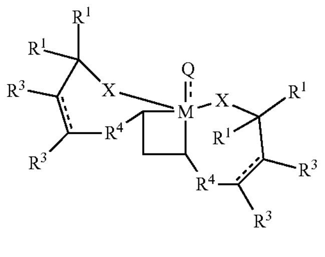

or

-continued (II)

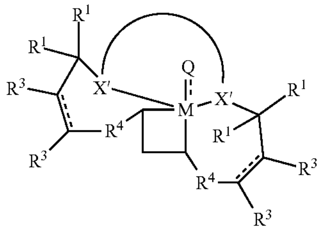

wherein the dashed lines are optional double bonds;

M is a transition metal;

Q is a neutral or anionic ligand;

each X is independently selected from S, O, $NR^5$, $N(R^5)_2$, $P(R^6)_2$, $C(R^7)_2$, $BR^{11}$, $Si(R^{12})_2$, Se, and Te;

each X' is independently selected from S, O, N, $NR^5$, P, $PR^6$, $CR^7$, B, $SiR^{12}$, Se, and Te;

wherein the curved line, together with each X' and M, form a metallacycle and the curved line represents a chain of 1 to 6 atoms independently selected from C, O, N, and S;

each $R^1$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^2$ is independently selected from H, $C_1$-$C_{22}$ alkyl, $C_4$-$C_8$ cycloalkyl, and $Ar^1$;

each $R^3$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^3$ together with the carbon atoms to which they are attached, form a five- to eight-member cycloalkyl, aryl, heteroaryl, or heterocycloalkyl comprising 1 to 5 heteroatoms selected from O, N, and S;

each $R^4$ is independently selected from a bond, $—C(R^2)_2—$, and $—C(R^2)_2C(R^2)_2—$;

each $R^5$ is independently selected from $C_1$-$C_{22}$ alkyl, $C_4$-$C_{10}$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^5$ together with the atoms to which they are attached, form a five- to eight-member cycloalkyl, aryl, heteroaryl, or heterocycloalkyl comprising 1 to 5 heteroatoms selected from O, N, and S;

each $R^6$ is independently selected from $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^6$ together with the atoms to which they are attached, form a five- to eight-member cycloalkyl, aryl, heteroaryl, or heterocycloalkyl comprising 1 to 5 heteroatoms selected from O, N, and S;

each $R^7$ is independently selected from H, $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^7$ together with the atoms to which they are attached, form a fiveto eight-member cycloalkyl, aryl, heteroaryl, or heterocycloalkyl comprising 1 to 5 heteroatoms selected from O, N, and S; and, each $R^{11}$ and $R^{12}$ are independently selected from $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{11}$, or two vicinal $R^{12}$ together with the atoms to which they are attached, form a five- to eight-member cycloalkyl, aryl, heteroaryl, or heterocycloalkyl comprising 1 to 5 heteroatoms selected from O, N, and S;

each $Ar^1$ is independently selected from $C_6$-$C_{22}$ aryl and a 5-12 membered heteroaryl comprising from 1 to 3 ring heteroatoms selected from O, N, and S.

2. The compound of claim 1, wherein M is Mo or W.

3. The compound of claim 1, wherein each X is independently selected from O, $NR^5$, and $C(R^7)_2$.

4. The compound of claim 1, wherein each X' is independently selected from N, P, and $CR^7$.

5. The compound of claim 1, wherein Q is $N(R^5)$.

6. The compound of claim 5, wherein $R^5$ is $Ar^1$ or adamantyl.

7. The compound of claim 6, wherein $Ar^1$ is phenyl, 1,3-diisopropylbenzene, 1,3-ditertbutylbenzene, or 1,3-cyclohexylbenzene.

8. The compound of claim 1, wherein each $R^1$ is independently selected from H, $C_1$-$C_{20}$alkyl, $C_1$-$C_{20}$haloalkyl, $C_4$-$C_{20}$cycloalkyl, or $Ar^1$.

9. The compound of claim 1, wherein two vicinal $R^3$ together with the carbon atoms to which they are attached, form phenyl.

10. A compound selected from the group consisting of:

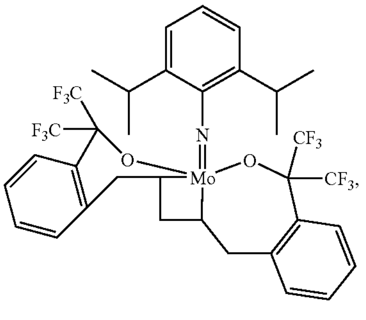

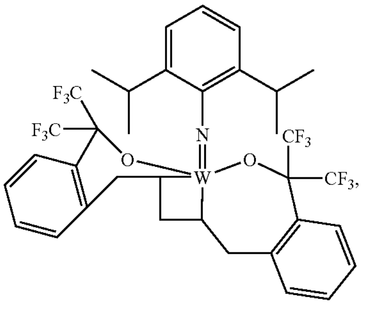

-continued

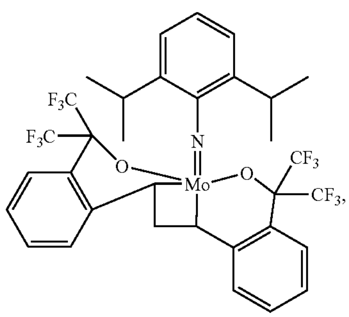

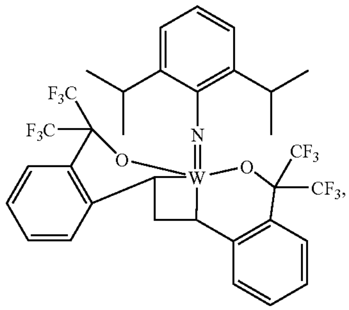

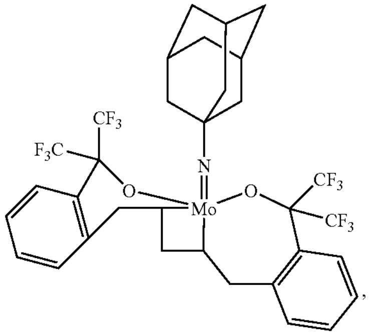

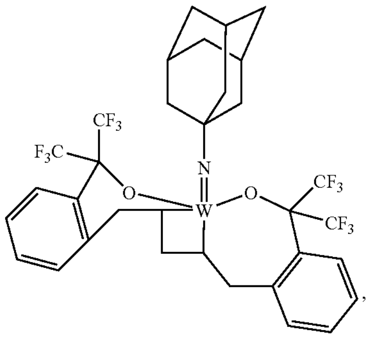

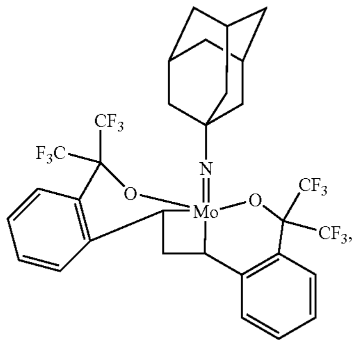

-continued
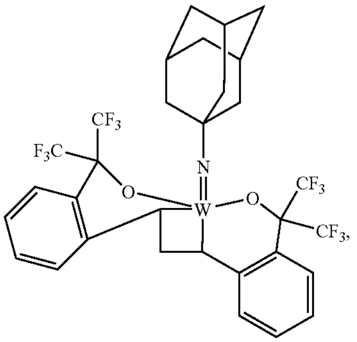
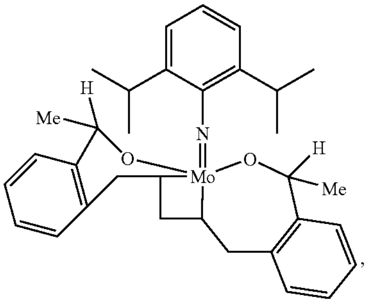
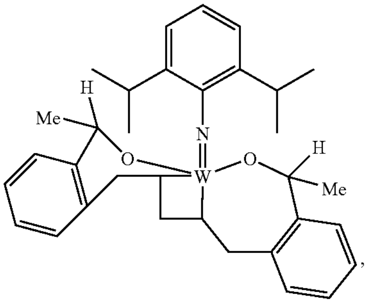
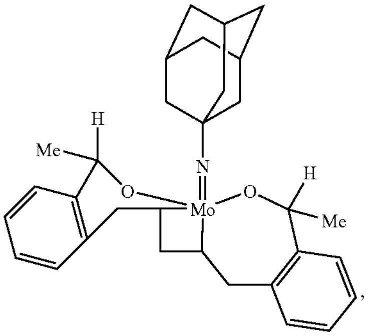
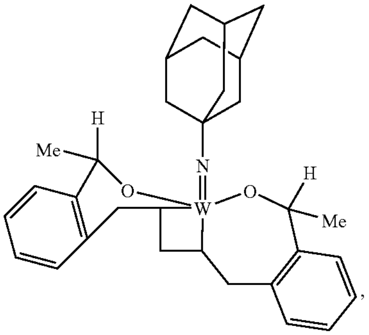
-continued
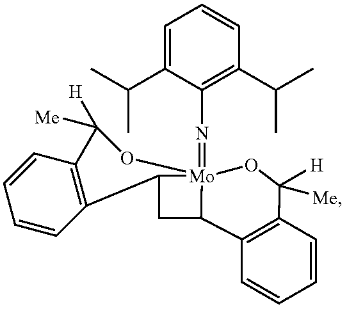
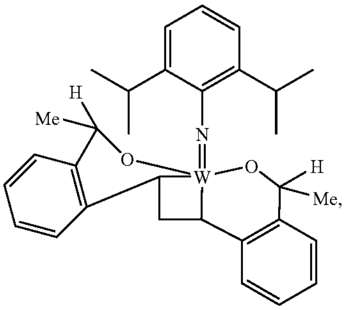
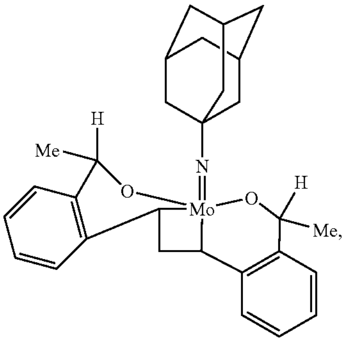
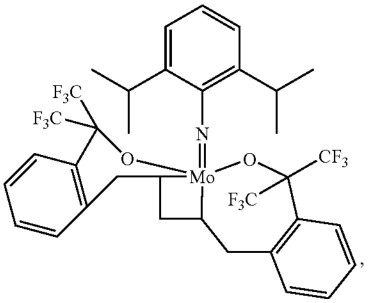
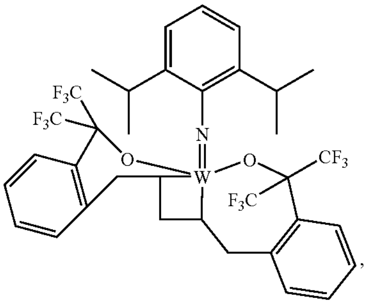

-continued

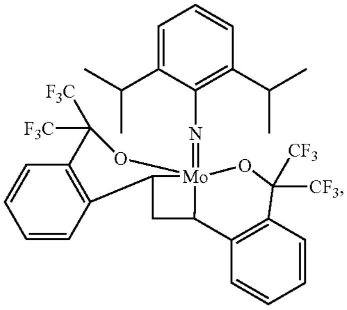

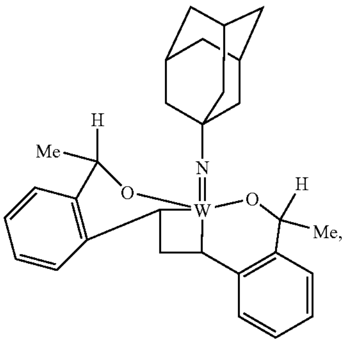

and

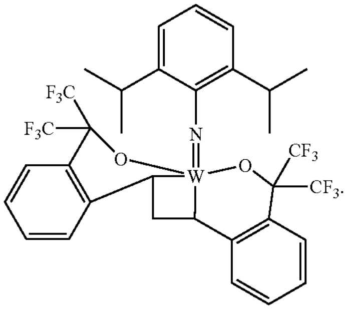

11. A method of preparing the compound according to claim 1, the method comprising:

admixing a compound of formula (III) and a compound of formula (IV) or a compound of formula (V) under conditions sufficient to form the compound of formula (I) or formula (II):

(III)

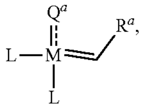

(IV)

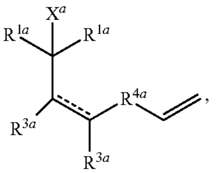

-continued (V)

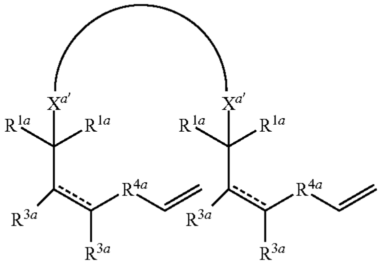

wherein the dashed lines are optional double bonds;

M is a transition metal; $Q^a$ is a neutral or anionic ligand;

each $X^a$ is independently selected from SH, OH, $NHR^{5a}$, $NH(R^{5a})_2$, $PH(R^{6a})_2$, $CH(R^{7a})_2$, SeH, TeH, $BHR^{11a}$ and $SiH(R^{12a})_2$;

each $X^{a'}$ is independently selected from S, O, NH, $NHR^{5a}$, PH, $PHR^{6a}$, $CHR^{7a}$, BH, $SiHR^{12a}$, Se, and Te;

wherein the curved line represents a chain of 1 to 6 atoms, each atom independently selected from C, O, N, and S;

$R^a$ is selected from $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^{1a}$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S;

each $R^{2a}$ is independently selected from H, $C_1$-$C_{22}$alkyl, $C_4$-$C_8$ cycloalkyl, and $Ar^{1a}$;

each $R^{3a}$ is independently selected from H, $C_1$-$C_{20}$haloalkyl, $C_1$-$C_{20}$alkyl, $C_2$-$C_{20}$alkenyl, $C_4$-$C_{20}$cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{3a}$ together with the carbon atoms to which they are attached, form a five- to eight-member cycloalkyl, aryl, heteroaryl, or heterocycloalkyl comprising 1 to 5 heteroatoms selected from O, N, and S;

each $R^{4a}$ is independently selected from a bond, $—C(R^{2a})_2—$, and $—C(R^{2a})_2C(R^{2a})_2—$;

each $R^{5a}$ is independently selected from $C_1$-$C_{22}$ alkyl, $C_4$-$C_{10}$ cycloalkyl$C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{5a}$ together with the atoms to which they are attached, form a five- to eight-member cycloalkyl, aryl, heteroaryl, or heterocycloalkyl comprising 1 to 5 heteroatoms selected from O, N, and S;

each $R^{6a}$ is independently selected from $C_1$-$C_{22}$ alkyl, $C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{6a}$ together with the atoms to which they are attached, form a five- to eight-member cycloalkyl, aryl, heteroaryl, or heterocycloalkyl comprising 1 to 5 heteroatoms selected from O, N, and S;

each $R^{7a}$ is independently selected from H, $C_1$-$C_{22}$ alkyl, $C_4$-$C_8$ cycloalkyl, $Ar^{1a}$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{7a}$ together with the atoms to which they are attached, form a five- to eight-member cycloalkyl, aryl, heteroaryl, or heterocycloalkyl comprising 1 to 5 heteroatoms selected from O, N, and S;

each $R^{11a}$ and $R^{12a}$ are independently selected from $C_1$-$C_{22}$ alkyl, $C_4$-$C_8$ cycloalkyl, $Ar^1$, $C_1$-$C_{20}$heteroalkyl comprising 1 to 5 heteroatoms selected from O, N, and S, and $C_1$-$C_{20}$heterocycloalkyl comprising 1 to 5 heteroatoms selected from O, N, and S, or two vicinal $R^{11a}$, or two vicinal $R^{12a}$ together with the atoms to which they are attached, form a five- to eight-member cycloalkyl, aryl, heteroaryl, or heterocycloalkyl comprising 1 to 5 heteroatoms selected from O, N, and S;

each L is independently a ligand; and, each $Ar^{1a}$ is independently selected from $C_6$-$C_{22}$ aryl and a 5-12 membered heteroaryl comprising from 1 to 3 ring heteroatoms selected from O, N, and S.

12. The method of claim 11, wherein the admixing comprises the compound of formula (III) and the compound of formula (IV) in a molar ratio of at least 1:1.8.

13. The method of claim 11, wherein the admixing comprises the compound of formula (III) and the compound of formula (V) in a molar ratio of at least 1:0.8.

14. The method of claim 11, wherein the admixing occurs at a temperature in a range of about 0° C. to about 35° C.

15. The method of claim 11, wherein the admixing occurs for a time in a range of about 1 minute to about 24 hours.

16. The method of claim 11, wherein the admixing further comprises a solvent.

17. The method of claim 16, wherein the solvent comprises benzene, toluene, hexanes, pentanes, trichloromethane, chloro-substituted benzenes, deuterated analogs thereof, or combinations thereof.

18. A method of preparing a cyclic polymer, the method comprising:

admixing a plurality alkene monomers, alkyne monomers, or both in the presence of the compound of claim 1 under conditions sufficient to polymerize the plurality of alkene monomers, alkyne monomers, or both to form the cyclic polymer.

19. The method of claim 18, wherein the admixing further comprises a solvent.

20. The method of claim 19, wherein the solvent comprises benzene, toluene, deuterated analogs thereof, or combinations thereof.

* * * * *